United States Patent [19]
Konno et al.

[11] Patent Number: 6,081,385
[45] Date of Patent: Jun. 27, 2000

[54] OPTICAL SYSTEM DESIGN AND PRODUCTION METHOD

[75] Inventors: Kenji Konno, Sakai; Tetsuo Kohno, Toyonaka; Hitoshi Hagimori, Ikoma, all of Japan

[73] Assignee: Minolta Co., Ltd., Osaka, Japan

[21] Appl. No.: 09/112,368

[22] Filed: Jul. 9, 1998

[30] Foreign Application Priority Data

| Sep. 7, 1997 | [JP] | Japan | 9-184110 |
| Sep. 7, 1997 | [JP] | Japan | 9-184114 |
| Sep. 7, 1997 | [JP] | Japan | 9-184120 |
| Sep. 7, 1997 | [JP] | Japan | 9-184130 |

[51] Int. Cl.$^7$ .............................. G02B 27/14; G02B 27/64
[52] U.S. Cl. ........................... 359/637; 359/554; 359/557
[58] Field of Search .................................. 359/637, 557, 359/692, 708, 554

[56] References Cited

U.S. PATENT DOCUMENTS 5,602,676  2/1997  Estelle.

*Primary Examiner*—Georgia Epps
*Assistant Examiner*—Michael A Lucas
*Attorney, Agent, or Firm*—Burns, Doane, Swecker & Mathis, LLP

[57] ABSTRACT

An optical system design method determines a specific optical group having a relatively high decentering aberration error sensitivity to parallel decentering and tilt decentering, and minimizes the absolute value of the decentering aberration coefficient of that group. In a first stage, an optical system group consisting of at least one lens surface is identified which presents a problem in production because of a relatively high centering error sensitivity. A second stage calculates decentering aberration using a decentering aberration coefficient of the group identified in the first stage, and compares a decentering aberration that is obtained by the calculation with actual decentering aberration. A third stage identifies a third order aberration coefficient that makes a major contribution to increased centering error sensitivity when it is determined as the result of the comparison in the second stage that there is good agreement between the decentering aberration obtained by the calculation and the actual decentering aberration. A fourth stage minimizes the third order aberration coefficient identified in the third stage. A fifth stage restores an aberration balance that varied as a result of the design in the fourth stage, so that overall performance is maintained at a level equivalent to the condition before the design in the fourth stage.

11 Claims, 20 Drawing Sheets

(W) FNO=4.60
— d
---- SC
-0.5   0.5
SPHERICAL SINE
ABERRATION CONDITION

Y'=17.3
---- DM
— DS
-0.5   0.5
ASTIGMATISM

Y'=17.3
-5.0   5.0
DISTORTION %

(M) FNO=5.22
— d
---- SC
-0.5   0.5
SPHERICAL SINE
ABERRATION CONDITION

Y'=17.3
---- DM
— DS
-0.5   0.5
ASTIGMATISM

Y'=17.3
-5.0   5.0
DISTORTION %

(T) FNO=5.80
— d
---- SC
-0.5   0.5
SPHERICAL SINE
ABERRATION CONDITION

Y'=17.3
---- DM
— DS
-0.5   0.5
ASTIGMATISM

Y'=17.3
-5.0   5.0
DISTORTION %

FNO=4.60
(W)
— d
---- SC
-0.5  0.5
SPHERICAL SINE
ABERRATION CONDITION

Y'=17.3
---- DM
— DS
-0.5  0.5
ASTIGMATISM

Y'=17.3
-5.0  5.0
DISTORTION %

FNO=5.22
(M)
— d
---- SC
-0.5  0.5
SPHERICAL SINE
ABERRATION CONDITION

Y'=17.3
---- DM
— DS
-0.5  0.5
ASTIGMATISM

Y'=17.3
-5.0  5.0
DISTORTION %

FNO=5.80
(T)
— d
---- SC
-0.5  0.5
SPHERICAL SINE
ABERRATION CONDITION

Y'=17.3
---- DM
— DS
-0.5  0.5
ASTIGMATISM

Y'=17.3
-5.0  5.0
DISTORTION %

FNO=4.10
(W)
— d
---- SC
-0.1　0.1
SPHERICAL SINE
ABERRATION CONDITION

Y'=1.8
---- DM
— DS
-0.1　0.1
ASTIGMATISM

Y'=1.8
-5.0　5.0
DISTORTION %

FNO=4.75
(M)
— d
---- SC
-0.1　0.1
SPHERICAL SINE
ABERRATION CONDITION

Y'=1.8
---- DM
— DS
-0.1　0.1
ASTIGMATISM

Y'=1.8
-5.0　5.0
DISTORTION %

FNO=5.78
(T)
— d
---- SC
-0.1　0.1
SPHERICAL SINE
ABERRATION CONDITION

Y'=1.8
---- DM
— DS
-0.1　0.1
ASTIGMATISM

Y'=1.8
-5.0　5.0
DISTORTION %

FNO=5.70
(W)
— d
---- SC
-0.5   0.5
SPHERICAL SINE
ABERRATION CONDITION

Y'=17.3
---- DM
—— DS
-0.5   0.5
ASTIGMATISM

Y'=17.3
-5.0   5.0
DISTORTION %

FNO=8.00
(M)
— d
---- SC
-0.5   0.5
SPHERICAL SINE
ABERRATION CONDITION

Y'=17.3
---- DM
—— DS
-0.5   0.5
ASTIGMATISM

Y'=17.3
-5.0   5.0
DISTORTION %

FNO=10.00
(T)
— d
---- SC
-0.5   0.5
SPHERICAL SINE
ABERRATION CONDITION

Y'=17.3
---- DM
—— DS
-0.5   0.5
ASTIGMATISM

Y'=17.3
-5.0   5.0
DISTORTION %

(W)

(M)

(T)

FNO=4.10
(W)
—— d
---- SC
-0.5　0.5
SPHERICAL SINE
ABERRATION CONDITION

Y'=17.3
---- DM
—— DS
-0.5　0.5
ASTIGMATISM

Y'=17.3
-5.0　5.0
DISTORTION %

FNO=5.20
(M)
—— d
---- SC
-0.5　0.5
SPHERICAL SINE
ABERRATION CONDITION

Y'=17.3
---- DM
—— DS
-0.5　0.5
ASTIGMATISM

Y'=17.3
-5.0　5.0
DISTORTION %

FNO=5.80
(T)
—— d
---- SC
-0.5　0.5
SPHERICAL SINE
ABERRATION CONDITION

Y'=17.3
---- DM
—— DS
-0.5　0.5
ASTIGMATISM

Y'=17.3
-5.0　5.0
DISTORTION %

FNO=4.60
(W)
— d
---- SC
-0.5  0.5
SPHERICAL SINE
ABERRATION CONDITION

Y'=17.3
---- DM
— DS
-0.5  0.5
ASTIGMATISM

Y'=17.3
-5.0  5.0
DISTORTION %

FNO=5.22
(M)
— d
---- SC
-0.5  0.5
SPHERICAL SINE
ABERRATION CONDITION

Y'=17.3
---- DM
— DS
-0.5  0.5
ASTIGMATISM

Y'=17.3
-5.0  5.0
DISTORTION %

FNO=5.80
(T)
— d
---- SC
-0.5  0.5
SPHERICAL SINE
ABERRATION CONDITION

Y'=17.3
---- DM
— DS
-0.5  0.5
ASTIGMATISM

Y'=17.3
-5.0  5.0
DISTORTION %

OPTICAL SYSTEM DESIGN AND PRODUCTION METHOD

This disclosure is based upon Japanese Application Nos. 09-184110, 09-184114, 09-184120 and 09-184130, the contents of which are incorporated herein by reference.

FIELD OF THE INVENTION

The present invention relates to the design and production of optical systems, and more particularly to a designing method and production method for an optical system with low centering error sensitivity, having features applicable to every kind of optical system (including, for example, an imaging optical system for a camera).

DESCRIPTION OF THE RELATED ART

In the production of an optical system, decentering aberration occurs if centering errors, such as parallel decentering and tilt decentering, occur in a portion of the optical system. The sensitivity of the decentering aberration to centering errors is one factor that makes the production of optical systems difficult. Conventionally, in an optical system designed with low centering error sensitivity, the power of a lens group that presents a centering problem is reduced to reduce the error sensitivity contributed by the power ratio. On the other hand, Japanese Patent Unexamined Publication No. 8-220435 proposes a zoom lens in which, in order to reduce the sensitivity of an aspherical surface to decentering, the size relationship between the reference radius of curvature of the aspherical surface and deviation is defined so that the image plane tilting that occurs due to the relative decentering between the lens surfaces of a bi-aspherical lens is held below a predetermined value.

In the former optical system, the centering error sensitivity cannot be appreciably reduced without significantly changing the power. On the other hand, in the latter zoom lens, only the relative decentering between the lens surfaces of the bi-aspherical lens is defined, but the error sensitivity is not always high for all aspherical surfaces. For example, in the case of an aspherical surface with a large radius of curvature and a small deviation, its error sensitivity to decentering is low; conversely, in the case of a spherical surface with a small radius of curvature, its error sensitivity to decentering is high. Accordingly, reducing only the error sensitivity of the bi-aspherical lens to decentering does not always lead to the reduction of the error sensitivity of the entire optical system to decentering.

SUMMARY OF THE INVENTION

An object of the present invention is to provide an optical system design method that solves the above problem.

Another object of the present invention is to define the mechanism of decentering aberration by analyzing the aberration occurring due to decentering, and to provide a method for designing an optical system in which decentering aberration resulting from manufacturing errors is held to a minimum.

A further object of the present invention is to provide a method for producing an optical system having good optical performance.

The optical system design method of the present invention, which achieves the above objects, determines in an optical system a specific group having a relatively high decentering aberration error sensitivity to parallel decentering and tilt decentering and consisting of at least one lens surface, and minimizes the absolute value of the decentering aberration coefficient of the specific group.

Further, the design method of the present invention, which achieves the above objects, comprises: a first stage for identifying in an optical system a group consisting of at least one lens surface and presenting a problem in production because of a relatively high centering error sensitivity; a second stage for calculating decentering aberration using a decentering aberration coefficient of the group identified in the first stage, and for comparing the decentering aberration obtained by the calculation with actual decentering aberration; a third stage for identifying a third order aberration coefficient which makes a major contribution to increased centering error sensitivity when it is determined as the result of the comparison in the second stage that there is good agreement between the decentering aberration obtained by the calculation and the actual decentering aberration; a fourth stage for minimizing the third order aberration coefficient identified in the third stage; and a fifth stage for restoring an aberration balance that varied as a result of the design in the fourth stage so that overall performance is maintained at a level equivalent to that in the condition before the design changes in the fourth stage.

The invention itself, together with further objects and attendant advantages, will be understood by reference to the following detailed description taken in conjunction with the accompanying drawings.

BRIEF DESCRIPTION OF THE DRAWINGS

In the following description, like parts are designated by like reference numerals throughout the several drawings.

DETAILED DESCRIPTION OF THE PREFERRED EMBODIMENTS

An optical system and its production method embodying the present invention will be described below with reference to the accompanying drawings. As a preface, a description will be given of the derivation of decentering aberration from aberration coefficients and the characteristics of decentering aberration as viewed in terms of the aberration coefficients. Further information regarding the derivation of these coefficients is disclosed in *Theory of Aberration* by Yoshiya Matsui, Japan Opto Mechatronics Association, the disclosure of which is incorporated herein by reference.

1. Derivation Of Decentering Aberration From Aberration Coefficients

If a portion of an optical system (for example, a surface, a lens, or a lens group) is tilted or positionally displaced in a direction perpendicular to the optical axis (that is, if a centering error such as parallel decentering or tilt decentering occurs), optical performance degrades because of the decentering. This is because aberration occurs in the optical system due to the decentering. The error sensitivity of decentering aberration becomes one factor that makes the production of the optical system difficult. There are two principal classes of decentering aberration: asymmetric aberration and axial coma aberration.

Asymmetric aberration is a phenomenon in which the image plane is asymmetrical about the optical axis. That is, the position of the image plane is different between positive and negative angles of field because of the occurrence of decentering. Usually, asymmetric aberration is evaluated in terms of the mean value of differences at the paraxial image plane position of principal rays at a field angle of about 70% of the image plane diagonal. On the other hand, axial coma aberration is a phenomenon in which the axial luminous flux becomes asymmetrical about the principal ray. In an optical system which should be rotationally symmetric, usually point images on the axis are also rotationally symmetric. However, if decentering occurs in a portion of the optical system, the symmetry collapses and the imaging performance significantly degrades. Usually, axial coma aberration is evaluated in terms of the difference between the axial principal ray position and the mean ray position of the upper zonal ray and lower zonal ray on the axis of diameter about 70% of the axial effective diameter. In the following discussion, aberrations in an optical system containing decentering are examined and the above two decentering aberrations are derived using aberration coefficients.

Figure 1A:
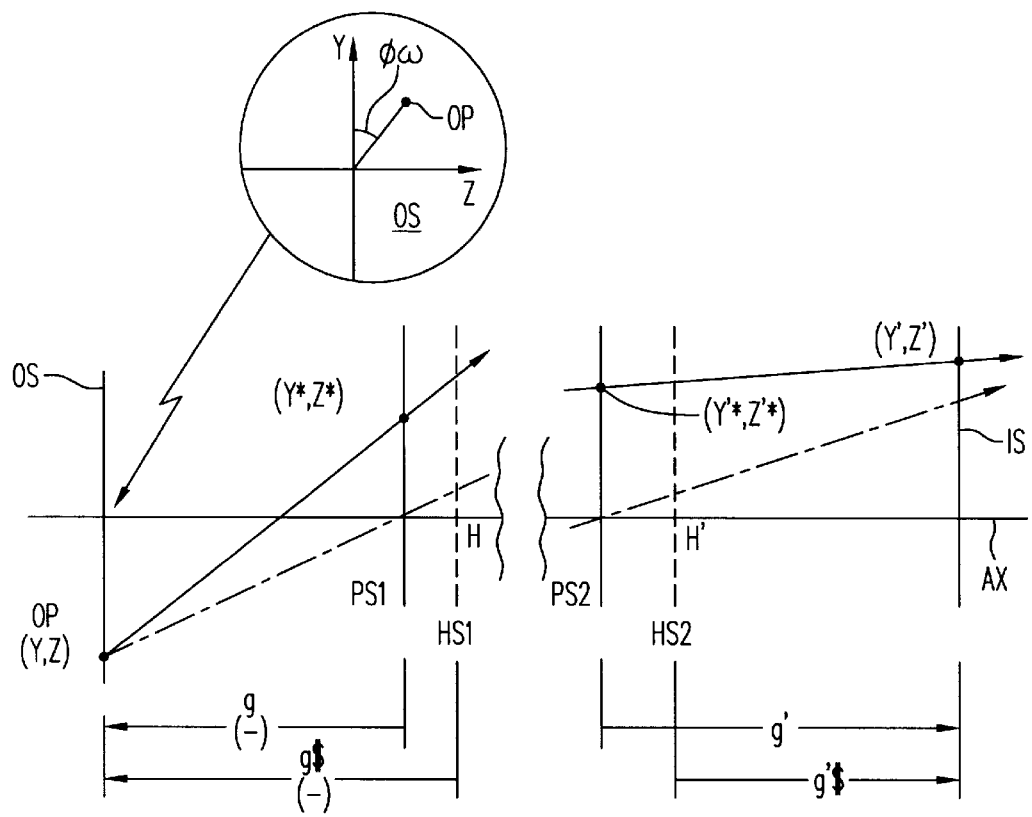
FIG. 1 is a diagram for explaining the relationship between an optical system and coordinates and aberration coefficients.
Figure 1B:
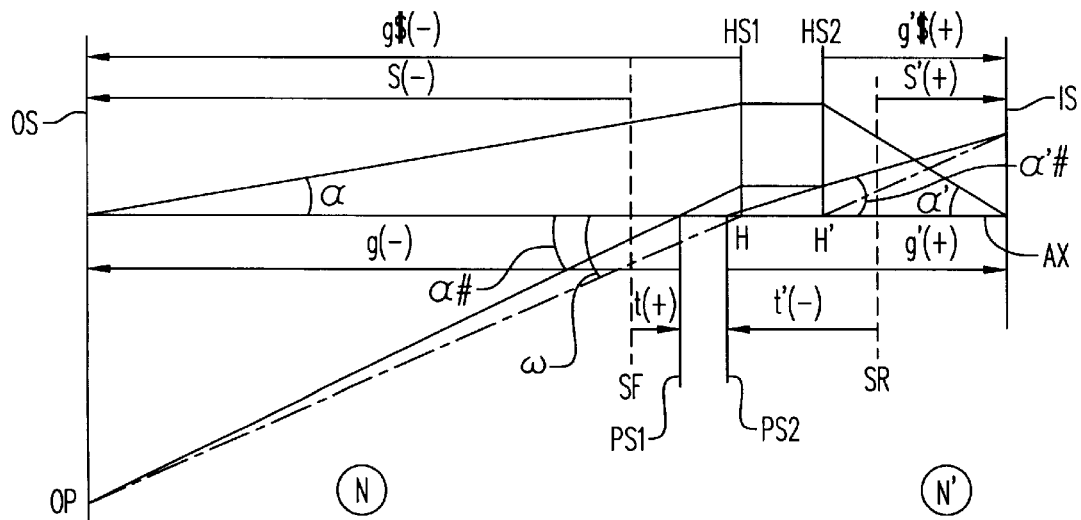

A. Third Order Aberration Expansion Formula For Optical System Containing Decentering FIG. 1 shows the relationship between a base optical system and coordinate points in space. In FIGS. 1(A) and 1(B), OS is the object plane, IS is the image plane, PS1 is the entrance pupil plane, PS2 is the exit pupil plane, HS1 is the principal plane on the object side (H: Principal point on the object side), HS2 is the principal plane on the image side (H': Principal point on the image side), SF is the front surface of the optical system, SR is the rear surface of the optical system, N is the refractive index in the object space, and N' is the refractive index in the image space.

The optical axis of the optical system in the absence of decentering is taken as the reference axis AX; with this axis as the X axis, the Y and Z axes are drawn perpendicular to the X axis. Then, the coordinates of the object point OP are written as (Y, Z) and the coordinates of the entrance point of a ray on the entrance pupil plane PS1 as (Y*, Z*), and their corresponding coordinates in the image space are designated with a prime suffix (i.e. an apostrophe). To expand the lateral aberration of the ray on the image plane IS into a third order power series, the coordinates of the object point OP and the entrance point of the ray on the entrance pupil plane PS1 are defined using the following polar coordinates.

$$\tan T \cdot \cos\phi\omega \equiv Y/g\$ \qquad (1A)$$

$$\tan T \cdot \sin\phi\omega \equiv Z/g\$ \qquad (1B)$$

$$R \cdot \cos\phi_R \equiv (g\$/g) \cdot Y^* \qquad (2A)$$

$$R \cdot \sin\phi_R \equiv (g\$/g) \cdot CZ^* \qquad (2B)$$

As can be seen from FIG. 1, reference characters g and g$ represent the distances to the object plane OS from the entrance pupil plane PS1 and the object side principal plane HS1, respectively, while ω is the angle that the line joining the object point OP to the object side principal point H makes with the reference axis AX, $\phi\omega$ being its azimuth, and R is the entrance pupil radius as imaged on the object side principal plane HS1, $\phi_R$ being its azimuth. Since "'" denotes the image space and "#" the off-axis principal ray, a is the slope angle of a paraxial marginal ray as converted to the angle in the object space, α# is the slope angle of an off-paraxial marginal ray as converted to the angle in the object space, α' is the slope angle of the paraxial marginal ray as converted in the image space, and α'# is the slope angle of the off-paraxial marginal ray as converted to the angle in the image space.

Assuming that the optical system consists of k elements, when the lateral aberration in the presence of decentering is expanded into a power series, the lateral aberration ΔY', ΔZ' is expressed by the following equations (3A) and (3B) (where β represents lateral magnification). The third order aberration coefficients corresponding to spherical aberration, coma aberration, astigmatism, Petzval sum, and distortion are I, II, III, P, and V, respectively, the index A is the element number, $\alpha'=\alpha'_k$, and $\alpha'\#=\alpha'\#_k$. Here, the notation using the summation sign Σ is given in the example shown below (the same applies hereinafter).

$$\sum_{\mu=1}^{k} : (\mu = 1 \to k)\Sigma$$

$$\begin{aligned}
\Delta Y' &\equiv Y' - \beta \cdot Y \\
&= -[1/(2 \cdot \alpha')] \cdot \{(N \cdot \tan\omega)3 \cdot \cos\phi\omega \cdot (\mu = 1 \to k)\Sigma v\mu + \\
&\quad R \cdot (N \cdot \tan\omega 2 \cdot [2 \cdot \cos(\phi R - \phi\omega) \cdot (\mu = 1 \to k)\Sigma III\mu + \\
&\quad \cos\phi R \cdot (\mu = 1 \to k)\Sigma III\mu + P\mu)] + \\
&\quad R2 \cdot (N \cdot \tan\omega) \cdot [2 \cdot \cos\phi R \cdot \cos(\phi R - \phi\omega) + \cos\phi\omega] \cdot \\
&\quad (\mu = 1 \to k)\Sigma III\mu + R3 \cdot \cos\phi R \cdot (\mu = 1 \to k)\Sigma I\mu\} + \\
&\quad \{\text{Added term}(Y \text{ component}) \text{due to decentering}\}
\end{aligned} \qquad (3A)$$

-continued $$\Delta z' \equiv z' - \beta \cdot z -$$  (3B)
$$[1/(2 \cdot \alpha;)] \cdot \{(N \cdot \tan\omega)3 \cdot \sin\phi\omega \cdot (\mu = 1 \to k)\Sigma V\mu +$$
$$R \cdot (N \cdot \tan\omega)2 \cdot [2 \cdot \cos(\phi R - \phi\omega) \cdot \sin\omega \cdot$$
$$(\mu = 1 \to k)\Sigma III\mu + \sin\phi R \cdot (\mu = 1 \to k)\Sigma(III\mu + P\mu)] +$$
$$R2 \cdot (N \cdot \tan\omega) \cdot [2 \cdot \sin\phi R \cdot \cos(\phi R - \phi\omega) + \sin\phi\omega] \cdot$$
$$(\mu = 1 \to k)\Sigma II\mu + R3 \cdot \sin\phi R \cdot (\mu = 1 \to k)\Sigma I\mu\} +$$
$$\{\text{Added term}(Z \text{ component}) \text{due to decentering}\}$$

In each of the above equations (3A) and (3B), the term contained within the first pair of curved brackets { } on the right-hand side is the term expressing the intrinsic aberration of the optical system in the absence of decentering; when there is decentering, the aberration term arising from the decentering is added to it. When an arbitrary element (which may be a single-surfaced element or a composite element containing a plurality of surfaces) in the optical system is decentered, the decentering is either "parallel decentering" wherein the element is displaced in a direction perpendicular to the reference axis AX of the optical system or "tilt decentering" wherein the element is tilted with respect to the reference axis AX. The effect of any of these decenterings is expressed as the added term at the end of the right-hand side of the above equations (3A) and (3B).

B. Derivation Of Parallel Decentering Aberration Coefficients

Figure 2A:
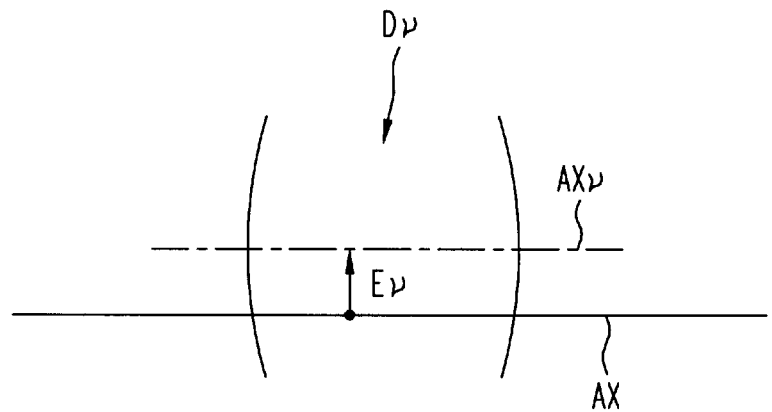
FIG. 2 is a diagram for explaining the derivation of a decentering aberration coefficient.

FIG. 2(A) shows the condition in which an arbitrary υ-th element (hereinafter called the υ-th element, whose optical axis is denoted by AXυ) in the optical system, Dυ, is parallel-decentered by a trace amount Eυ along the Y direction, which is perpendicular to the reference axis AX of the optical system. The added terms ΔY(Eυ) and ΔZ(Eυ) in the aberration coefficients due to this parallel decentering are expressed by the following equations (4A) and (4B).

$$\Delta Y(Ev) = [Ev/(2 \cdot \alpha'k)]\{(\Delta E)v +$$  (4A)
$$(N \cdot \tan\omega)2 \cdot [(2 + \cos 2\phi\omega) \cdot (VE1)v - (VE2)v] +$$
$$2 \cdot R \cdot (N \cdot \tan\omega) \cdot [(2 \cdot \cos(\phi R - \phi\omega) +$$
$$\cos(\phi R + \phi\omega)) \cdot (IIIE)v + \cos\phi R \cdot \cos\phi\omega \cdot (PE)v] +$$
$$R2 \cdot (2 + \cos 2\phi R) \cdot (IIE)v\}$$

$$\Delta Z(Ev) = -[Ev/(2 \cdot \alpha'k)] \cdot \{(N \cdot \tan\omega)2 \cdot \sin 2\phi\omega \cdot (VE1)v +$$  (4B)
$$2 \cdot R \cdot (N \cdot \tan\omega) \cdot [\sin(\phi R + \phi\omega) \cdot (IIIE)v +$$
$$\sin\phi R \cdot \cos\phi\omega (PE)v] +$$
$$R2 \cdot \sin 2\phi R \cdot (IIE)v\}$$

Here, the decentering aberration coefficients are defined by the following equations (4C) to (4H).

$$(\Delta E)v = -2 \cdot (\alpha'v - \alpha v)$$  (4C)

$$(VE1)v = \{[\alpha'v \cdot (\mu = v + 1 \to k)\Sigma v\mu] -$$  (4D)
$$[\alpha v \cdot (u = v \to k)\Sigma v\mu]\} - \{[\alpha'\#v \cdot$$
$$(\mu = v + 1 \to k)\Sigma III\mu] - [\alpha\#v \cdot (\mu = v \to k)\Sigma III\mu]\}$$

$$(VE2)v = [\alpha'\#v \cdot (\mu = v + 1 \to k)\Sigma P\mu] -$$  (4E)
$$[\alpha\#v \cdot (\mu = v \to k)\Sigma P\mu]$$

$$(IIIE)v = \{[\alpha'\#v \cdot (\mu = v + 1 \to k)\Sigma III\mu] -$$  (4E)
$$[\alpha v \cdot (\mu = v \to k)\Sigma III\mu]\} -$$
$$\{[\alpha'\#v \cdot (\mu = v + 1 \to k)\Sigma II\mu] -$$
$$[\alpha\#v \cdot (\mu = v \to k)\Sigma IIv]$$

$$(PE)v = \{[\alpha'v \cdot (\mu = v + 1 \to k)\Sigma P\mu] - [\alpha v \cdot (\mu = v \to k)\Sigma P\mu]$$  (4G)

$$(IIE)v = \{[\alpha'v \cdot (\mu = v + 1 \to k)\Sigma II\mu] -$$  (4H)
$$[\alpha v \cdot (\mu = v \to k)\Sigma II\mu]\} -$$
$$\{[\alpha'\#v \cdot (\mu = v + 1 \to k)\Sigma I\mu] -$$
$$[\alpha\#v \cdot (\mu = v \to k)\Sigma I\mu]$$

where:
(ΔE)υ represents prismatic action (lateral displacement of image),
(VE1)υ, (VE2)υ represent rotationally asymmetrical distortion,
(IIIE)υ, (PE)υ represent rotationally asymmetrical astigmatism and image surface tilting, respectively, and
(IIE)υ represents rotationally asymmetrical coma aberration also appearing on the axis.

The decentering aberration coefficients of the above equations (4C) to (4H) express the effects of the decentering, and represent the image defects described below. Further, as can be seen from the equations (4A) and (4B), since the amount of decentering, Eu, applies to the entire right-hand side, the amount of aberration occurring due to the decentering is proportional to Eυ.

Equations (4A) to (4H) show the case in which only the υ-th element υD is parallel-decentered; here, assuming the υ-th element υD consists of a single surface, when a plurality of surfaces i to j are parallel-decentered (that is, when the decentered lens group consists of the i-th to j-th surfaces), the amount of decentering of each of the decentered surfaces i to j is equal, so that the aberration coefficient can be treated as a sum as shown by equation (ΔE)i~j=(υ= i→j)Σ[-2·(α'υ-αυ)]. Then, from α'υ=αυ+1, equation (ΔE) i~j=-2·(α'j-αi) is obtained.

For other aberration coefficients also, an intermediate term in Σ vanishes. For example, for PE $$(PE)i \sim j = (v = i \to j\Sigma[\alpha'v \cdot (\alpha'v \cdot (\mu = v + 1 \to k)\Sigma P\mu -$$
$$\alpha v \cdot (\mu = v \to k)\Sigma P\mu]$$
$$= \alpha'j \ldots (\mu = j + 1 \to k)\Sigma P\mu - \alpha i \cdot (\mu = i \to k)\Sigma P\mu]$$
$$= \alpha'j - \alpha i) \ldots (\mu = j + 1 \to k)\Sigma P\mu - \alpha i \cdot (\mu = i \to j)\Sigma P\mu$$
$$= \alpha'j - \alpha i) \ldots (P)R - \alpha i \cdot (P)D$$

where
(P)R=($\mu$=j+i→k)Σp$\mu$ is the sum of the aberration coefficients P of a group (hereinafter sometimes called the "image side group") consisting of all the lens surfaces located on the image side with respect to the decentered lens group (hereinafter sometimes called the "decentered group"), and
(P)D=($\mu$=i+j)Σp$\mu$ is the sum of the aberration coefficients P of the decentered group. Accordingly, Σ of the decentering aberration coefficients can be expressed by the sum of the aberration coefficients of the image side group {expressed by ( )R} and the sum of the aberration coefficients of the decentered group {expressed by ( )D}.

[Asymmetric aberration]

Asymmetric aberration will now be explained. From equations (4A) and (4B), the meridional of astigmatism is [φR=0 (first order term of R) in ΔY')]xg'$k, and the sagittal is [φR=π/2 (first order term of R) in ΔZ')]xg'$k. Accordingly, meridional asymmetry $\Delta M\upsilon$ is expressed by the following equation (5A). Here, from $\alpha'k=Nk/g'$k$ and $\phi\omega=0$, equation (5A) is obtained.

$$\Delta M\nu = -[E\nu \cdot g'\$k/(2 \cdot \alpha'k)] \cdot 2 \cdot (N \cdot \tan\omega) \cdot \quad (5A)$$
$$[(2 \cdot \cos(\phi\omega) + \cos(\phi\omega)) \cdot (IIIE)\nu + \cos(\phi\omega) \cdot (PE)\nu]$$

$$\Delta M\nu = -E\nu \cdot g'\$k2/N'k) \ldots (N \cdot \tan\omega) \cdot [3 \cdot (IIIE)\nu + (PE)\nu] \quad (5B)$$

If it is assumed that the object point OP is at infinity, since $g'\$k \rightarrow FL$ (FL: Focal length of the entire system) and $N\cdot\tan\omega=Y'/FL$ (Y': Image height), equation (5C) expressing meridional asymmetry $\Delta M''\upsilon$ is obtained. In like manner, equation (5D) expressing sagittal asymmetry $\Delta S''\upsilon$ is obtained.

$$\Delta M''\mu = -E\nu \cdot FL \cdot Y' \cdot [3 \cdot (IIIE)\nu + (PE)\nu] \quad (5C)$$

$$\Delta S''\nu = -E\nu \cdot FL \cdot Y' \cdot [(IIIE)\nu + (PE)\nu] \quad (5D)$$

The above has dealt with the case in which the $\upsilon$-th surface is decentered. When the lens group (consisting of the i-th to the j-th surface) is decentered, $\Sigma$ is taken and equations (5E) and (5F) expressing meridional asymmetry $(\Delta M'')i\sim j$ and sagittal asymmetry $(\Delta S'')i\sim j$ are obtained. Here, the amount of decentering is denoted by E.

$$(\Delta M'')i\sim j = -E \cdot FL \cdot Y' \cdot [3 \cdot (IIIE)i\sim j + (PE)i\sim j] \quad (5E)$$

$$(\Delta S'')i\sim j = -E \cdot FL \cdot Y' \cdot [(IIIE)i\sim j + (PE)i\sim j] \quad (5F)$$

However, the decentering aberration coefficients of the block (lens group) are expressed by the following equations (5G) and (5H) for the meridional and the sagittal, respectively.

$$[3 \cdot (IIIE)i \sim j + (PE)i \sim j] = (\alpha'j - \alpha i) \cdot [3 \cdot (III)R + (P)R] - \quad (5G)$$
$$\alpha i \cdot [3 \cdot (III)D + (P)D] - (\alpha'\#j - \alpha i) \cdot [3 \cdot (II)R] + \alpha\#i \cdot [3 \cdot (II)D]$$

$$[(IIIE)i \sim j + (PE)i \sim j] = (\alpha'j - \alpha i) \cdot [(III)R + (P)R] - \quad (5H)$$
$$\alpha i \cdot [(III)D + (P)D] - (\alpha'\#j - \alpha\#i) \cdot [(II)R] + \alpha\#i \cdot [(II)D]$$

[Axial coma aberration]

Next, axial coma aberration will be explained. As previously described, axial coma aberration is the mean value of the differences of the upper and lower axial rays with respect to the principal ray position. Accordingly, from the upper coma $(\Delta YU)\upsilon$ and lower coma $(\Delta YL)\upsilon$ due to the decentering $\{(6A)$ and $(6B)\}$, the axial coma aberration $(AXCM)\upsilon$ shown by equation (6C) is derived.

$$(\Delta YU)\nu = (\Delta Y)(\omega = 0, \phi R = 0) - (\Delta Y)(\omega = 0, R = 0) \quad (6A)$$
$$= -[E\nu/(2 \cdot \alpha'k)] \cdot R2 \cdot 3 \cdot (IIE)\nu$$

$$(\Delta YL)\nu = (\Delta Y)(\omega = 0, \phi R = \pi) - (\Delta Y)(\omega = 0, R = 0) \quad (6B)$$
$$= -[E\nu/(2 \cdot \alpha'k)] \cdot R2 \cdot 3 \cdot (IIE)\nu$$

$$(AXCM)\nu = [(\Delta YU)\nu + (\Delta YL)\nu]/2 \quad (6C)$$
$$= -[E\nu/(2 \cdot \alpha'k)] \cdot R2 \cdot 3 \cdot (IIE)\nu$$

Assuming the object point is at infinity, then $1/\alpha'k \rightarrow -FL$. Further, the relationship between R and FNO (F number of the entire system) is expressed by equation $R=[FL/(2\cdot FNO]\times\kappa$, (where $\kappa$: pupil division ratio, usually 0.7). Accordingly, the axial coma aberration $(AXCM'')\upsilon$ is expressed by equation (6D).

$$(AXCM'')\upsilon = E\nu \cdot (3 \cdot \kappa 2 \cdot FL3)/(8 \cdot FNO2) \cdot (IIE)\nu \quad (6D)$$

The above has dealt with the case in which the $\upsilon$-th surface is decentered. When the lens group (consisting of the i-th to the j-th surface) is decentered, $\Sigma$ is taken and equation (6E) is obtained. However, the decentering aberration coefficient of the block is expressed by equation (6F).

$$(AXCM'')i\sim j = E \cdot [(3' \cdot \kappa 2 \cdot FL3)/(8 \cdot FNO2)] \cdot (IIE)i\sim j \quad (6E)$$

$$(IIE)i\sim j = \quad (6F)$$
$$(\alpha'j - \alpha i) \cdot (II)R - \alpha i \cdot (II)D - (\alpha'\#j - \alpha\#i) \cdot (I)R + \alpha\#i \cdot (I)D$$

C. Derivation Of Tilt Decentering Aberration Coefficients

Figure 2B:
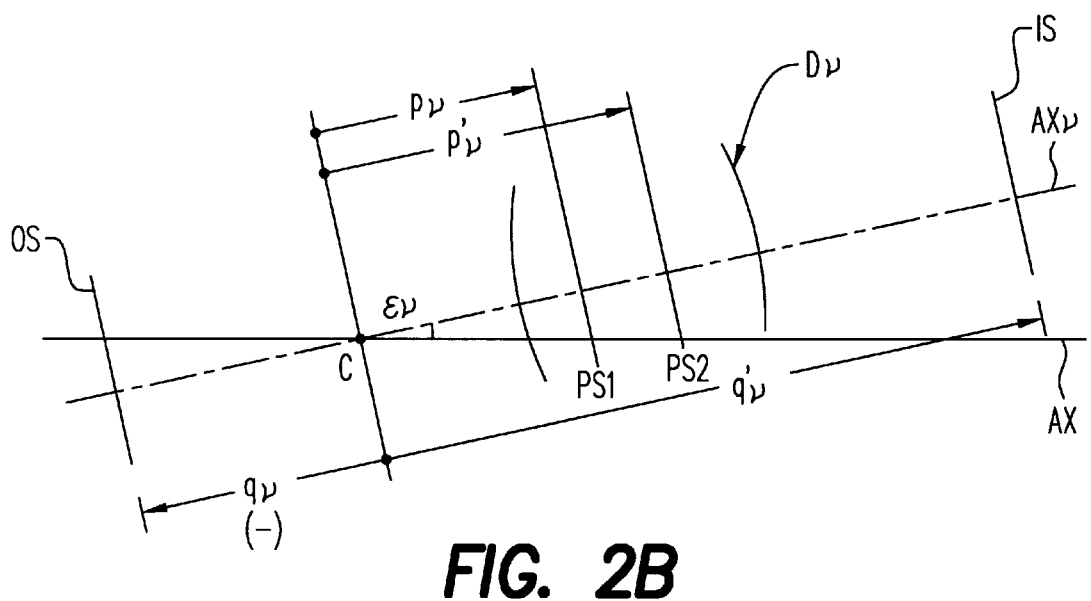

FIG. 2(B) shows the condition in which the $\upsilon$-th element is tilted about a point C by an angle $\Sigma\upsilon$ with respect to the reference axis AX of the optical system. The added terms $\Delta Y(\Sigma\upsilon)$ and $\Delta Z(\Sigma\upsilon)$ in the aberration coefficients due to the tilt decentering are expressed by the following equations (7A) and (7B). Here, the distances from the point C to the entrance pupil plane PS1 and object plane OS and also to their corresponding exit pupil plane PS2 and image plane IS are denoted by $p\upsilon$ and $q\upsilon$, and $p'\upsilon$, and $q'\upsilon$, respectively.

$$\Delta Y(\varepsilon\nu) = -[\varepsilon\nu/(2 \cdot \alpha'k)] \cdot \quad (7A)$$
$$\{(\Delta\varepsilon)\nu + (N \cdot \tan\omega)2 \cdot [(2 + \cos2\phi\omega) \cdot (V\varepsilon 1)\nu - (\nu\varepsilon 2)\nu] +$$
$$2 \cdot R \cdot (N \cdot \tan\omega) \cdot [(2 \cdot \cos(\phi R - \phi\omega) + \cos(\phi R + \phi\omega)) \cdot (III\varepsilon)\nu +$$
$$\cos\phi R \cdot \cos\phi\omega \cdot (P\varepsilon)\nu + R2 \cdot (2 + \cos2\phi R) \cdot (II\varepsilon)\nu\}$$

$$\Delta Z(\Sigma\nu) = \quad (7B)$$
$$-[\Sigma\nu/(2 \cdot \alpha'k)]\{(N \cdot \tan\omega)2 \cdot \sin2\phi\omega \cdot (V\varepsilon 1)\nu + 2 \cdot R \cdot (N \cdot \tan\omega) \cdot [$$
$$(\sin(\phi R + \phi\omega) \cdot (III\varepsilon)\nu + \sin\phi R \cdot \cos\phi\omega \cdot (P\varepsilon)\nu] +$$
$$R2 \cdot \sin2\phi R) \cdot (II\varepsilon)\nu\}$$

However, the decentering aberration coefficients are defined by the following equations (7C) to (7H).

$$(\Delta\varepsilon)\nu = -2 \cdot (\alpha'\nu \cdot q'\nu - \alpha\nu \cdot q\nu) \quad (7C)$$

$$(V\varepsilon 1)\nu = \quad (7D)$$
$$\{[\alpha'\nu \cdot q' \cdot \nu \cdot (\mu = \nu + 1 \rightarrow k)\Sigma\nu\mu] - [\alpha\nu \cdot q\nu \cdot (\mu = \nu \rightarrow k)\Sigma\nu\mu]\} =$$
$$\{[\alpha'\#\nu \cdot q' \cdot \nu \cdot (\mu = \nu + 1 \rightarrow k)\Sigma III\mu] - \{[\alpha'\#\nu \cdot p$$
$$\nu \cdot (\mu = \nu \rightarrow k)\Sigma III\mu]\} + \cdot (\alpha'\#\nu/N'\nu) - (\alpha\#\nu/N\nu)]$$

$$(\nu\varepsilon 2)\nu = \{[\alpha'\#\nu \cdot p'\nu \cdot (\mu = \nu + 1 \rightarrow \kappa)\Sigma p\mu] - \quad (7E)$$
$$\{[\alpha'\#\nu \cdot p\nu \cdot (\mu = \nu \rightarrow k)\Sigma p\mu]\} + [(\alpha'\#\nu/N'\nu) - (\alpha\#\nu/N\nu)]$$

$$(III\varepsilon)\nu = \{[\alpha'\nu \cdot q' \cdot \nu \cdot (\mu = \nu + 1 \rightarrow k)\Sigma III\mu] - \quad (7F)$$
$$\{[\alpha\nu \cdot q\nu \cdot (\mu = \nu \rightarrow k)\Sigma III\mu]\} +$$
$$\{[\alpha'\#\nu \cdot p'\nu \cdot (\mu = \nu + 1 \rightarrow k)\Sigma II\mu][\alpha\#\nu \cdot p\nu \cdot (\mu = \nu \rightarrow k)\Sigma II\mu]\}$$

$$(P\varepsilon)\nu = \quad (7G)$$
$$\{[\alpha'\nu \cdot q' \cdot \nu \cdot (\mu = \nu + 1 \rightarrow k)\Sigma p\mu] - [\alpha\nu \cdot q\nu \cdot (\mu = \nu \rightarrow k)\Sigma\nu\mu] +$$
$$(\alpha'\#\nu/N'\nu) - (\alpha\nu/N\nu)]$$

$$(II\varepsilon)\nu = \quad (7H)$$
$$\{[\alpha'\nu \cdot q' \cdot \nu \cdot (\mu = \nu + 1 \rightarrow k)\Sigma II\mu] - [\alpha\nu \cdot q\nu \cdot (\mu = \nu \rightarrow k)\Sigma II\mu]\} =$$
$$\{[\alpha'\#\nu \cdot p'\nu \cdot (\mu = \nu + 1 \rightarrow \kappa)\Sigma I\mu] - \{[\alpha\#\nu \cdot p\nu \cdot (\mu = \nu \rightarrow \kappa)\Sigma I\mu]\}$$

For the case of tilt decentering also, as for parallel decentering, consider the case of taking $\Sigma$. Suppose the decentered lens group consists of the i-th to the j-th surface. Then, for example, for $P\epsilon$ $$(P\varepsilon)i\sim j = (\nu = i \rightarrow j)\Sigma$$
$$\{\alpha'\nu \cdot q'\nu \cdot (\mu = \nu + 1 \rightarrow \kappa)\Sigma P\mu - \alpha\nu \cdot q\nu \cdot (\mu = \nu \rightarrow k)\Sigma P\mu] +$$

-continued $$[(\alpha'v/N'v) - (\alpha v/Nv)]\} = \alpha' j \cdot q' j \cdot (\mu = j+1 \to k)\Sigma P\mu -$$

$$\alpha i \cdot qi \cdot (\mu = i \to k)\Sigma P\mu + (v = i \to j)\Sigma[(\alpha'v/N'v) - (\alpha v/Nv)] =$$

$$(\alpha' j \cdot q' j - \alpha i \cdot qi) \cdot (\mu = j+1 \to k)\Sigma P\mu -$$

$$\alpha i \cdot qi \cdot (\mu = i \to j)\Sigma P\mu + [(\alpha' j/N' j) - (\alpha i/Ni)] =$$

$$(\alpha' j \cdot q' j - \alpha i \cdot qi) \cdot (P)R - \alpha i \cdot qi \cdot (P)D + [(\alpha' j/N' j) - (\alpha i/Ni)]$$

where (P)R=$(\mu=j+i \to k)\Sigma P\mu$: Sum of the aberration coefficients P of the image side group, (P)D=$(\mu=i \to j)\Sigma P\mu$: Sum of the aberration coefficients P of the decentered group.

Accordingly, Σ of the decentering aberration coefficients can be expressed by the sum of the aberration coefficients of the image side group, the sum of the aberration coefficients of the decentered group, and a constant term.

[Asymmetric aberration]

Similar to the case of parallel decentering, asymmetric aberration is expressed by equations (8A) and (8B) for meridional asymmetry $(\Delta M'')i{\sim}j$ and sagittal asymmetry $(\Delta S'')i{\sim}j$, respectively. Here, the amount of decentering is denoted by $\epsilon$.

$$(\Delta M'')i{\sim}j = -\epsilon \cdot FL \cdot Y' \cdot [3 \cdot (III\epsilon)i{\sim}j + (P\epsilon)i{\sim}j] \quad (8A)$$

$$(\Delta S'')i{\sim}j = -\epsilon \cdot FL \cdot Y' \cdot [III\epsilon)i{\sim}j + (P\epsilon)i{\sim}j] \quad (8B)$$

However, the decentering aberration coefficients of the block are expressed by the following equations (8C) and (8D) for the meridional and the sagittal, respectively.

$$[3 \cdot (III\epsilon)i{\sim}j + (P\epsilon)i{\sim}j] = (\alpha' j \cdot q' j - \alpha i \cdot qi) \cdot [3 \cdot (III)R + (P)R] - \quad (8C)$$
$$\alpha i \cdot qi[3 \cdot (III)D + (P)D] - (\alpha'\#j \cdot p' j - \alpha\#i \cdot pi) \cdot [3 \cdot (II)R] +$$
$$\alpha\#i \cdot pi[3 \cdot (II)D] + [(\alpha' j/N' j) - (\alpha i/Ni)]$$

$$[(III\epsilon)i{\sim}j + (P\epsilon)i{\sim}j] = \quad (8D)$$
$$(\alpha' j \cdot q' j - \alpha i \cdot qi) \cdot [(III)R + (P)R] - \alpha i \cdot qi[(III)D + (P)D] =$$
$$(\alpha'\#j \cdot q' j - \alpha\#i \cdot pi) \cdot$$
$$[(III)R + \alpha\#i \cdot pi[(II)D] + [(\alpha' j/N' j) - (\alpha i/Ni)]$$

[Axial coma aberration]

Similar to the case of parallel decentering, axial coma is expressed by equation (9A). However, the decentering aberration coefficient of the block is expressed by equation (9B).

$$(AXCM'')i{\sim}j = \varepsilon \cdot [(3 \cdot \kappa 2 \cdot FL3)/(8 \cdot FNO2)] \cdot (IIE)i{\sim}j \quad (9A)$$

$$(II\varepsilon)i{\sim}j = (\alpha' j \cdot q' j - \alpha i \cdot qi) \cdot (II)R - \quad (9B)$$
$$\alpha i \cdot qi \cdot (II)D - (\alpha'\#j \cdot p' j - \alpha\#i \cdot pi) \cdot (I)R + \alpha\#i \cdot pi \cdot (I)D$$

2. Characteristics Of Decentering Aberration As Viewed In Terms Of Aberration Coefficients Decentering aberration is expressed by third order aberration coefficients, as described above. The relationship between the tendency of aberration degradation and the aberration coefficients, which can be found from it, will now be explained.

A. Decentering Aberration And Specification

From the previously described "Derivation of Decentering Aberration From Aberration Coefficients", the decentering aberration can generally be expressed by the following equation (10A).

[Decentering aberration]=[Amount of decentering][Specification term]X[Decentering aberration coefficient]  (10A)

Accordingly, the sensitivity to decentering aberration can be understood to some degree, as described in (1) and (2) below.

(1) Since asymmetric aberration increases proportionally to the focal length and image height, asymmetric aberration is unavoidable with a telephoto lens having a long focal length. Further, the image height with which to evaluate asymmetric aberration is different between a lens shutter camera and a single lens reflex camera; therefore, with the same focal length, the single lens reflex camera has a greater sensitivity to asymmetric aberration.

(2) Axial coma aberration is directly proportional to the cube of the focal length and inversely proportional to the square of the F number (FNO). Accordingly, in the case of a camera, such as a single lens reflex camera, in which the F number is substantially constant in zooming, the sensitivity to decentering aberration rapidly increases as the focal length becomes longer, since axial coma aberration varies as the cube of the focal length. On the other hand, in the case of a camera, such as a lens shutter camera, in which the F number increases with focal length, the sensitivity increases proportionally to the focal length. In recent high power zoom lenses for lens shutter cameras, the F number does not change as greatly as the focal length, so that the sensitivity to asymmetric aberration abruptly increases in the telephoto mode.

B. Characteristics Of Parallel Decentering Aberration

Generally, the parallel decentering aberration coefficient can be expressed by the following equation (11A).

$$(\text{Decentering aberration coefficient})i{\sim}j = \quad (11A)$$
$$(\alpha' j - \alpha i) \cdot (\text{Sum of aberration coefficients } 1)R -$$
$$\alpha i \cdot (\text{Sum of aberration coefficients } 1)D -$$
$$-(\alpha'\#j - \alpha\#i) \cdot (\text{Sum of aberration coefficients } 2)R -$$
$$+\alpha\#i \cdot (\text{Sum of aberration coefficients } 2)D$$

In equation (11A), the first and second terms concern the sum of aberration coefficients 1 and the third and fourth terms concern the sum of aberration coefficients 2. More specifically (For asymmetric aberration) . . .

(Aberration coefficient 1)=[Astigmatism coefficient (III)]+[Petzval sum (P)]

(Aberration coefficient 2)=[Coma aberration coefficient (II)]

(For axial coma aberration) . . .

(Aberration coefficient 1)=[Coma aberration coefficient (II)]

(Aberration coefficient 2)=[Spherical aberration coefficient (I)]

As shown above, the decentering aberration coefficient {equation (11A)} consists of four terms. Each term will be explained below.

[First term] . . . The coefficient $(\alpha' j - \alpha i)$ in the first term expresses the power of the decentered group, that is, how much an axial marginal ray is bent through the decentered group. In particular, when the decentered group is one located closest to the object side, the coefficient represents the power itself and is not so large, i.e., on the order of the negative second power of 10.

[Second term] . . . The coefficient $-\alpha i$ in the second term represents the angle of an axial marginal ray incident on the decentered group. Therefore, the value is not so large. Generally, the closer the decentered group is to the object side, the smaller the value; in particular, when the decentered group is one located closest to the object side, this term makes no contribution.

[Third term] . . . The coefficient $-(\alpha'\#j-\alpha\#i)$ in the third term expresses how much the principal ray is bent through the decentered group. Generally, the value increases as the decentered group is located farther away from the diaphragm. The value is on the order of the negative first power to the positive first power of 10.

[Fourth term] . . . The coefficient $\alpha\#i$ in the fourth term represents the angle of the principal ray incident on the decentered group. The initial value is $-1$. The value remains relatively unchanged, dropping at most down to about $-5$.

As for the relationship in magnitude between (Aberration coefficient 1) and (Aberration coefficient 2), (Aberration coefficient 1) is larger than (Aberration coefficient 2) by the first to second powers of 10. Further, (Aberration coefficient 2) is easier to change than (Aberration coefficient 1). Considering the above, generally the term that always has a large value is the fourth term. The other terms increase or decrease in terms of influence, depending on the position of the diaphragm and the power of the decentered group. Accordingly, in an ordinary optical system, it is desirable to minimize the fourth term. Depending on the configuration of the optical system, however, there can occur cases where it is desirable to minimize some other term.

C. Characteristics Of Tilt Decentering Aberration

Generally, the tilt decentering aberration coefficient can be expressed by the following equation (12A).

$$\begin{aligned}&\text{(Decentering aberration coefficient)} i \sim j = \quad (12A)\\ &(\alpha'j \cdot g'j - \alpha \cdot i \cdot gi) \cdot (\text{Sum of aberration coefficients 1}) R - \\ &\alpha i \cdot g \cdot (\text{Sum of aberration coefficients 1}) D - \\ &(\alpha'\#j \cdot p'j - a\#i \cdot pi) \cdot (\text{Sum of aberration coefficients 2}) R + \\ &\alpha\#i \cdot pi \cdot (\text{Sum of aberration coefficients 2})\\ &D + [(\alpha'j/N'j) - (\alpha i/Ni)]\\ &(\leftarrow \text{the constant term is for asymmetric aberration only})\end{aligned}$$

Since the tilt decentering aberration coefficient contains the object distance g from the rotational center c and the entrance pupil position p from the rotational center c, the above equation would require cumbersome calculations. Here, assuming the rotational center c to be the vertex of the object side surface of the decentered group, and the medium before and after the decentered group to be air, the following substitutions can be made.

$$\alpha'j \cdot g'j = \alpha'j \cdot s'j + \alpha'j \cdot TD - hj + \alpha'j \cdot TD \quad (12B)$$

$$\alpha i \cdot gi - hi \quad (12C)$$

$$\alpha'\#j \cdot p'j = h\#j + \alpha'\#j \cdot TD \quad (12D)$$

$$\alpha\#i \cdot pi = h\#1 \quad (12E)$$

where
hi: Height of paraxial marginal ray on the i-th surface
h#i: Height of off-paraxial principal ray on the i-th surface
hj: Height of paraxial marginal ray on the j-th surface
h#j: Height of off-paraxial principal ray on the j-th surface
TD: Core thickness of decentered group (that is, the axial distance from the i-th surface to the j-th surface)

Using the above equations (12B) to (12E), the tilt decentering aberration coefficients of equations (8C), (8D), and (9B) are rewritten as shown by the following equations (12F), (12G), and (12H).

$$\begin{aligned}&\text{(Meridional asymmetric aberration)} \quad (12F)\\ &[3 \cdot (III\varepsilon)i \sim j + (P\varepsilon)i \sim j] =\\ &(hj - hi + \alpha'j \cdot TD) \cdot [3 \cdot (III)R + (P)R] - hi \cdot [3 \cdot (III)D + (P)D] -\\ &(h\#j - h\#i + \alpha'\#j \cdot TD) \cdot [3 \cdot (II)R] + h\#i \cdot [3 \cdot (II)D] + (\alpha'j - \alpha i)\end{aligned}$$

$$\begin{aligned}&\text{(Sagittal asymmetric aberration)} \quad (12G)\\ &[(III\varepsilon)i \sim j + (P\varepsilon)1 \sim j] =\\ &(hj - hi + \alpha'j \cdot TD \cdot [(III)R + (P)R] - hi \cdot [(III)D + (P)D] -\\ &(h\#j - h\#i + \alpha'\#j \cdot TD) \cdot [(II)R] + h\#i \cdot [(II)D] + (\alpha'j - \alpha i)\end{aligned}$$

$$\begin{aligned}&\text{(Axial coma aberration)} \quad (12H)\\ &(II\varepsilon)i \sim j = (hj - hi + \alpha'j \cdot TD) \cdot (II)R -\\ &hi(II)D - (h\#j - h\#i + \alpha'\#j \cdot TD) \cdot (I)R + h\#i \cdot (I)D]\end{aligned}$$

The tilt decentering aberration coefficient can generally be expressed by the following equation (13A), provided that the medium before and after the decentered group is air and that the decentered group is tilted about the vertex of its surface:

$$\begin{aligned}&\text{(Decentering aberration coefficient)} i \sim j = \quad (13A)\\ &(hj - hi + \alpha'j \cdot TD) \cdot (\text{Sum of aberration coefficients 1}) R -\\ &hi \cdot (\text{Sum of aberration coefficients 1}) D -\\ &(h\#j - h\#i + \alpha'\#j \cdot TD) \cdot (\text{Sum of aberration coefficients 2}) R -\\ &h\#i \cdot (\text{Sum of aberration coefficients 2}) D + (\alpha'j - ai) \text{ this}\\ &\text{latter constant term is for asymmetric aberration only})\end{aligned}$$

As shown above, the tilt decentering aberration coefficient consists of four terms in the case of axial coma aberration and five terms in the case of asymmetric aberration. Each term will be explained below.

[First term] . . . The initial value hj is 1 and varies within a range of about 0.1 to 3. Since this value remains relatively unchanged in the group, hj−hi is about 0.1, and the core thickness TD is about 1 to 10 in the case of a lens shutter camera and about 5 to 50 in the case of a single lens reflex camera. $\alpha'j$ is on the order of the negative second power of 10.

[Second term]. . . hi is about 0.1 to 3.

[Third term]. . . Since h#i can be substantially regarded as the distance from the diaphragm, h#j −h#i=TD. Further, $\alpha'\#j$ is on the order of the negative first power to the positive first power of 10, the initial value being 1.

(Fourth term) . . . Since h#i is substantially equal to the distance from the diaphragm, the change of the value is the greatest, and the value is about 1 to 50.

[Fifth term] . . . This term applies only to asymmetric aberration, and is a constant term that does not contain a third order aberration coefficient. The value is on the order of the negative second power of 10.

As for the relationship in magnitude between the aberration coefficients, the spherical aberration coefficient (I) is $1 \times 10^{-4}$, the coma aberration coefficient (II) is $50 \times 10^{-4}$, and the astigmatism coefficient (III) and the Petzval sum (P) are both $500 \times 10^{-4}$. Considering the above, in the case of asymmetric aberration the first, second, and fifth terms have large values, while the fourth term becomes very large or becomes small enough to be neglected, depending on the position of the diaphragm. In particular, the fact that the fifth term has a large value means that it has a value even when all aberration coefficients are 0. This explains why it is difficult to reduce the error sensitivity simultaneously for tilt decentering and parallel decentering. Further, in axial coma aberration, the third and fourth terms become dominant, but the fourth term changes greatly, depending on the position of the diaphragm. Since the dominant terms are different between tilt decentering and parallel decentering, as described above, it can be seen that reducing one aberration coefficient does not lead to reducing the sensitivity for both classes of decentering.

3. Preferred Embodiment 1 Derived From The Analysis Of Decentering Aberration

As can be seen from the derivations of decentering aberration described above, if, in an arbitrary optical system, a specific group is identified that has a relatively high error sensitivity of decentering aberration to parallel decentering and tilt decentering and that consists of at least one lens surface (this specific group corresponds to the above-described decentered group, and is, for example, a lens group or a lens surface), and if the absolute value of the decentering aberration coefficient of the specific group is minimized, the sensitivity to errors due to decentering in that optical system will be reduced to a minimum. The optical system and its production method according to the present invention have been devised by paying attention to this point, and one feature of the invention is the design technique that minimizes the absolute value of the decentering aberration coefficient for those portions of the optical system where the sensitivity to centering errors is high. The decentering aberration coefficient is expressed by a first order combination of the third order aberration coefficients of the specific group and the third order aberration coefficients of the image side group that consists of all the lens surfaces located on the image side with respect to the specific group, and the coefficient of the first order combination is expressed by the converted slope angle of a paraxial ray or ray height in the specific group or a combination thereof. Embodiments for achieving good optical performance by reducing the asymmetric aberration and axial coma aberration caused by parallel decentering and tilt decentering will be described below.

A. Asymmetric Aberration Due To Parallel Decentering

When, in an arbitrary optical system, the third order aberration coefficients corresponding to coma aberration, astigmatism, and Petzval sum are denoted as II, III, and P, respectively, the i-th lens surface as counted from the object side is designated as the i-th surface and the j-th lens surfaces as the j-th surface, a group consisting of the i-th to the j-th lens surface and having a relatively high asymmetric aberration error sensitivity to parallel decentering is designated as the specific group, and a group consisting of all the lens surfaces located on the image side with respect to the specific group is designated as the image side group, then it is desirable to minimize the absolute value of the value expressed by the following formula (1) in the specific group:

$$(\alpha'j-\alpha i)\cdot[3\cdot(III)R+(P)R]-\alpha i\cdot[3\cdot(III)D+(P)D]-(\alpha'\#j-\alpha\#i)\cdot[3\cdot(II)R\}+\alpha\#i\cdot[3\cdot(II)D] \quad (1)$$

where (II)D: Sum of third order aberration coefficients II of the specific group (II)R: Sum of third order aberration coefficients II of the image side group (III)D: Sum of third order aberration coefficients III of the specific group (III)R: Sum of third order aberration coefficients III of the image side group (P)D: Sum of third order aberration coefficients P of the specific group (P)R: Sum of third order aberration coefficients P of the image side group $\alpha i$: Slope angle of paraxial marginal ray incident on the i-th surface, as converted to the angle in the object space $\alpha\#i$: Slope angle of off-paraxial principal ray incident on the i-th surface, as converted to the angle in the object space $\alpha'j$: Slope angle of paraxial marginal ray emergent from the j-th surface, as converted to the angle in the object space $\alpha'\#j$: Slope angle of off-paraxial principal ray emergent from the j-th surface, as converted to the angle in the object space.

Initial values in the calculation of the above third order aberration coefficients are $\alpha 1=0$, $h1=1$, $\alpha\#1=-1$, and $h\#1=-t$, where $\alpha 1$: Slope angle of paraxial marginal ray incident on the first surface, as converted to the angle in the object space $\alpha\#1$: Slope angle of off-paraxial principal ray incident on the first surface, as converted to the angle in the object space h1: Height of paraxial marginal ray on the first surface h#1: Height of off-paraxial principal ray on the first surface t: Entrance pupil distance.

By minimizing the absolute value of the value expressed by the above formula (1) for the specific group, the asymmetric aberration occurring due to parallel decentering in the optical system can be reduced, and the centering error sensitivity of the asymmetric aberration can thus be minimized. The above formula (1) consists of four terms, but to minimize the entire formula (1), usually it is desirable to minimize the fourth term. However, it is desirable to minimize the first to the third terms as appropriate according to the configuration of the optical system.

B. Axial Coma Aberration Due To Parallel Decentering

When, in an arbitrary optical system, the third order aberration coefficients corresponding to spherical aberration and coma aberration are denoted as I and II, respectively, the i-th lens surface as counted from the object side is designated as the i-th surface and the j-th lens surface as the j-th surface, a group consisting of the i-th to the j-th lens surfaces and having a relatively high axial coma aberration error sensitivity to parallel decentering is designated as the specific group, and a group consisting of all the lens surfaces located on the image side with respect to the specific group is designated as the image side group, then it is desirable to minimize the absolute value of the value expressed by the following formula (2) in the specific group:

$$(\alpha'j-\alpha i)\cdot(II)R-\alpha i\cdot(II)D-(\alpha'\#j-\alpha\#i)\cdot(I)R+\alpha\#i\cdot(I)D \quad (2)$$

where (I)D: Sum of third order aberration coefficients I of the specific group (I)R: Sum of third order aberration coefficients I of the image side group (II)D: Sum of third order aberration coefficients II of the specific group (II)R: Sum of third order aberration coefficients II of the image side group αi: Slope angle of paraxial marginal ray incident on the i-th surface, as converted to the angle in the object space α#i: Slope angle of off-paraxial principal ray incident on the i-th surface, as converted to the angle in the object space α'j: Slope angle of paraxial marginal ray emergent from the j-th surface, as converted to the angle in the object space α'#j: Slope angle of off-paraxial principal ray emergent from the j-th surface, as converted to the angle in the object space.

Initial values in the calculation of the above third order aberration coefficients are α1=0, h1=1, α#1=−1, and h#1=−t, where α1: Slope angle of paraxial marginal ray incident on the first surface, as converted to the angle in the object space α#1: Slope angle of off-paraxial principal ray incident on the first surface, as converted to the angle in the object space h1: Height of paraxial marginal ray on the first surface h#1: Height of off-paraxial principal ray on the first surface t: Entrance pupil distance.

What can be said of the asymmetric aberration due to parallel decentering can also be said of the axial coma aberration due to parallel decentering. That is, by minimizing the absolute value of the value expressed by the above formula (2) in the specific group, the axial coma aberration occurring due to parallel decentering in the optical system can be reduced, and the centering error sensitivity of the axial coma aberration can thus be minimized. Here, to minimize the entire formula (2), usually it is desirable to minimize the fourth term; further, it is desirable to minimize the first to the third terms as appropriate according to the configuration of the optical system.

C. Asymmetric Aberration Due To Tilt Decentering

When, in an arbitrary optical system, the third order aberration coefficients corresponding to coma aberration, astigmatism, and Petzval sum are denoted as II, III, and P, respectively, the i-th lens surface as counted from the object side is designated as the i-th surface and the j-th lens surface as the j-th surface, a group consisting of the i-th to the j-th lens surfaces and having a relatively high asymmetric aberration error sensitivity to tilt decentering is designated as the specific group, and a group consisting of all the lens surfaces located on the image side with respect to the specific group is designated as the image side group, then it is desirable to minimize the absolute value of the value expressed by the following formula (3) in the specific group:

$$(h_j - h_i + \alpha'_j \cdot TD) \cdot [3 \cdot (III)R + (P)R] - h_i \cdot [3 \cdot (III)D + (P)D] - (h\#j - h\#i + \alpha'\#j \cdot TD) \cdot [3 \cdot (II)R] + h\#i \cdot [3 \cdot (II)D] + (\alpha'_j - \alpha_i) \quad (3)$$

where (II)D: Sum of third order aberration coefficients II of the specific group (II)R: Sum of third order aberration coefficients II of the image side group (III)D: Sum of third order aberration coefficients III of the specific group (III)R: Sum of third order aberration coefficients III of the image side group (P)D: Sum of third order aberration coefficients P of the specific group (P)R: Sum of third order aberration coefficients P of the image side group αi: Slope angle of paraxial marginal ray incident on the i-th surface, as converted to the angle in the object space α'#j: Slope angle of paraxial marginal ray emergent from the j-th surface, as converted to the angle in the object space α'#j: Slope angle of off-paraxial principal ray emergent from the j-th surface, as converted to the angle in the object space hi: Height of paraxial marginal ray on the i-th surface h#i: Height of off-paraxial principal ray on the i-th surface hj: Height of paraxial marginal ray on the j-th surface h#j: Height of off-paraxial principal ray on the j-th surface TD: Core thickness of the specific group.

Initial values in the calculation of the above third order aberration coefficients are a1=0, h1=1, α#1=−1, and h#1=−t, where α1: Slope angle of paraxial marginal ray incident on the first surface, as converted to the angle in the object space α#1: Slope angle of off-paraxial principal ray incident on the first surface, as converted to the angle in the object space h1: Height of paraxial marginal ray on the first surface h#1: Height of off-paraxial principal ray on the first surface t: Entrance pupil distance.

What can be said of the asymmetric aberration due to parallel decentering can also be said of the asymmetric aberration due to tilt decentering. That is, by minimizing the absolute value of the value expressed by the above formula (3) in the specific group, the asymmetric aberration occurring due to tilt decentering in the optical system can be reduced, and the centering error sensitivity of the asymmetric aberration can thus be minimized. Here, to minimize the entire formula (3), usually it is desirable to minimize the first, second, and fifth terms; further, it is desirable to minimize the third and fourth terms as appropriate according to the configuration of the optical system.

D. Axial Coma Aberration Due To Tilt Decentering

When, in an arbitrary optical system, the third order aberration coefficients corresponding to spherical aberration and coma aberration are denoted as I and II, respectively, the i-th lens surface as counted from the object side is designated as the i-th surface and the j-th lens surface as the j-th surface, a group consisting of the i-th to the j-th lens surfaces and having a relatively high axial coma aberration error sensitivity to tilt decentering is designated as the specific group, and a group consisting of all the lens surfaces located on the image side with respect to the specific group is designated as the image side group, then it is desirable to minimize the absolute value of the value expressed by the following formula (4) in the specific group:

$$(h_j - h_i + \alpha'_j \cdot TD) \cdot (II)R - h_i \cdot (II)D - (h\#j - h\#i + \alpha'\#j \cdot TD) \cdot (I)R + h\#i \cdot (I)D \quad (4)$$

where (I)D: Sum of third order aberration coefficients I of the specific group (I)R: Sum of third order aberration coefficients I of the image side group (II)D: Sum of third order aberration coefficients II of the specific group (II)R: Sum of third order aberration coefficients II of the image side group α'j: Slope angle of paraxial marginal ray emergent from the j-th surface, as converted to the angle in the object space α·#j: Slope angle of off-paraxial principal ray emergent from the j-th surface, as converted to the angle in the object space hi: Height of paraxial marginal ray on the i-th surface h#i: Height of off-paraxial principal ray on the i-th surface hj: Height of paraxial marginal ray on the j-th surface h#j: Height of off-paraxial principal ray on the j-th surface TD: Core thickness of the specific group.

Initial values in the calculation of the above third order aberration coefficients are a α1=0, h1=1, α#1=−1, and h#1=−t, where α1: Slope angle of paraxial marginal ray incident on the first surface, as converted to the angle in the object space α#1: Slope angle of off-paraxial principal ray incident on the first surface, as converted to the angle in the object space h1: Height of paraxial marginal ray on the first surface h#1: Height of off-paraxial principal ray on the first surface t: Entrance pupil distance.

What can be said of the asymmetric aberration due to tilt decentering can also be said of the axial coma aberration due to tilt decentering. That is, by minimizing the absolute value of the value expressed by the above formula (4) in the specific group, the axial coma aberration occurring due to tilt decentering in the optical system can be reduced, and the centering error sensitivity of the axial coma aberration can thus be minimized. Here, to minimize the entire formula (4), usually it is desirable to minimize the third and fourth terms; further, it is desirable to minimize the first and second terms as appropriate according to the configuration of the optical system.

Figure 3:
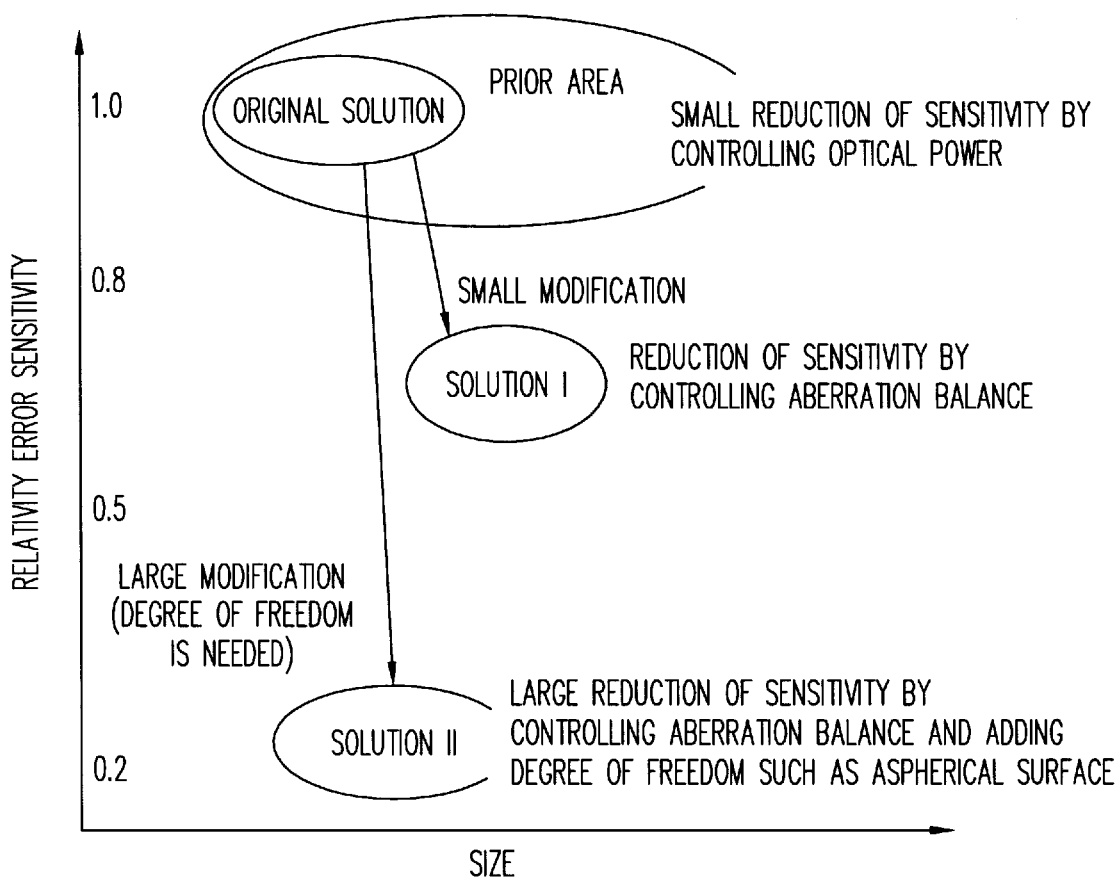
FIG. 3 is a flowchart showing a procedure for a centering error sensitivity reduction design according to an embodiment.

4. Difference Between The Centering Error Sensitivity Reduction Design According To The Present Invention And The Prior Art Design As previously stated, it is not true that no design considerations have been given in the prior art for the reduction of error sensitivity; rather, a certain degree of error sensitivity reduction has been accomplished. The idea has been to reduce the error sensitivity by weakening the power of portions where the sensitivity is high, and reducing the error sensitivity has eventually resulted in increased size of the optical system. According to the characteristic design technique of the present invention, the centering error sensitivity is analyzed from aberration coefficients, as previously described, to clarify the existence of solutions that provide reduced centering error sensitivity while retaining the same power, and aspherical surfaces, etc. that have previously been used to improve the performance and specifications are employed to reduce the absolute value of the decentering aberration coefficient, thus accomplishing a reduction in the centering error sensitivity. FIG. 3 is a diagram illustrating the difference between the characteristic design technique of the present invention and the prior art design technique for reducing the centering error sensitivity.

5. Preferred Embodiment 2 Derived From The Analysis Of Decentering Aberration

In relation to the above described decentering aberration analysis, a method for reducing the error sensitivity due to decentering in the optical system will be described in further detail. The error sensitivity reduction design consists of the following five stages.

A. First Stage

The first stage is characterized in identifying a group that consists of at least one lens surface (hereinafter also referred to as the "specific group") and that would present a problem in manufacturing because of a relatively high centering error sensitivity (#10 in FIG. 4). More specifically, the degree of decentering aberration when decentering (parallel decentering or tilt decentering) actually occurs as each element, lens block, lens, or lens surface in the target optical system is examined, for example, by ray tracing. The decentering aberrations that should be noted at this time are the previously described "asymmetric aberration" and "axial coma aberration".

In recent years, design work on zoom lenses has been performed vigorously in the field of optics, and many techniques for zooming ratio improvements and size reductions have been announced. Zooming ratio improvements and size reductions, however, generally tend to increase the error sensitivity. Higher magnification and smaller size demand higher accuracy in manufacturing, but the present state of technology has not caught up with the demand. The magnification and the size are therefore determined by the limitation of manufacturing; on the other hand, market needs are growing for higher magnification and smaller size, and zoom lenses that can satisfy such needs have yet to be provided.

In the case of zoom lenses, it has become possible to absorb some degree of centering error sensitivity within the zoom block by centering techniques but, at the present time, high-accuracy centering cannot be achieved with the zoom block that moves during zooming. In this respect, the characteristic design technique of the present invention is suited for zoom lenses. When the invention is applied to a zoom lens, it is preferable to choose the zoom block as the specific group, and more preferably the specific group is a zoom group having the highest centering error sensitivity.

The characteristic design technique of the present invention goes beyond reducing the centering error sensitivity of just one element in the optical system. By using the design technique repeatedly, the optical system can be constructed so that every element in the optical system has a centering error sensitivity sufficiently low and acceptable with respect to manufacturing errors. Accordingly, in a zoom optical system with a zoom block having a low centering error sensitivity, the target element is preferably a lens or a lens surface. This is because, if the error sensitivity within the zoom block can be reduced, the need for centering can be eliminated, offering advantages in manufacturing.

When the target optical system is a fixed focal length lens, it is desirable that the following conditional expression (5) be satisfied.

$$fL/ymax > 3 \tag{5}$$

where fL: Focal length of the entire system ymax: Image plane diagonal length

The above conditional expression (5) represents the focal length of the fixed focal length lens. As can be seen from the previously described derivation of decentering aberration, the error sensitivity becomes more pronounced as the focal length increases. Accordingly, in an optical system with a very short focal length, it is often unnecessary to reduce the error sensitivity since the sensitivity is inherently low.

B. Second Stage

Figure 4:
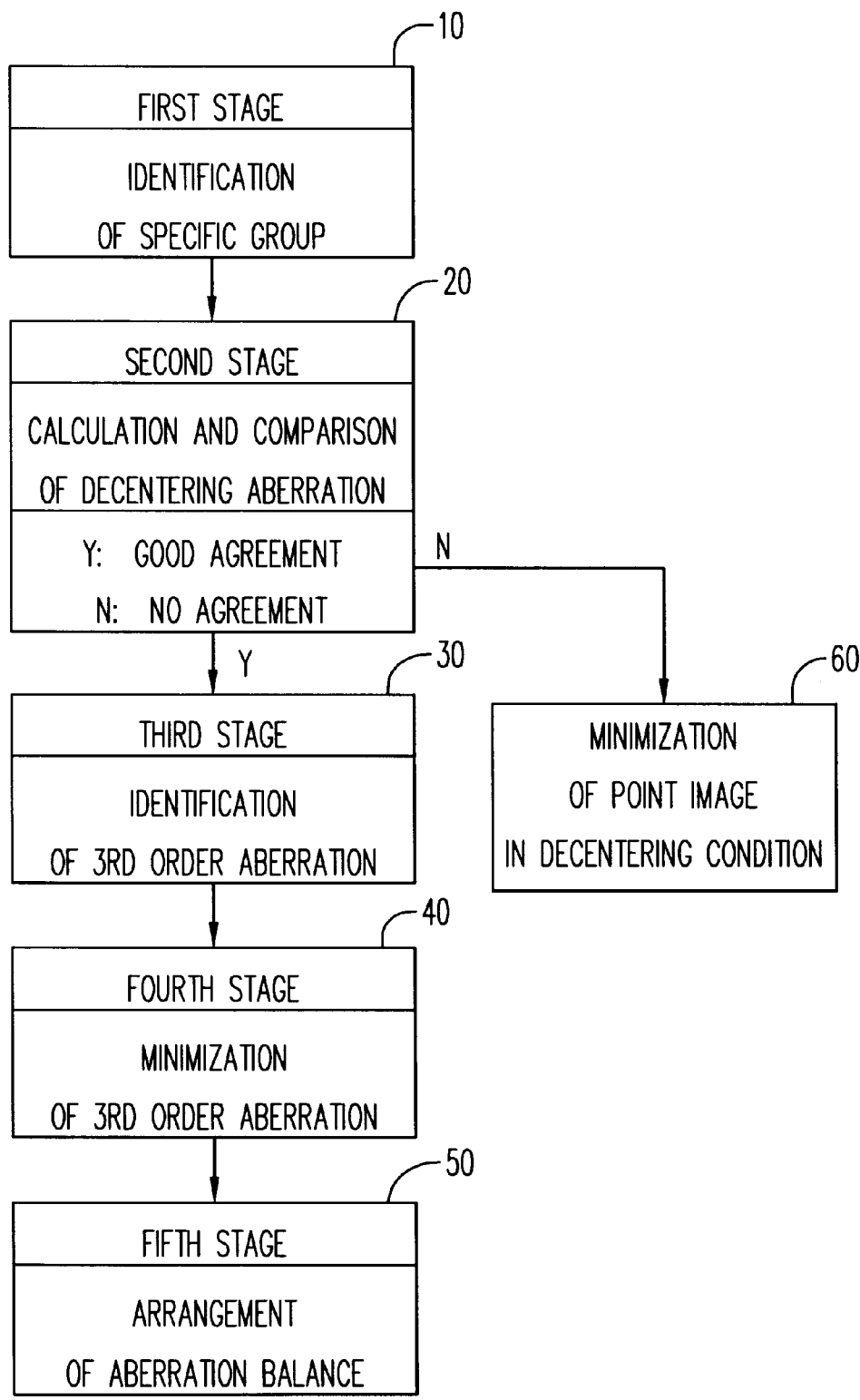
FIG. 4 is a schematic diagram for explaining the difference between the centering error sensitivity reduction design according to the embodiment and previous design.
Figure 5:
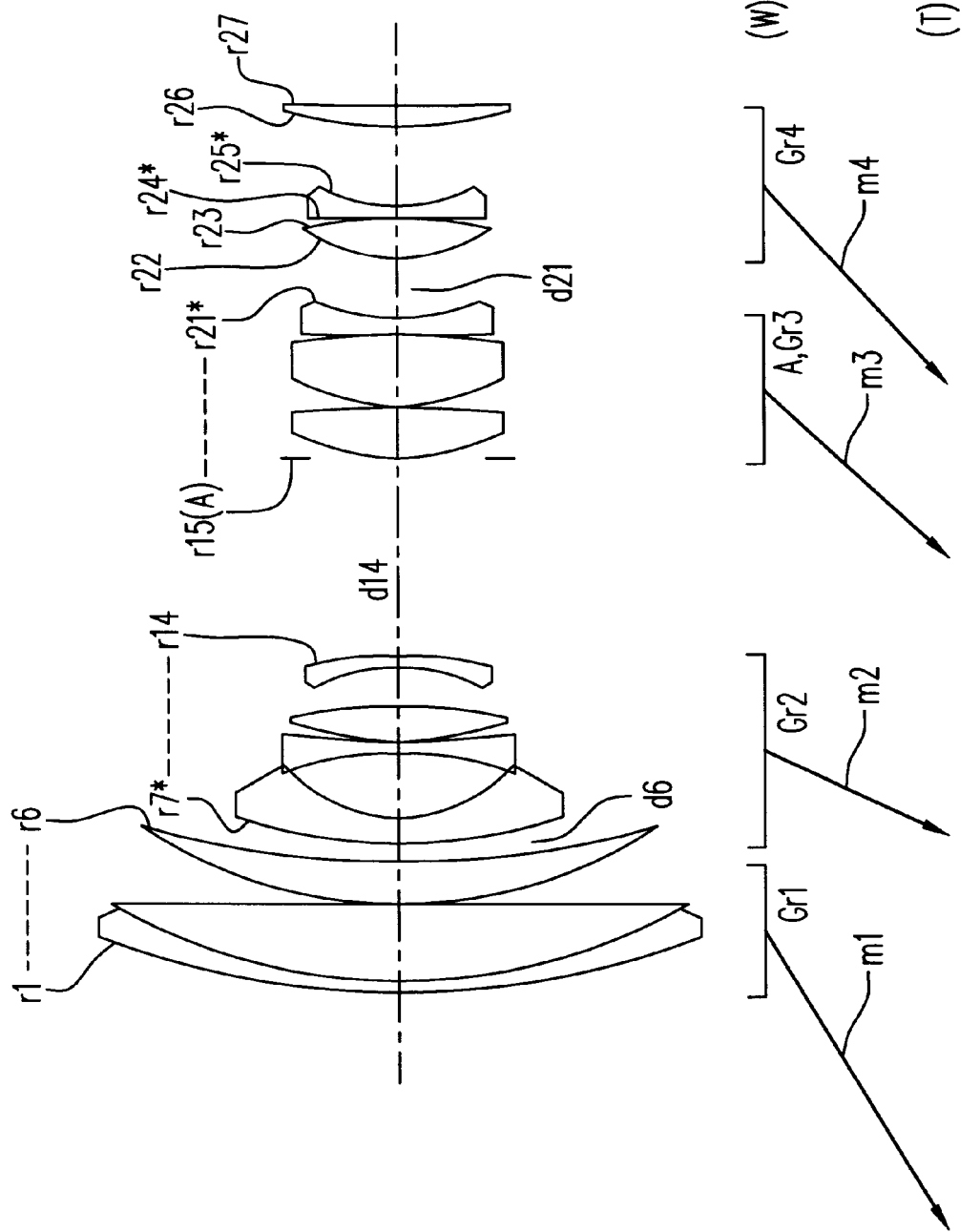
FIG. 5 is a lens configuration diagram for a zoom lens according to a first embodiment.
Figure 6:
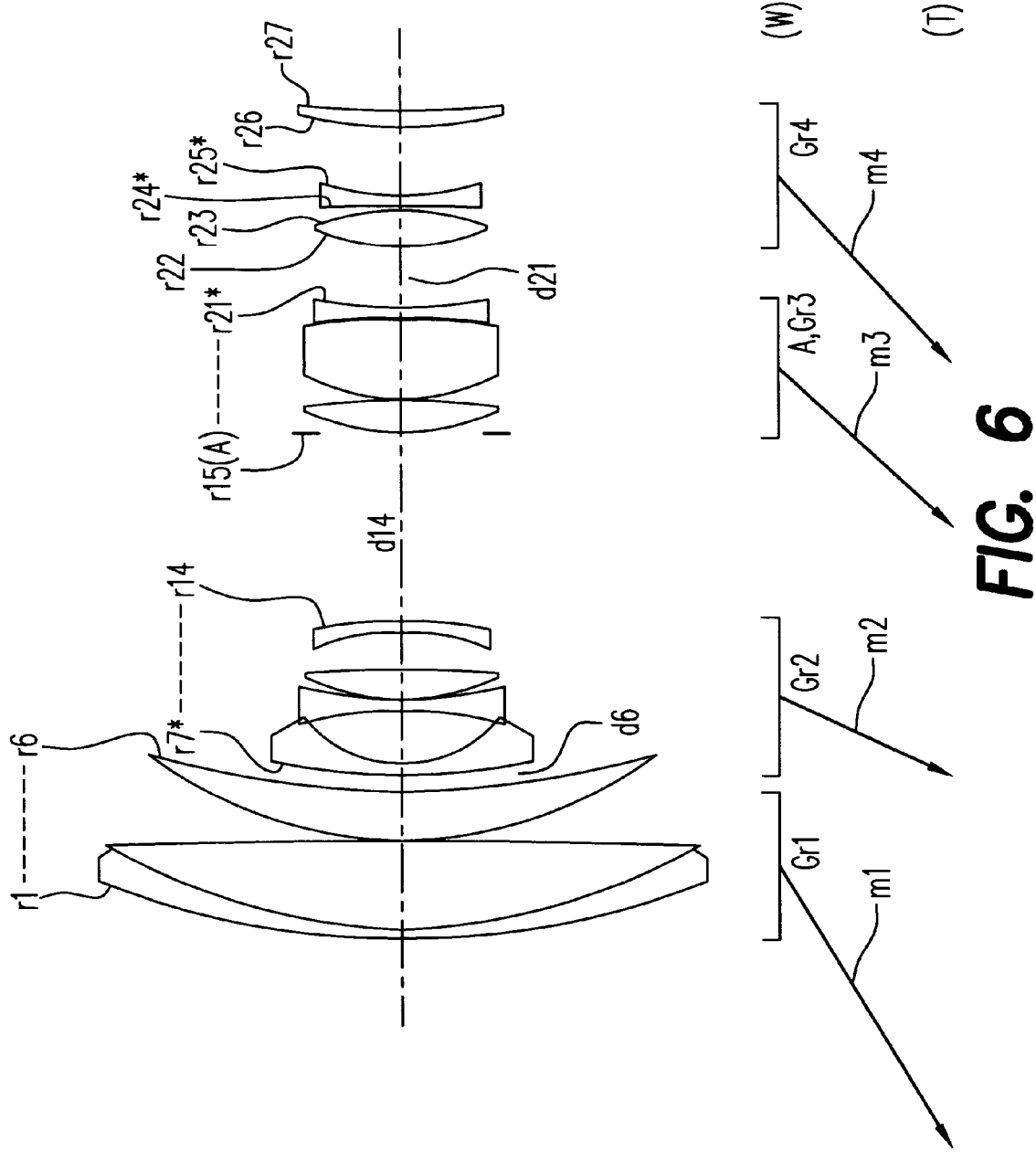
FIG. 6 is a lens configuration diagram for a zoom lens according to a second embodiment.
Figure 7:
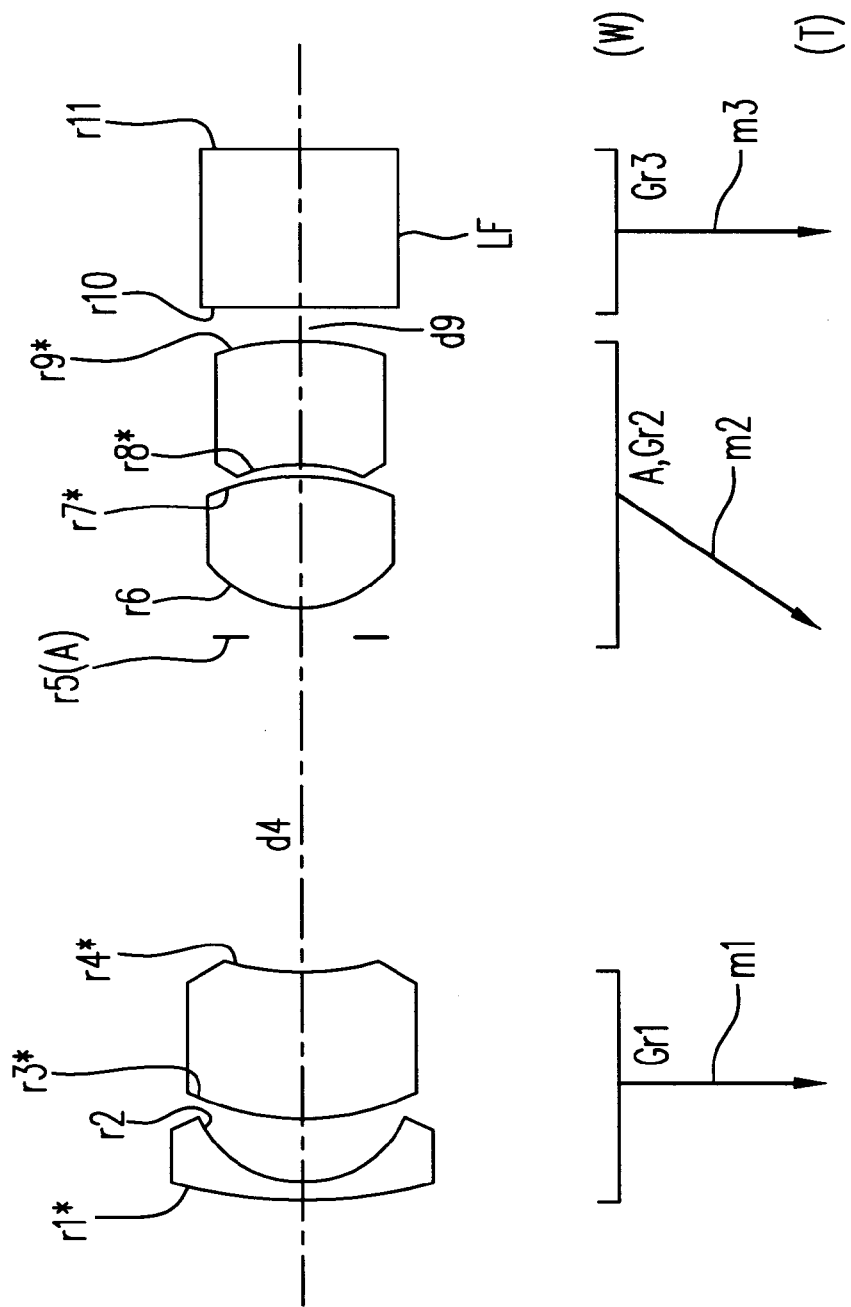
FIG. 7 is a lens configuration diagram for a zoom lens according to a third embodiment.
Figure 8:
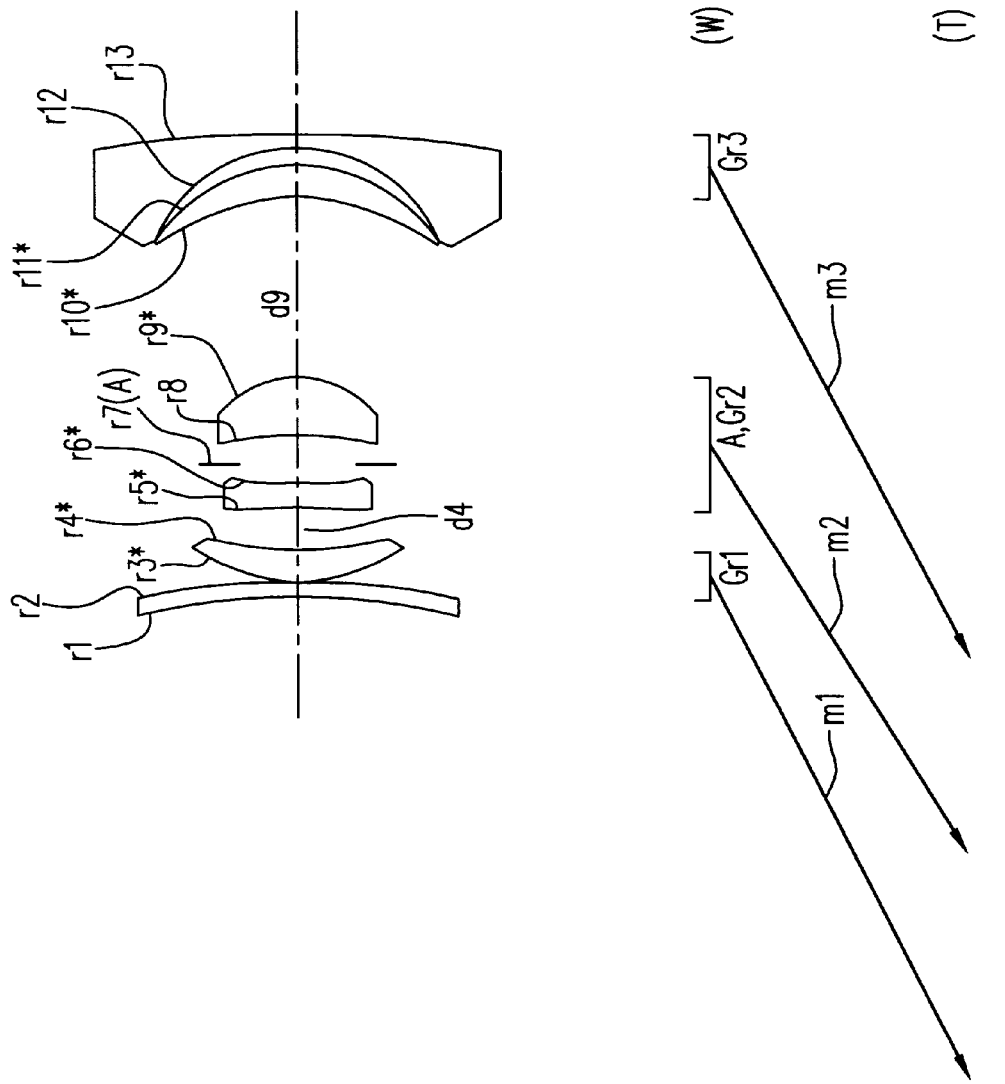
FIG. 8 is a lens configuration diagram for a zoom lens according to a fourth embodiment.
Figure 9:
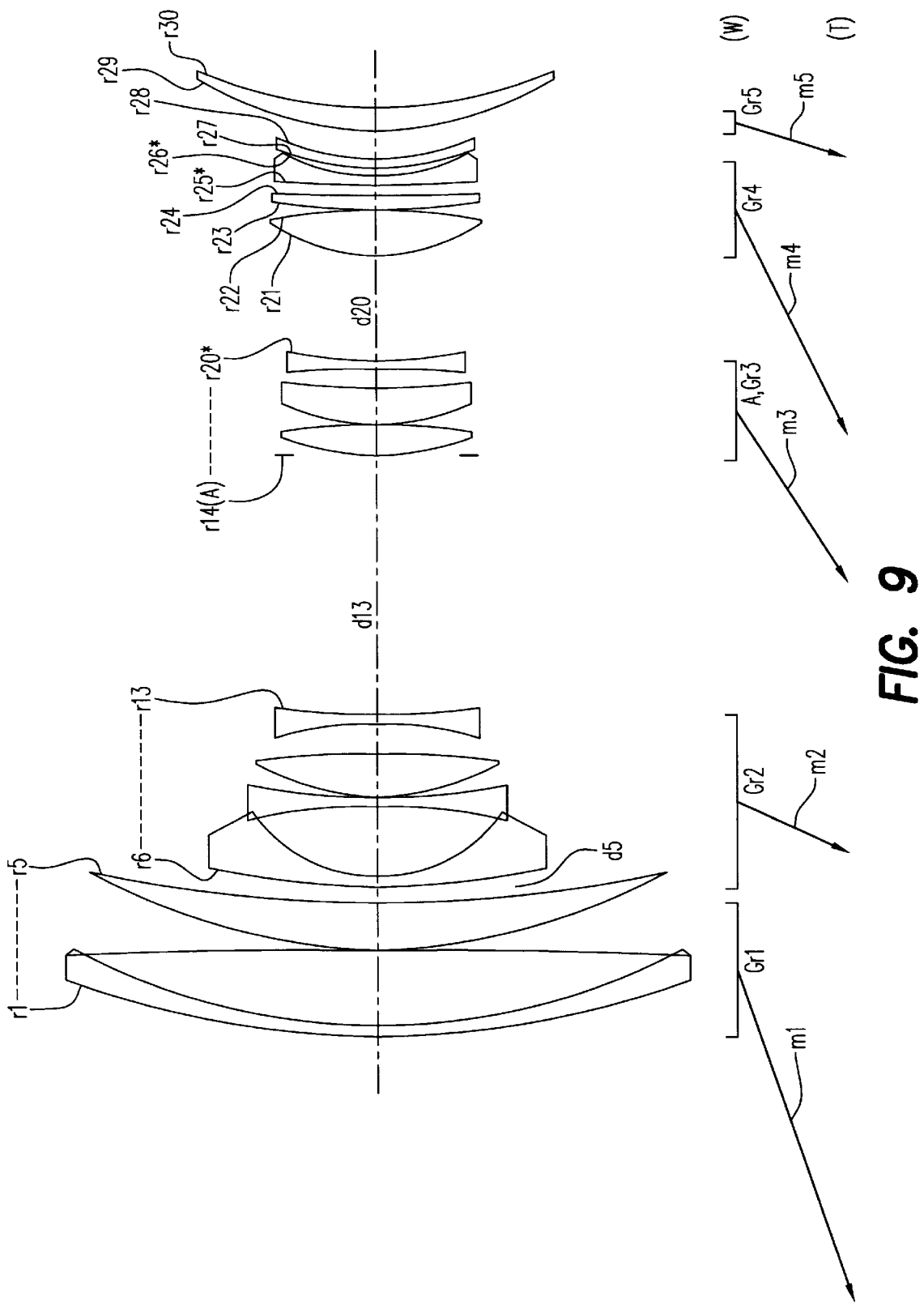
FIG. 9 is a lens configuration diagram for a zoom lens according to a fifth embodiment.
Figure 10:
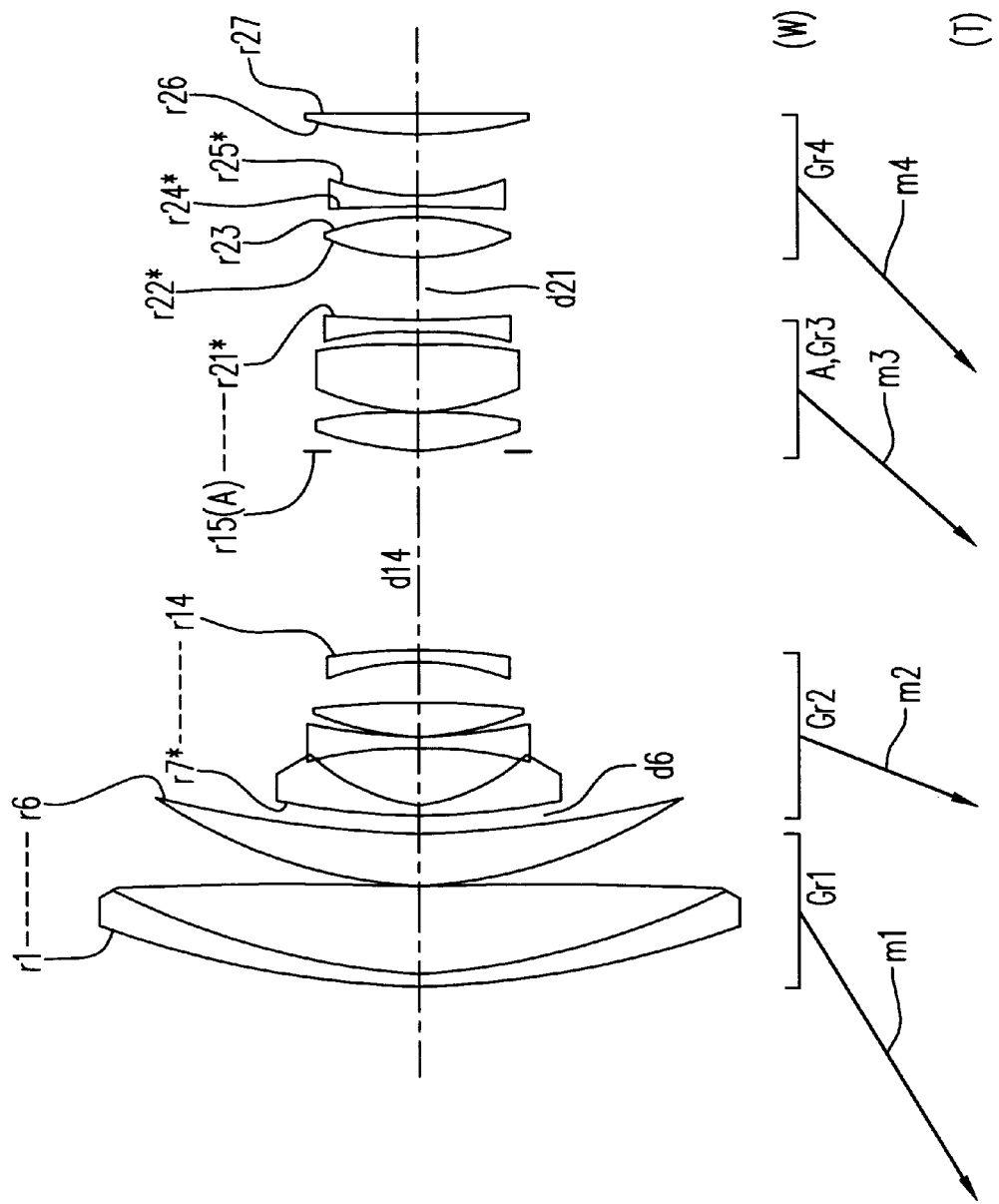
FIG. 10 is a lens configuration diagram for a zoom lens according to a sixth embodiment.
Figure 11:
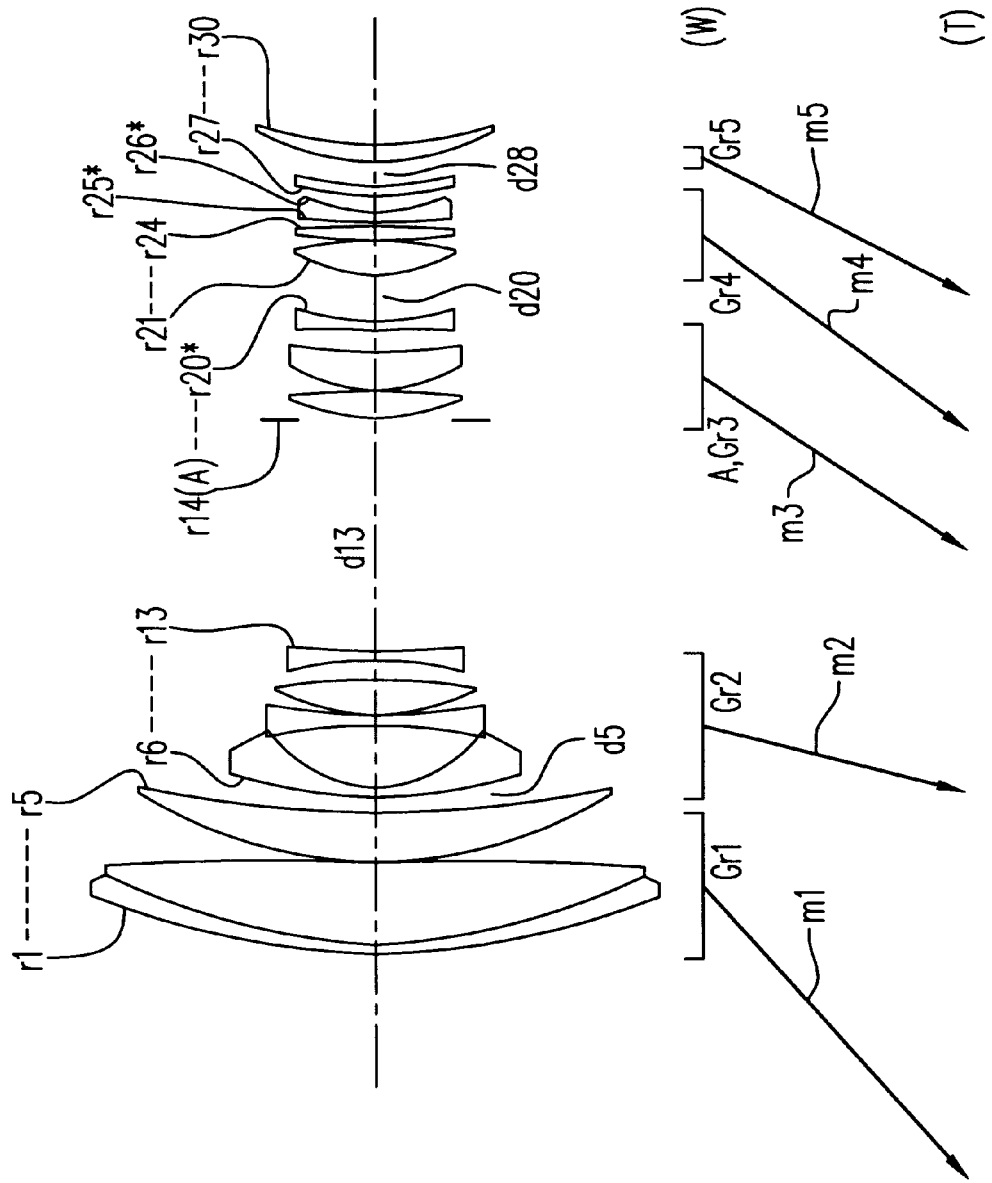
FIG. 11 is a lens configuration diagram for a zoom lens according to a seventh embodiment.
Figure 12:
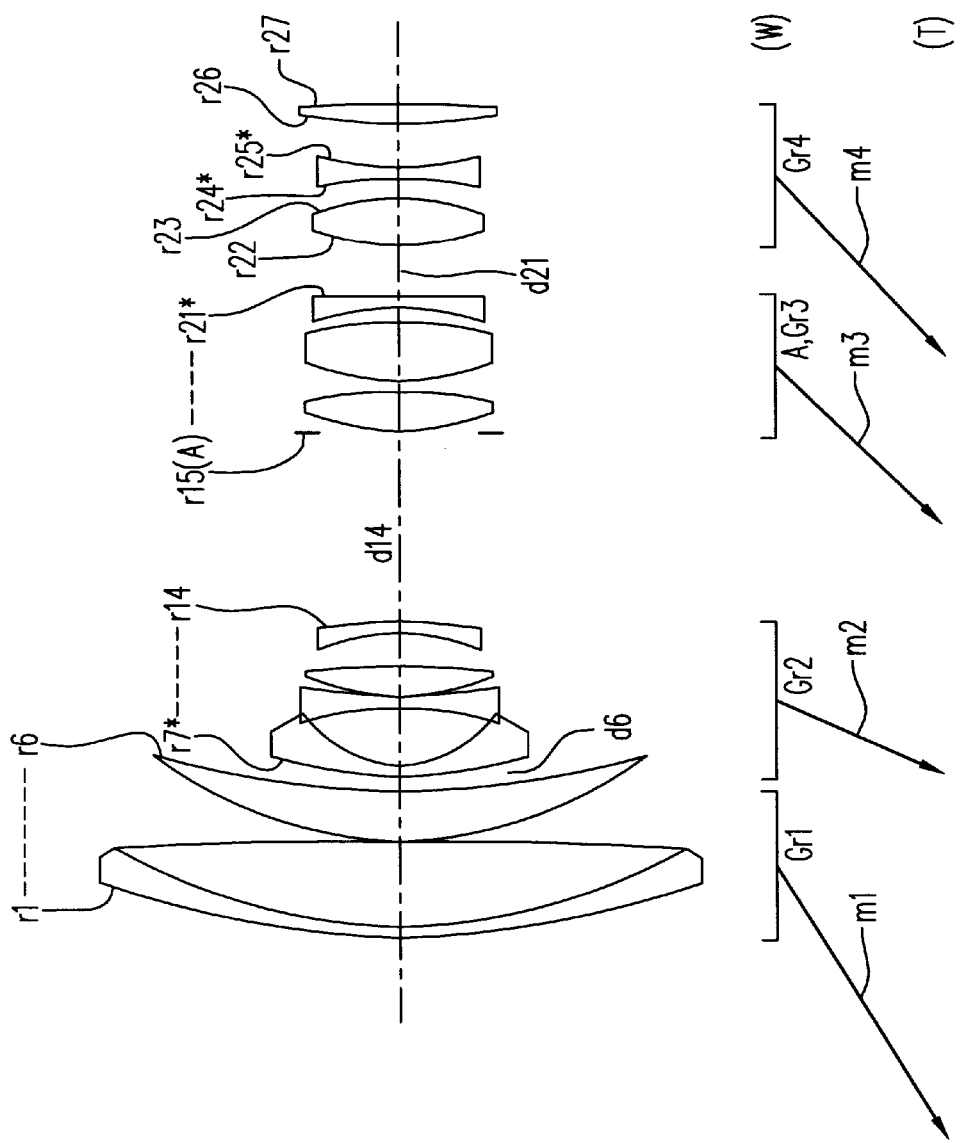
FIG. 12 is a lens configuration diagram for a zoom lens according to an eighth embodiment.
Figure 13A:
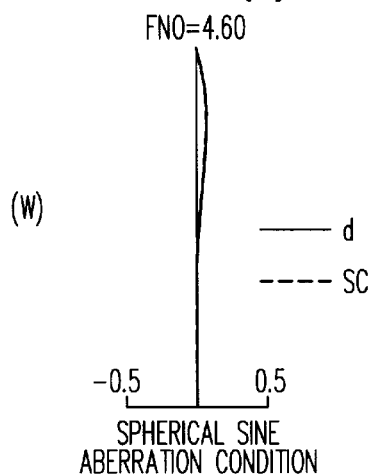
FIGS. 13($a$) to ($i$) are aberration diagrams for the zoom lens of the first embodiment.
Figure 13B:
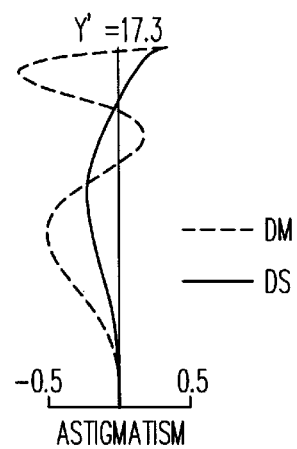
Figure 13C:
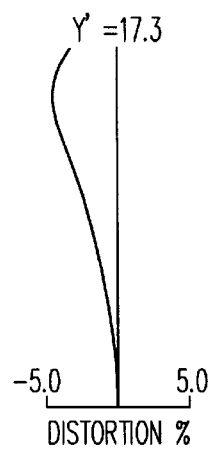
Figure 13D:
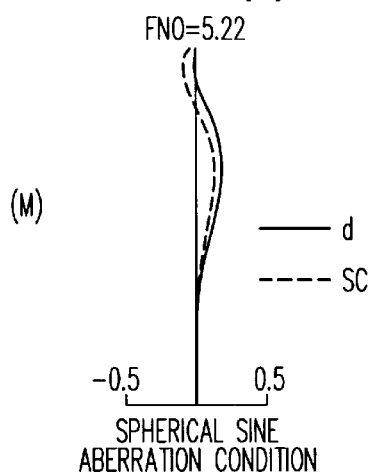
Figure 13E:
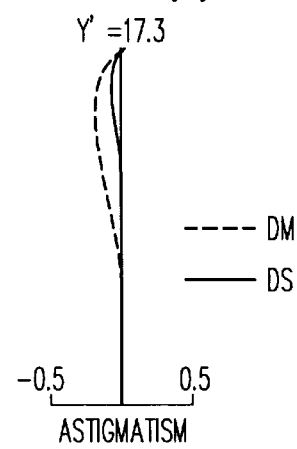
Figure 13F:
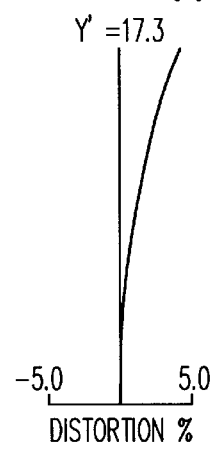
Figure 13G:
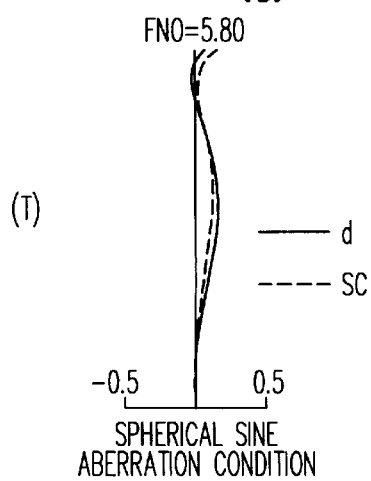
Figure 13H:
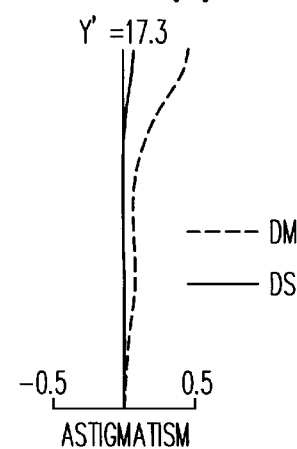
Figure 13I:
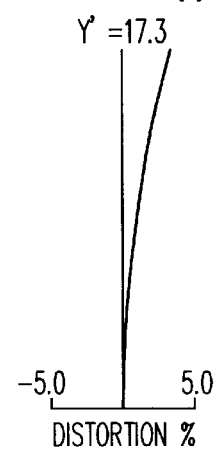
Figure 14A:
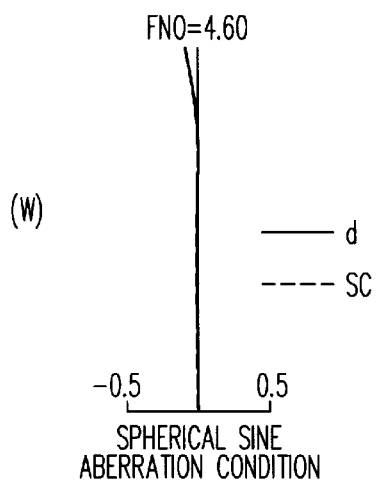
FIGS. 14($a$) to ($i$) are aberration diagrams for the zoom lens of the second embodiment.
Figure 14B:
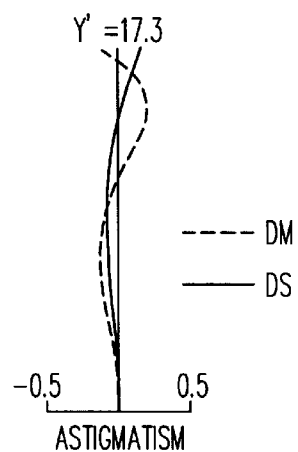
Figure 14C:
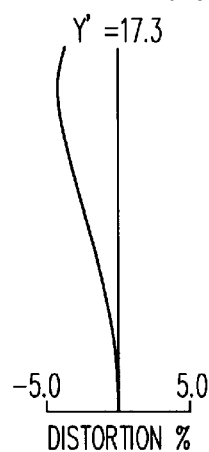
Figure 14D:
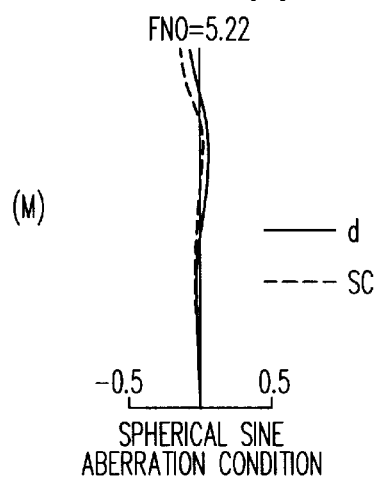
Figure 14E:
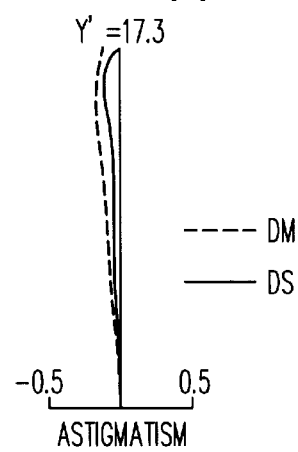
Figure 14F:
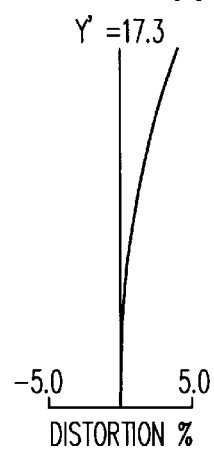
Figure 14G:
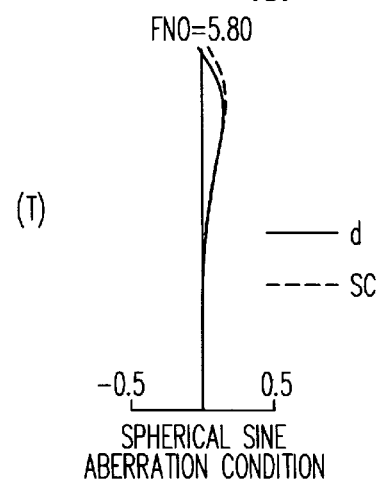
Figure 14H:
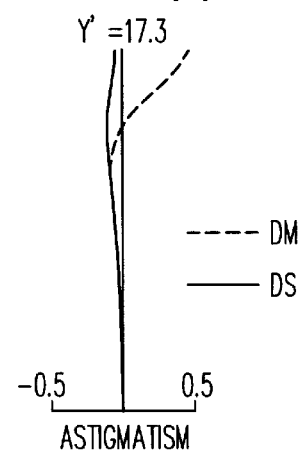
Figure 14I:
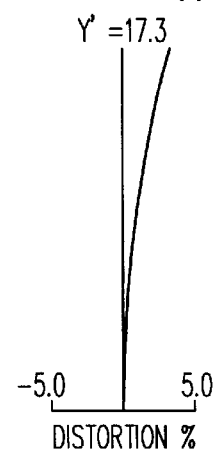
Figure 15A:
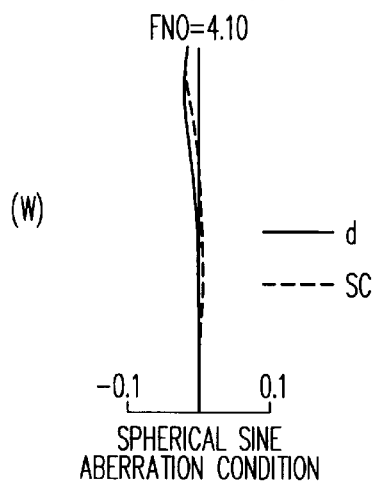
FIGS. 15($a$) to ($i$) are aberration diagrams for the zoom lens of the third embodiment.
Figure 15B:
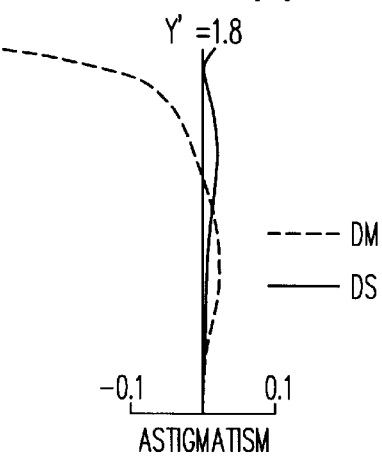
Figure 15C:
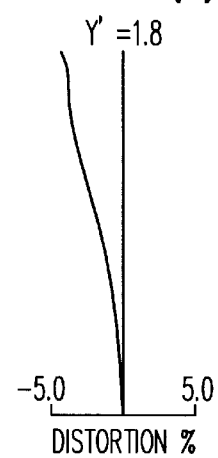
Figure 15D:
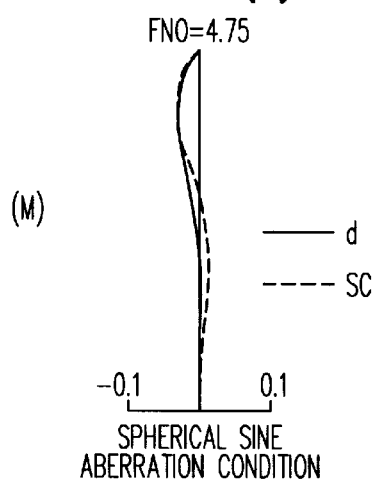
Figure 15E:
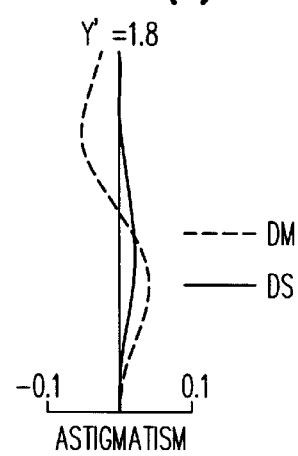
Figure 15F:
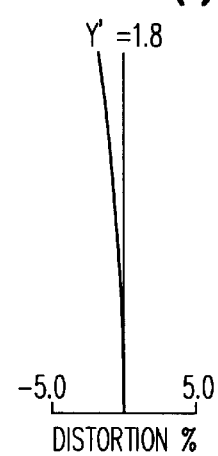
Figure 15G:
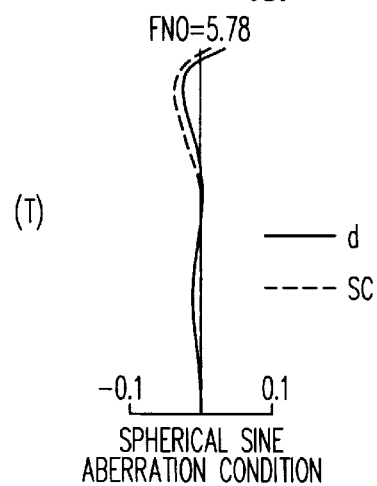
Figure 15H:
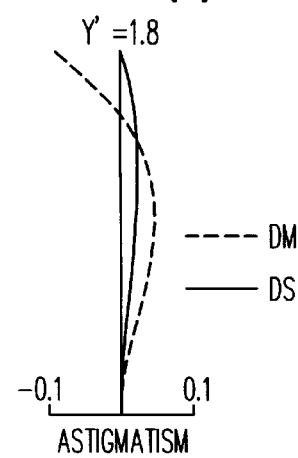
Figure 15I:
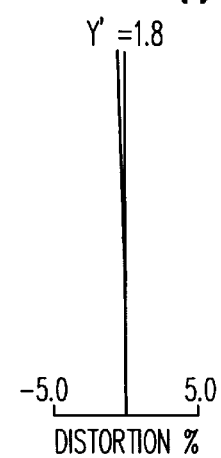
Figure 16A:
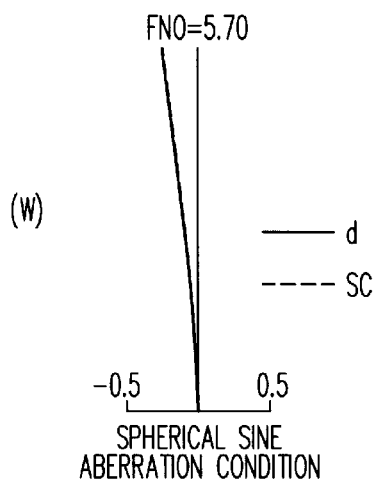
FIGS. 16($a$) to ($i$) are aberration diagrams for the zoom lens of the fourth embodiment.
Figure 16B:
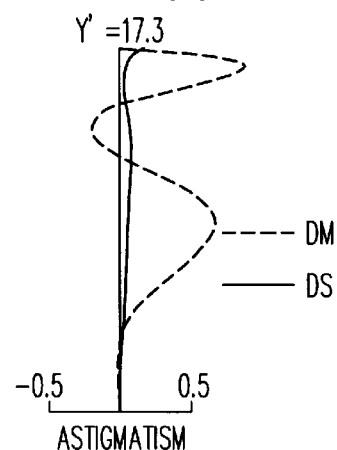
Figure 16C:
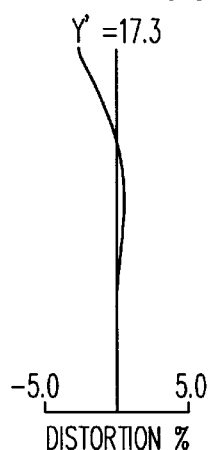
Figure 16D:
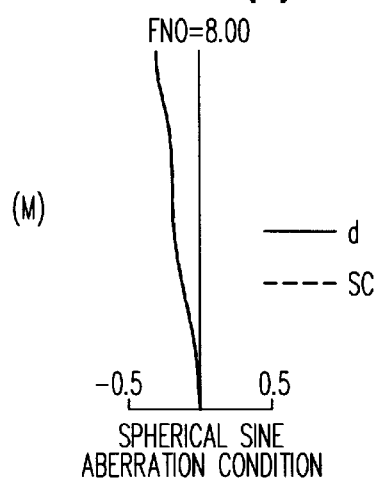
Figure 16E:
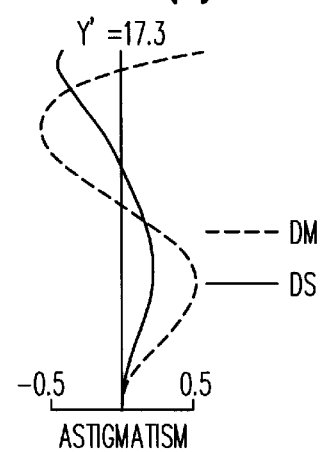
Figure 16F:
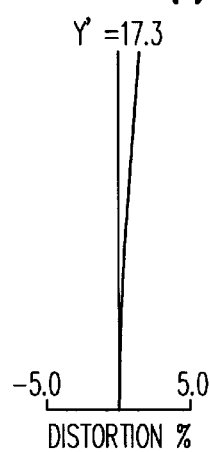
Figure 16G:
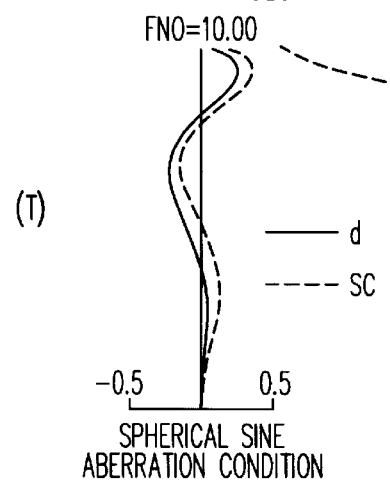
Figure 16H:
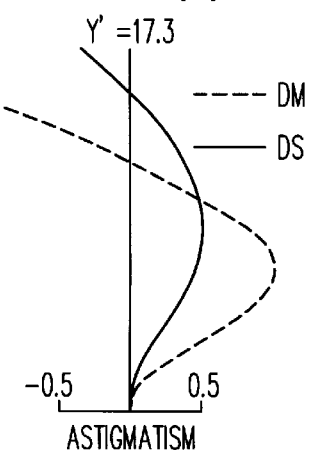
Figure 16I:
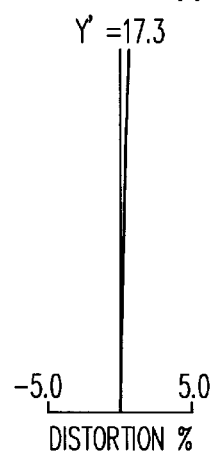
Figure 17A:
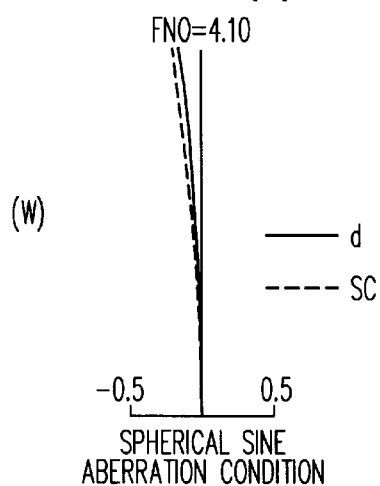
FIGS. 17(a) to (i) are aberration diagrams for the zoom lens of the fifth embodiment.
Figure 17B:
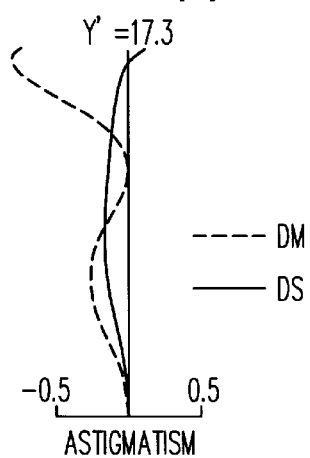
Figure 17C:
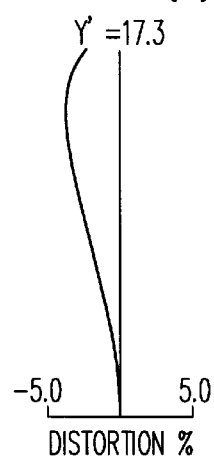
Figure 17D:
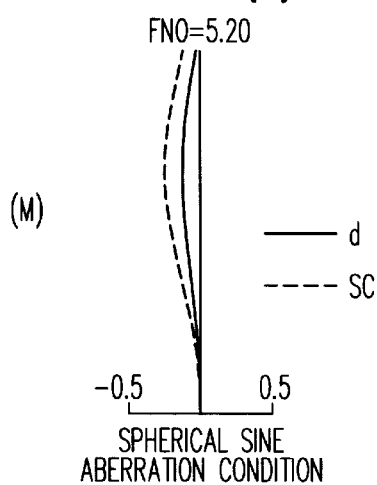
Figure 17E:
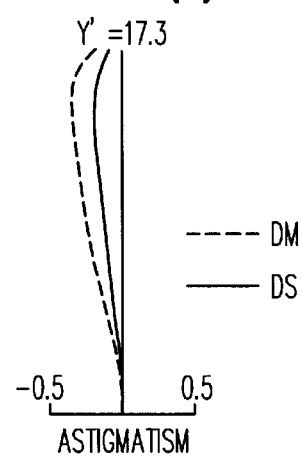
Figure 17F:
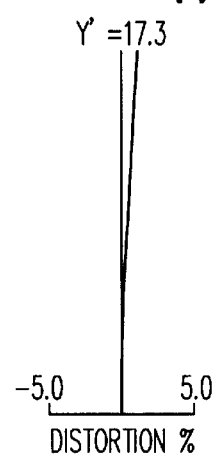
Figure 17G:
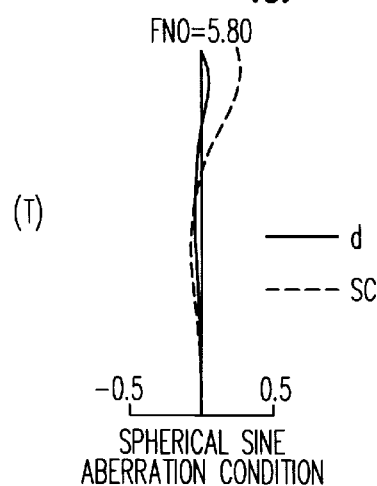
Figure 17H:
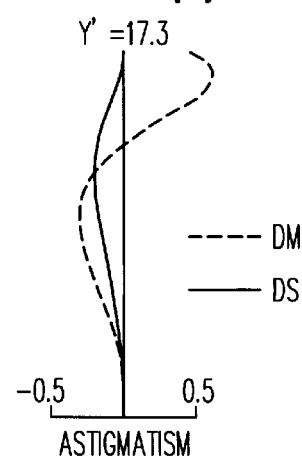
Figure 17I:
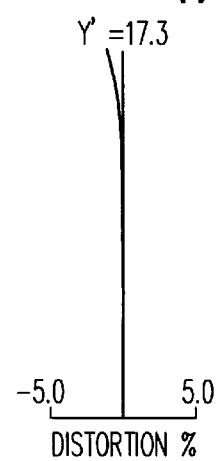
Figure 18A:
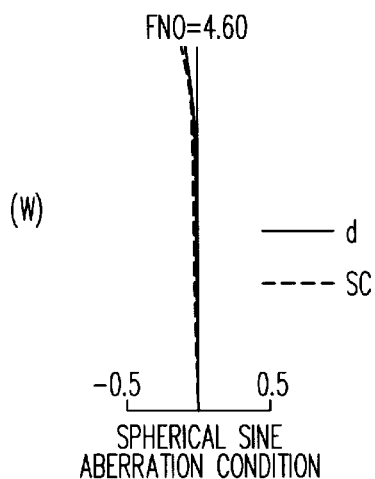
FIGS. 18(a) to (i) are aberration diagrams for the zoom lens of the sixth embodiment.
Figure 18B:
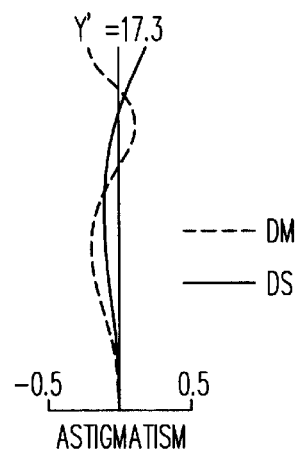
Figure 18C:
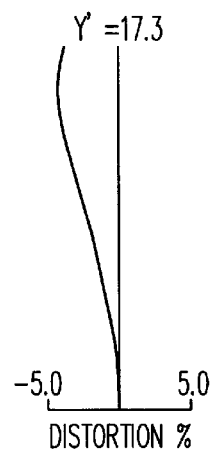
Figure 18D:
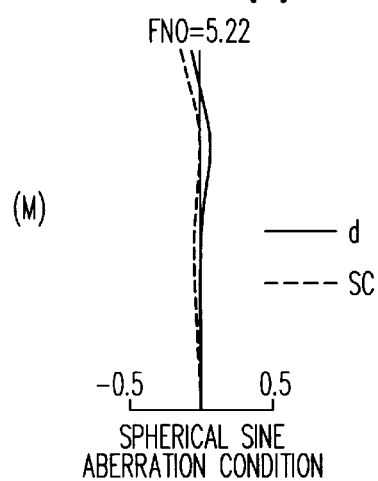
Figure 18E:
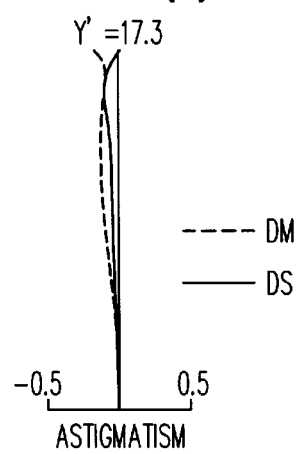
Figure 18F:
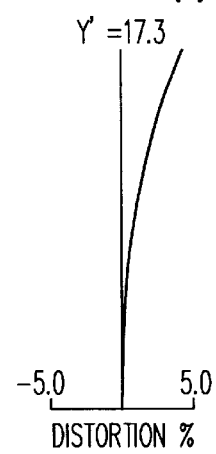
Figure 18G:
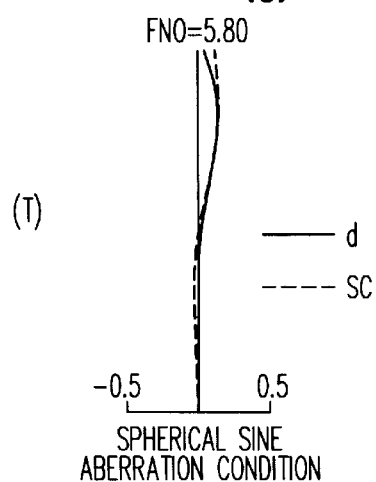
Figure 18H:
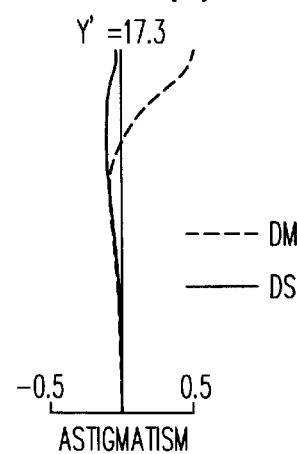
Figure 18I:
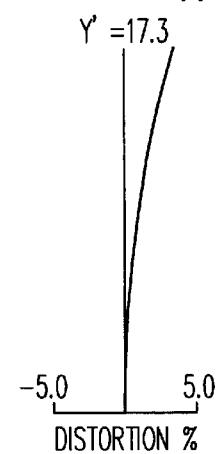
Figure 19A:
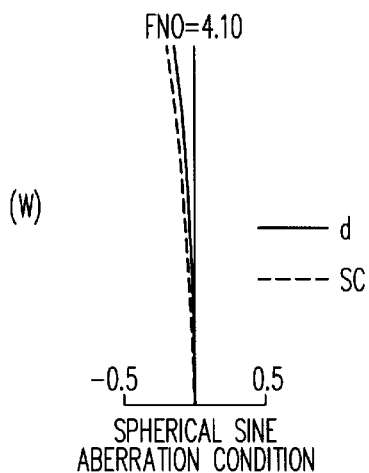
FIGS. 19(a) to (i) are aberration diagrams for the zoom lens of the seventh embodiment.
Figure 19B:
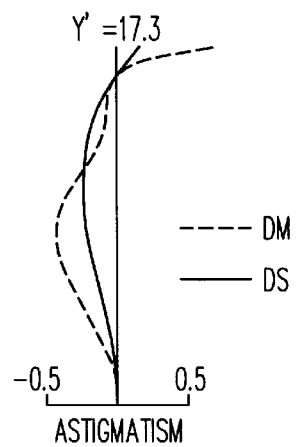
Figure 19C:
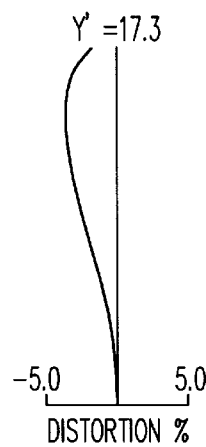
Figure 19D:
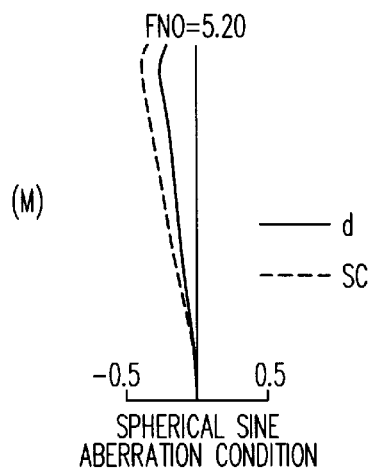
Figure 19E:
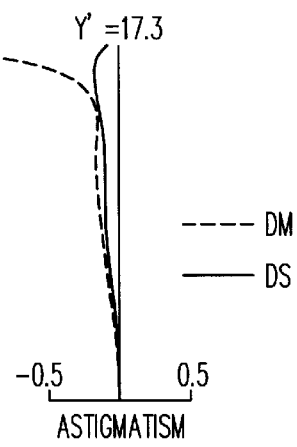
Figure 19F:
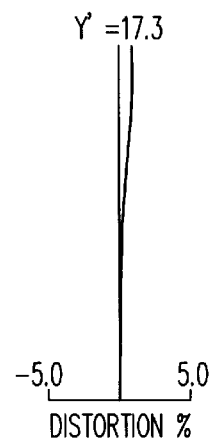
Figure 19G:
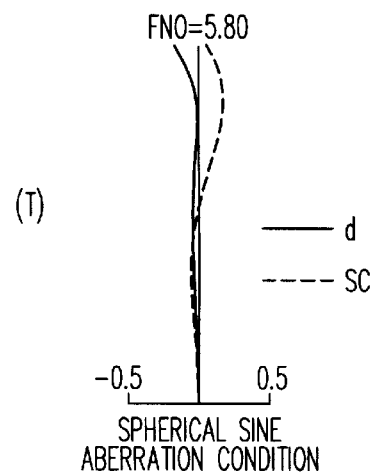
Figure 19H:
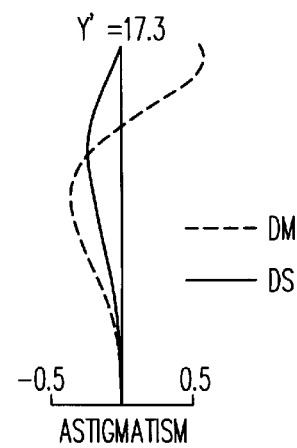
Figure 19I:
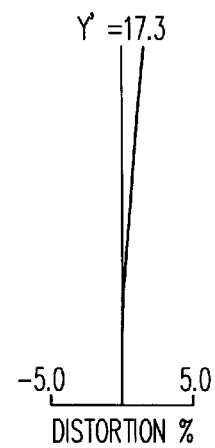
Figure 20A:
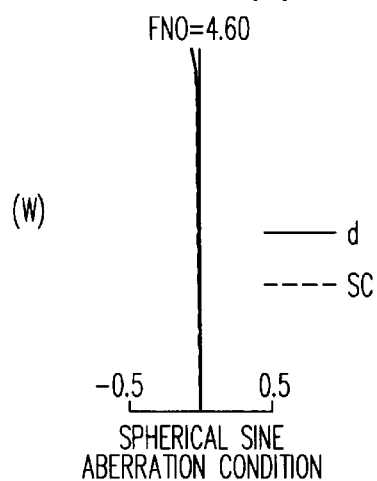
FIGS. 20(a) to (i) are aberration diagrams for the zoom lens of the eighth embodiment.
Figure 20B:
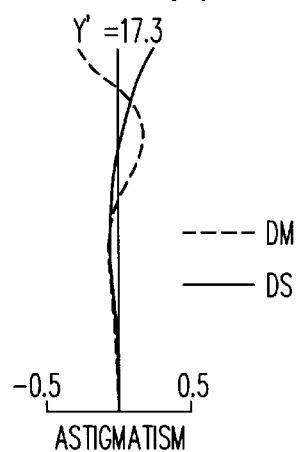
Figure 20C:
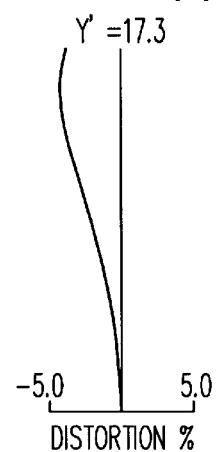
Figure 20D:
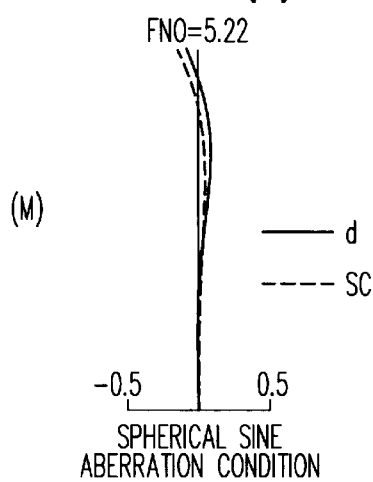
Figure 20E:
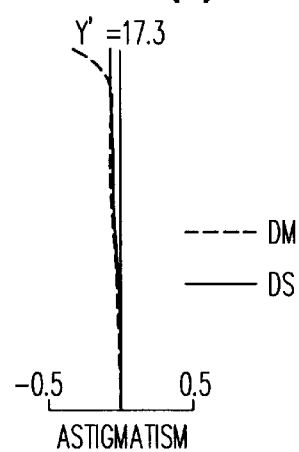
Figure 20F:
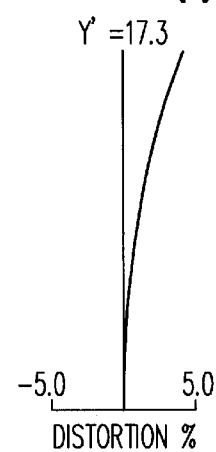
Figure 20G:
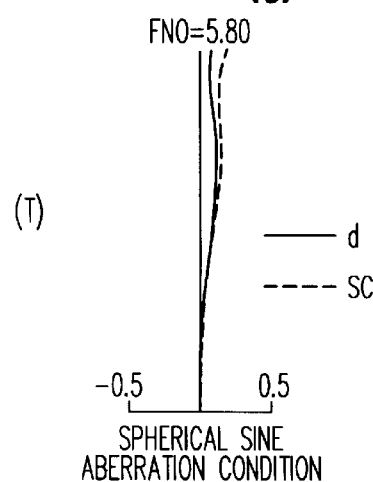
Figure 20H:
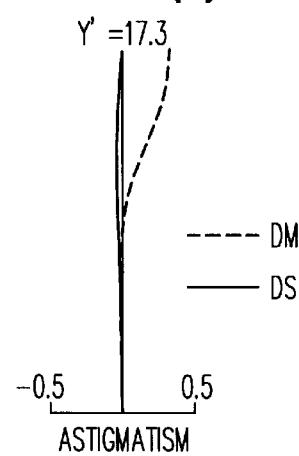
Figure 20I:
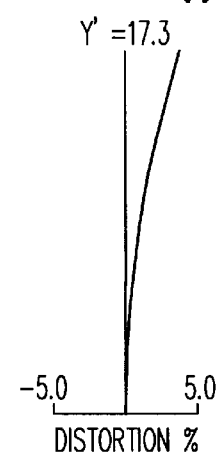

The second stage is characterized in that decentering aberration is calculated using the decentering aberration coefficient for the group (specific group) identified in the first stage and the decentering aberration obtained by the calculation is compared with the actual decentering aberration (obtained, for example, by ray tracing) (#20 in FIG. 4). As can be seen from the previously described derivation of decentering aberration, the decentering aberration coefficient is expressed by a first order combination of the respective aberration coefficients (third order aberration coefficients). In an ordinary optical system, a comparison between the value of the decentering aberration derived from the decentering aberration coefficient and the value of the actual decentering aberration obtained by ray tracing shows very good agreement between them. This can also be explained by the fact that the aberration calculated from the third order aberration coefficients is in good agreement with the actual aberration. However, when many aspherical surfaces are contained in the optical system, an excessive number of high order aberrations may occur, and in that case, the aberration calculated from the third order aberration coefficients is not in agreement with the actual aberration. As a result, the decentering aberration derived from the decentering coefficient greatly differs in value from the actual decentering aberration, which therefore makes it difficult to perform analytic design work.

When analytic design work is difficult as described above (that is, when it there exists a significant difference between the decentering aberration obtained by the calculation and the actual decentering aberration), it is desirable to design the system in such a manner as to minimize the size of spot image distribution in the decentered condition (#60 in FIG. 4). By so designing, the centering error sensitivity can be reduced by holding the decentering aberration to a small value. More specifically, a decentered position is actually created by decentering the portion of the centering error sensitivity which is desired to be weakened, and is added, as an additional position, to the position in the normal condition, and with the design weight also applied to this added decentered position, design is done to reduce the spot image in the decentered condition. If, by increasing the weight in the decentered condition, the spot image can be reduced while, at the same time, retaining the performance in the normal condition, that means that the centering error sensitivity has been successfully reduced. If the performance in the normal condition cannot be retained at the same time, then possibilities for reducing the centering error sensitivity should be sought by suitably adding a degree of freedom such as an aspherical surface, zoom solution, lens, etc.

C. Third Stage

The third stage is characterized in that, when it is determined as the result of the comparison in the second stage that the decentering aberration obtained by the calculation using the decentering aberration coefficient is in good agreement with the actual decentering aberration obtained by ray tracing, then a third order aberration coefficient making a major contribution to increasing the centering error sensitivity is identified (#30 in FIG. 4). Since the third order aberration coefficient dominant in the decentering aberration coefficient is the main contribution to increasing the centering error sensitivity, it is examined to determine which term in the decentering aberration coefficient most affects the decentering aberration of the specific group. The most dominant term in the decentering aberration coefficient is identified from the value of each term in the decentering aberration coefficient (or from the decentering aberration of each term). Once that term has been identified, it is easy to identify which third order aberration coefficient is dominant. The number of third order aberration coefficients thus identified may be one or more. The thus identified third order aberration coefficient is usually the coma aberration coefficient (II) of the specific group in the case of asymmetric aberration and the spherical aberration (I) of the specific group in the case of axial coma aberration.

D. Fourth Stage

The fourth stage is characterized in that design is done to reduce the third order aberration coefficient identified in the third stage (#40 in FIG. 4). The fourth stage is the stage where actual design work is performed based on the result of the analysis in the third stage. When the third order aberration coefficient identified in the third stage is the third order aberration coefficient $\{(\ )D\}$ of the target element (specific group), if an attempt is made in the fourth stage to reduce the third order aberration coefficient, the specific group may not be able to take a small third order aberration coefficient. In that case, it is desirable that a degree of freedom be added to the target element to achieve the desired third order aberration coefficient. The addition of a degree of freedom means, for example, the addition of an aspherical surface or a lens.

When the third order aberration coefficient identified in the third stage is the third order aberration coefficient $\{(\ )R\}$ of the group (image side group) consisting of all the lens surfaces located on the image side with respect to the specific group, if an attempt is made in the fourth stage to reduce the third order aberration coefficient, the image side group may not be able to take a small third order aberration coefficient. In that case, it is desirable that a degree of freedom be added to the image side of the specific group (that is, to the image side group) to achieve the desired third order aberration coefficient. The addition of a degree of freedom means, for example, the addition of an aspherical surface or a lens.

E. Fifth Stage

The fifth stage is characterized in that design is done to adjust the aberration balance shifted as a result of the design in the fourth stage so that the entire performance is maintained at substantially the same level as that in the condition (original condition) before the design in the fourth stage (#50 in FIG. 4). Since the third order aberration coefficient of the specific element (specific group or image side group) has been varied greatly in the fourth stage, the entire third order aberration coefficient is now a large value. To address this, design is performed to reduce the entire third order aberration coefficient, with elements, other than the one used in the design in the fourth stage, as design parameters. If the variation of the aberration is too large in the fourth stage, it may become difficult to bring the entire aberration back to substantially the same level as that in the original condition. In that case, it is desirable to add a degree of freedom on the object side of the specific group (for example, to the lens group located on the object side). The addition of a degree of freedom means, for example, the addition of an aspherical surface or a lens. As is apparent from the previously described derivation of decentering aberration, etc. the centering error sensitivity is completely independent of the aberration coefficient of the lens group located on the object side of the target element (specific group). Therefore, if the aberration coefficient is varied greatly by adding a degree of freedom on the object side of the specific group, the entire performance can be maintained at substantially the same level as that in the original condition, without affecting the centering error sensitivity of the specific group.

6. Actual Numerical Examples

Zoom lens configurations embodying the present invention will be described in further detail using construction data, aberration diagrams, etc. In the construction data in the respective embodiments (corresponding to Tables 1 to 8 and FIGS. 5 to 12) and a comparative example (corresponding to Table 9, diagrams not shown), ri (i=1, 2, 3, ... ) is the radius of curvature of the i-th surface as counted from the object side, di (i=1, 2, 3, ... ) is the i-th axial surface spacing as counted from the object side, Ni (i=1, 2, 3, ...) and υi (i=1, 2, 3, ... ) are the refractive index (Nd) and Abbe number (υd), respectively, for the d line of the i-th lens as counted from the object side. Further, in the construction data, the axial surface spacing (variable spacing) that varies in a zooming operation is the axial spacing between each group at the wide angle end (short focal length end) [W]~middle (intermediate focal length condition) [M]~telephoto end (long focal length end) [T]. The focal length f and F number FNO of the entire system corresponding to each of the focal length conditions [W], [M], and [T] are also shown.

A surface whose radius of curvature ri is followed by an asterisk is an aspherical surface, which is defined by the following equation (AS) expressing the surface shape of an aspherical surface:

$$X = (c \cdot Y^2)/\{1+(1-\epsilon \cdot Y^2 \cdot C^2)^{1/2}\} \Sigma (A_i \cdot Y_i) \tag{AS}$$

where

X: Amount of displacement from the datum plane in the direction of the optical axis Y: Height in the direction perpendicular to the optical axis C: Paraxial curvature $\epsilon$: Quadric surface parameter $A_i$: i-th order aspherical coefficient.

TABLE 1

Embodiment 1 (Positive-Negative-Positive-Positive)
f = 22.75 – 60.00 – 155.40
FNO = 4.60 – 5.22 – 5.80

| Radius of Curvature | Axial Distance | Refractive Index | Abbe Number |
|---|---|---|---|
| r1 = 73.568 | d1 = 0.850 | N1 = 1.83350 | ν1 = 21.00 |
| r2 = 49.103 | d2 = 0.010 | N2 = 1.51400 | ν2 = 42.83 |
| r3 = 49.103 | d3 = 6.832 | N3 = 1.60311 | ν3 = 60.74 |
| r4 = −742.782 | d4 = 0.100 | | |
| r5 = 36.140 | d5 = 4.004 | N4 = 1.49310 | ν4 = 83.58 |
| r6 = 78.445 | d6 = 1.300 – 20.851 – 33.939 | | |
| r7* = 63.075 | d7 = 0.850 | N5 = 1.76743 | ν5 = 49.48 |
| r8 = 10.845 | d8 = 4.368 | | |
| r9 = −29.830 | d9 = 0.850 | N6 = 1.75450 | ν6 = 51.57 |
| r10 = 45.558 | d10 = 0.100 | | |
| r11 = 23.778 | d11 = 2.289 | N7 = 1.83350 | ν7 = 21.00 |
| r12 = −98.341 | d12 = 3.039 | | |
| r13 = −18.837 | d13 = 0.850 | N8 = 1.75450 | ν8 = 51.57 |
| r14 = −48.517 | d14 = 15.023 – 7.869 – 1.200 | | |
| r15 = ∞ | d15 = 0.100 | | |
| r16 = 21.882 | d16 = 2.646 | N9 = 1.51823 | ν9 = 58.96 |
| r17 = −51.514 | d17 = 0.100 | | |
| r18 = 18.481 | d18 = 6.290 | N10 = 1.48749 | ν10 = 70.44 |
| r19 = −115.253 | d19 = 0.298 | | |
| r20 = −45.228 | d20 = 0.850 | N11 = 1.84666 | ν11 = 23.82 |
| r21* = 42.654 | d21 = 4.975 – 1.509 – 0.700 | | |
| r22 = 19.223 | d22 = 3.007 | N12 = 1.51742 | ν12 = 52.15 |
| r23 = −20.911 | d23 = 0.424 | | |
| r24* = −112.331 | d24 = 0.850 | N13 = 1.76743 | ν13 = 49.48 |
| r25* = 21.983 | d25 = 5.719 | | |
| r26 = 45.478 | d26 = 1.277 | N14 = 1.67339 | ν14 = 29.25 |
| r27 = 123.643 | | | |

Aspherical Coefficient of 7th surface (r7)

$\epsilon$ = 1.0000
A4 = 0.53919477 × 10$^{-5}$
A6 = 0.12977480 × 10$^{7}$
A8 = −0.92785020 × 10$^{9}$
A10 = 0.90916534 × 10$^{11}$
A12 = −0.30151659 × 10$^{13}$ Aspherical Coefficient of 21st surface (r21)

$\epsilon$ = 1.0000
A4 = 0.30616607 × 10$^{4}$
A6 = 0.40057328 × 10$^{8}$
A8 = 0.18051696 × 10$^{8}$
A10 = −0.17647138 × 10$^{10}$
A12 = 0.37134339 × 10$^{13}$ Aspherical Coefficient of 24th surface (r24)

$\epsilon$ = 1.0000
A4 = −0.52277831 × 10$^{5}$

TABLE 1-continued

Embodiment 1 (Positive-Negative-Positive-Positive)
f = 22.75 – 60.00 – 155.40
FNO = 4.60 – 5.22 – 5.80

$A6 = -0.19537092 \times 10^5$
$A8 = 0.70231340 \times 10^7$
$A10 = -0.15680965 \times 10^8$
$A12 = 0.13290194 \times 10^{10}$ Aspherical Coefficient of 25th surface (r25)

$\epsilon = 1.0000$
$A4 = 0.64498729 \times 10^4$
$A6 = -0.13743911 \times 10^5$
$A8 = 0.53064396 \times 10^7$
$A10 = -0.12302255 \times 10^8$
$A12 = 0.10915068 \times 10^{10}$

TABLE 2

Embodiment 2 (Positive-Negative-Positive-Positive)
f = 22.75 – 60.00 – 155.47
FNO = 4.60 – 5.22 – 5.80

| Radius of Curvature | Axial Distance | Refractive Index | Abbe Number |
|---|---|---|---|
| r1 = 67.212 | d1 = 0.850 | N1 = 1.83350 | v1 = 21.00 |
| r2 = 46.411 | d2 = 0.010 | N2 = 1.51400 | v2 = 42.83 |
| r3 = 46.411 | d3 = 5.611 | N3 = 1.60311 | v3 = 60.74 |
| r4 = −1533.625 | d4 = 0.100 | | |
| r5 = 37.479 | d5 = 3.192 | N4 = 1.49310 | v4 = 83.58 |
| r6 = 80.254 | d6 = 1.300 – 18.806 – 33.718 | | |
| r7* = 55.942 | d7 = 1.885 | N5 = 1.76743 | v5 = 49.48 |
| r8 = 11.445 | d8 = 5.063 | | |
| r9 = −23.786 | d9 = 0.850 | N6 = 1.75450 | v6 = 51.57 |
| r10 = 76.080 | d10 = 0.100 | | |
| r11 = 30.979 | d11 = 2.383 | N7 = 1.83350 | v7 = 21.00 |
| r12 = −51.984 | d12 = 3.062 | | |
| r13 = −14.519 | d13 = 0.850 | N8 = 1.75450 | v8 = 51.57 |
| r14 = −33.010 | d14 = 15.174 – 7.640 – 1.200 | | |
| r15 = ∞ | d15 = 0.100 | | |
| r16 = 18.695 | d16 = 3.912 | N9 = 1.51823 | v9 = 58.96 |
| r17 = −76.828 | d17 = 0.117 | | |
| r18 = 17.787 | d18 = 5.364 | N10 = 1.48749 | v10 = 70.44 |
| r19 = −191.752 | d19 = 0.100 | | |
| r20 = −1380.472 | d20 = 1.305 | N11 = 1.84666 | v11 = 23.82 |
| r21* = 22.105 | d21 = 4.450 – 0.372 – 0.700 | | |
| r22 = 13.823 | d22 = 2.946 | N12 = 1.51742 | v12 = 52.15 |
| r23 = −38.168 | d23 = 0.100 | | |
| r24* = 203.761 | d24 = 0.850 | N13 = 1.76743 | v13 = 49.48 |
| r25* = 15.784 | d25 = 5.907 | | |
| r26 = 41.896 | d26 = 1.417 | N14 = 1.67339 | v14 = 29.25 |
| r27 = 183.628 | | | |

Aspherical Coefficient of 7th (r7)

$\epsilon = 1.0000$
$A4 = 0.13382026 \times 10^4$
$A6 = 0.98519488 \times 10^7$
$A8 = -0.20533289 \times 10^8$
$A10 = 0.14078856 \times 10^{10}$
$A12 = -0.28051717 \times 10^{13}$ Aspherical Coefficient of 21st surface(r21)

$\epsilon = 1.0000$
$A4 = 0.56033831 \times 10^4$
$A6 = 0.20859596 \times 10^6$
$A8 = -0.89435819 \times 10^9$
$A10 = -0.32902126 \times 10^{10}$
$A12 = 0.14244659 \times 10^{11}$ Aspherical Coefficient of 24th surface (r24)

$\epsilon = 1.0000$
$A4 = 0.24244833 \times 10^5$
$A6 = -0.18608783 \times 10^5$
$A8 = 0.65868793 \times 10^7$
$A10 = -0.15356660 \times 10^8$
$A12 = 0.15529677 \times 10^{10}$ TABLE 2-continued Embodiment 2 (Positive-Negative-Positive-Positive)
f = 22.75 – 60.00 – 155.47
FNO = 4.60 – 5.22 – 5.80

Aspherical Coefficient of 25th surface (r25)

$\epsilon = 1.0000$
$A4 = 0.52954566 \times 10^4$
$A6 = -0.15597732 \times 10^5$
$A8 = 0.56109687 \times 10^7$
$A10 = -0.13012153 \times 10^8$
$A12 = 0.13945660 \times 10^{10}$

TABLE 3

Embodiment 3 (Positive-Negative-Positive-Positive-Positive)
f = 22.50 – 68.20 – 215.00
FNO = 4.10 – 5.20 – 5.80

| Radius of Curvature | Axial Distance | Refractive Index | Abbe Number |
|---|---|---|---|
| r1 = 80.048 | d1 = 1.029 | N1 = 1.80518 | v1 = 25.43 |
| r2 = 57.119 | d2 = 6.629 | N2 = 1.49310 | v2 = 83.58 |
| r3 = −686.945 | d3 = 0.100 | | |
| r4 = 51.762 | d4 = 4.088 | N3 = 1.49310 | v3 = 83.58 |
| r5 = 135.089 | d5 = 1.500 – 26.164 – 50.362 | | |
| r6 = 77.308 | d6 = 0.878 | N4 = 1.69100 | v4 = 54.75 |
| r7 = 14.185 | d7 = 6.170 | | |
| r8 = −48.588 | d8 = 0.800 | N5 = 1.75450 | v5 = 51.57 |
| r9 = 73.917 | d9 = 0.100 | | |
| r10 = 23.819 | d10 = 3.650 | N6 = 1.75000 | v6 = 25.14 |
| r11 = −75.534 | d11 = 2.701 | | |
| r12 = −29.293 | d12 = 0.800 | N7 = 1.75450 | v7 = 51.57 |
| r13 = 78.141 | d13 = 23.521 – 11.891 – 1.400 | | |
| r14 = ∞ | d14 = 0.100 | | |
| r15 = 24.193 | d15 = 2.713 | N8 = 1.51680 | v8 = 64.20 |
| r16 = −47.408 | d16 = 0.100 | | |
| r17 = 21.182 | d17 = 3.254 | N9 = 1.48749 | v9 = 70.44 |
| r18 = 65.015 | d18 = 1.650 | | |
| r19 = −92.530 | d19 = 0.800 | N10 = 1.84666 | v10 = 23.82 |
| r20* = 42.252 | d20 = 9.281 – 2.619 – 0.717 | | |
| r21 = 17.163 | d21 = 4.056 | N11 = 1.51742 | v11 = 52.15 |
| r22 = −46.620 | d22 = 0.100 | | |
| r23 = 87.349 | d23 = 1.175 | N12 = 1.80518 | v12 = 25.43 |
| r24 = 509.458 | d24 = 0.965 | | |
| r25* = 138.258 | d25 = 0.800 | N13 = 1.85000 | v13 = 40.04 |
| r26* = 19.662 | d26 = 0.672 | | |
| r27 = 27.113 | d27 = 0.800 | N14 = 1.62280 | v14 = 56.88 |
| r28 = 22.689 | d28 = 2.500 – 18.435 – 36.253 | | |
| r29 = 31.045 | d29 = 1.968 | N15 = 1.85000 | v15 = 40.04 |
| r30 = 41.969 | | | |

Aspherical Coefficient of 20th surface (r20)

$\epsilon = 1.0000$
$A4 = 0.18678882 \times 10^4$
$A6 = -0.47853636 \times 10^7$
$A8 = 0.37470232 \times 10^9$
$A10 = 0.11785832 \times 10^{10}$
$A12 = -0.16578337 \times 10^{12}$ Aspherical Coefficient 25th surface (r25)

$\epsilon = 1.0000$
$A4 = 0.65904779 \times 10^5$
$A6 = -0.13944774 \times 10^6$
$A8 = -0.94140733 \times 10^8$
$A10 = -0.23493494 \times 10^{10}$
$A12 = 0.14565145 \times 10^{11}$
$A14 = 0.25270598 \times 10^{13}$
$A16 = -0.37388998 \times 10^{15}$ Aspherical Coefficient of 26th surface (r26)

$\epsilon = 1.0000$
$A4 = 0.49504291 \times 10^4$
$A6 = 0.47600063 \times 10^6$
$A8 = -0.17908974 \times 10^7$
$A10 = -0.55364564 \times 10^{10}$ TABLE 3-continued Embodiment 3 (Positive-Negative-Positive-Positive-Positive)
f = 22.50 – 68.20 – 215.00
FNO = 4.10 – 5.20 – 5.80

$A12 = 0.32457935 \times 10^{11}$
$A14 = 0.32959983 \times 10^{13}$
$A16 = -0.62440082 \times 10^{15}$

TABLE 4

Embodiment 4 (Positive-Negative-Positive-Positive)
f = 22.75 – 59.93 – 155.17
FNO = 4.60 – 5.22 – 5.80

| Radius of Curvature | Axial Distance | Refractive Index | Abbe Number |
|---|---|---|---|
| r1 = 72.851 | d1 = 0.850 | N1 = 1.83350 | ν1 = 21.00 |
| r2 = 48.826 | d2 = 0.010 | N2 = 1.51400 | ν2 = 42.83 |
| r3 = 48.826 | d3 = 6.731 | N3 = 1.60311 | ν3 = 60.74 |
| r4 = −743.052 | d4 = 0.100 | | |
| r5 = 36.142 | d5 = 3.894 | N4 = 1.49310 | ν4 = 83.58 |
| r6 = 77.414 | d6 = 1.300 – 20.638 – 34.123 | | |
| r7* = 62.170 | d7 = 0.850 | N5 = 1.76743 | ν5 = 49.48 |
| r8 = 11.086 | d8 = 4.431 | | |
| r9 = −29.539 | d9 = 0.850 | N6 = 1.75450 | ν6 = 51.57 |
| r10 = 45.461 | d10 = 0.100 | | |
| r11 = 24.289 | d11 = 2.344 | N7 = 1.83350 | ν7 = 21.00 |
| r12 = −87.444 | d12 = 3.182 | | |
| r13 = −19.038 | d13 = 0.850 | N8 = 1.75450 | ν8 = 51.57 |
| r14 = −53.952 | d14 = 15.077 – 7.879 – 1.200 | | |
| r15 = ∞ | d15 = 0.100 | | |
| r16 = 22.055 | d16 = 2.988 | N9 = 1.51823 | ν9 = 58.96 |
| r17 = −44.073 | d17 = 0.100 | | |
| r18 = 19.991 | d18 = 5.297 | N10 = 1.48749 | ν10 = 70.44 |
| r19 = −64.818 | d19 = 0.984 | | |
| r20 = −30.830 | d20 = 0.850 | N11 = 1.84666 | ν11 = 23.82 |
| r21* = 59.733 | d21 = 5.061 – 1.508 – 0.700 | | |
| r22* = 18.290 | d22 = 3.059 | N12 = 1.51742 | ν12 = 52.15 |
| r23 = −22.116 | d23 = 0.881 | | |
| r24* = −99.846 | d24 = 0.850 | N13 = 1.76743 | ν13 = 49.48 |
| r25* = 19.530 | d25 = 4.796 | | |
| r26 = 44.719 | d26 = 1.465 | N14 = 1.67339 | ν14 = 29.25 |
| r27 = 469.620 | | | |

Aspherical Coefficient of 7th surface (r7)

$\epsilon = 1.0000$
$A4 = 0.36769989 \times 10^{5}$
$A6 = 0.41248601 \times 10^{7}$
$A8 = -0.14463614 \times 10^{8}$
$A10 = 0.13336293 \times 10^{10}$
$A12 = -0.42968679 \times 10^{13}$ Aspherical Coefficient of 21st surface (r21)

$\epsilon = 1.0000$
$A4 = 0.24207157 \times 10^{4}$
$A6 = -0.48361840 \times 10^{7}$
$A8 = 0.59586676 \times 10^{9}$
$A10 = 0.11850291 \times 10^{10}$
$A12 = -0.83049270 \times 10^{13}$ Aspherical Coefficient of 22nd surface (r22)

$\epsilon = 1.0000$
$A4 = 0.38207372 \times 10^{5}$
$A6 = -0.14625447 \times 10^{6}$
$A8 = 0.61670087 \times 10^{9}$
$A10 = 0.32098242 \times 10^{10}$
$A12 = 0.20509427 \times 10^{12}$ Aspherical Coefficient of 24th surface (r24)

$\epsilon = 1.0000$
$A4 = -0.50603100 \times 10^{5}$
$A6 = -0.19631458 \times 10^{5}$
$A8 = 0.68324345 \times 10^{7}$
$A10 = -0.16425773 \times 10^{8}$
$A12 = 0.13554701 \times 10^{10}$ TABLE 4-continued Embodiment 4 (Positive-Negative-Positive-Positive)
f = 22.75 − 59.93 − 155.17
FNO = 4.60 − 5.22 − 5.80

Aspherical Coefficient of 25th surface (r25)

$\epsilon = 1.0000$
$A4 = 0.66529459 \times 10^4$
$A6 = -0.14010843 \times 10^5$
$A8 = 0.49766763 \times 10^7$
$A10 = -0.12822056 \times 10^8$
$A12 = 0.11654932 \times 10^{10}$

TABLE 5

Embodiment 5 (Positive-Negative-Positive-Positive-Positive)
f = 22.50 − 68.20 − 215.01
FNO = 4.10 − 5.20 − 5.80

| Radius of Curvature | Axial Distance | Refractive Index | Abbe Number |
|---|---|---|---|
| r1 = 83.031 | d1 = 0.900 | N1 = 1.80518 | ν1 = 25.43 |
| r2 = 58.244 | d2 = 8.632 | N2 = 1.49310 | ν2 = 83.58 |
| r3 = −578.162 | d3 = 0.100 | | |
| r4 = 50.487 | d4 = 5.067 | N3 = 1.49310 | ν3 = 83.58 |
| r5 = 130.665 | d5 = 1.500 − 27.727 − 47.883 | | |
| r6 = 54.141 | d6 = 0.900 | N4 = 1.69100 | ν4 = 54.75 |
| r7 = 13.636 | d7 = 6.568 | | |
| r8 = −43.963 | d8 = 0.900 | N5 = 1.75450 | ν5 = 51.57 |
| r9 = 68.381 | d9 = 0.100 | | |
| r10 = 22.995 | d10 = 3.675 | N6 = 1.75000 | ν6 = 25.14 |
| r11 = −76.156 | d11 = 1.991 | | |
| r12 = −27.803 | d12 = 0.900 | N7 = 1.75450 | ν7 = 51.57 |
| r13 = 76.918 | d13 = 23.778 − 12.929 − 1.400 | | |
| r14 = ∞ | d14 = 0.100 | | |
| r15 = 23.349 | d15 = 2.694 | N8 = 1.51680 | ν8 = 64.20 |
| r16 = −109.602 | d16 = 0.100 | | |
| r17 = 17.126 | d17 = 3.780 | N9 = 1.48749 | ν9 = 70.44 |
| r18 = 54.839 | d18 = 2.069 | | |
| r19 = 1000.170 | d19 = 0.960 | N10 = 1.84666 | ν10 = 23.82 |
| r20* = 26.326 | d20 = 5.000 − 0.731 − 0.717 | | |
| r21 = 16.450 | d21 = 3.458 | N11 = 1.51742 | ν11 = 52.15 |
| r22 = −41.645 | d22 = 0.100 | | |
| r23 = 107.729 | d23 = 1.269 | N12 = 1.80518 | ν12 = 25.43 |
| r24 = −234.940 | d24 = 0.678 | | |
| r25* = 308.495 | d25 = 0.900 | N13 = 1.85000 | ν13 = 40.04 |
| r26* = 19.631 | d26 = 1.743 | | |
| r27 = 34.180 | d27 = 0.900 | N14 = 1.62280 | ν14 = 56.88 |
| r28 = 28.353 | d28 = 2.500 − 15.493 − 13.880 | | |
| r29 = 27.227 | d29 = 1.641 | N15 = 1.85000 | ν15 = 40.04 |
| r30 = 36.334 | | | |

Aspherical Coefficient of 20th surface (r20)

$\epsilon = 1.0000$
$A4 = 0.29375182 \times 10^4$
$A6 = -0.61263568 \times 10^7$
$A8 = 0.72651555 \times 10^9$
$A10 = 0.14884299 \times 10^{10}$
$A12 = -0.22214701 \times 10^{12}$ Aspherical Coefficient of 25th surface (r25)

$\epsilon = 1.0000$
$A4 = 0.59719107 \times 10^5$
$A6 = -0.15750654 \times 10^6$
$A8 = -0.76280738 \times 10^8$
$A10 = -0.18941169 \times 10^{10}$
$A12 = 0.12179777 \times 10^{11}$
$A14 = 0.19818816 \times 10^{13}$
$A16 = -0.35165979 \times 10^{15}$ Aspherical Coefficient of 26th surface (r26)

$\epsilon = 1.0000$
$A4 = 0.53641668 \times 10^4$
$A6 = 0.64473049 \times 10^6$
$A8 = -0.19461151 \times 10^7$
$A10 = -0.42546389 \times 10^{10}$ TABLE 5-continued Embodiment 5 (Positive-Negative-Positive-Positive-Positive)
f = 22.50 – 68.20 – 215.01
FNO = 4.10 – 5.20 – 5.80

$A12 = 0.38972037 \times 10^{11}$
$A14 = 0.38043446 \times 10^{13}$
$A16 = -0.94934519 \times 10^{15}$

TABLE 6

Embodiment 6 (Positive-Negative-Positive-Positive)
f = 22.75 – 60.00 – 155.40
FNO = 4.60 – 5.22 – 5.80

| Radius of Curvature | Axial Distance | Refractive Index | Abbe Number |
|---|---|---|---|
| r1 = 73.644 | d1 = 0.850 | N1 = 1.83350 | v1 = 21.00 |
| r2 = 49.348 | d2 = 0.010 | N2 = 1.51400 | v2 = 42.83 |
| r3 = 49.348 | d3 = 6.787 | N3 = 1.60311 | v3 = 60.74 |
| r4 = −712.296 | d4 = 0.100 | | |
| r5 = 35.459 | d5 = 3.967 | N4 = 1.49310 | v4 = 83.58 |
| r6 = 74.524 | d6 = 1.300 – 20.632 – 33.920 | | |
| r7* = 46.570 | d7 = 0.850 | N5 = 1.76743 | v5 = 49.48 |
| r8 = 10.755 | d8 = 4.530 | | |
| r9 = −27.774 | d9 = 0.850 | N6 = 1.75450 | v6 = 51.57 |
| r10 = 46.989 | d10 = 0.100 | | |
| r11 = 24.010 | d11 = 2.281 | N7 = 1.83350 | v7 = 21.00 |
| r12 = −90.639 | d12 = 2.743 | | |
| r13 = −17.051 | d13 = 0.850 | N8 = 1.75450 | v8 = 51.57 |
| r14 = −43.623 | d14 = 15.155 – 7.948 – 1.200 | | |
| r15 = ∞ | d15 = 0.100 | | |
| r16 = 21.240 | d16 = 3.209 | N9 = 1.51823 | v9 = 58.96 |
| r17 = −44.629 | d17 = 0.891 | | |
| r18 = 23.330 | d18 = 4.839 | N10 = 1.48749 | v10 = 70.44 |
| r19 = −36.872 | d19 = 1.199 | | |
| r20 = −20.796 | d20 = 0.850 | N11 = 1.84666 | v11 = 23.82 |
| r21* = 270.860 | d21 = 4.193 – 0.937 – 0.700 | | |
| r22 = 23.066 | d22 = 3.862 | N12 = 1.51742 | v12 = 52.15 |
| r23 = −18.159 | d23 = 1.524 | | |
| r24* = −35.189 | d24 = 0.850 | N13 = 1.76743 | v13 = 49.48 |
| r25* = 26.402 | d25 = 3.487 | | |
| r26 = 48.817 | d26 = 1.623 | N14 = 1.67339 | v14 = 29.25 |
| r27 = −167.772 | | | |

Aspherical Coefficient of 7th surface (r7)

$\epsilon = 1.0000$
$A4 = 0.44355027 \times 10^{5}$
$A6 = 0.37073814 \times 10^{7}$
$A8 = -0.14298960 \times 10^{8}$
$A10 = 0.13373838 \times 10^{10}$
$A12 = -0.41256179 \times 10^{13}$ Aspherical Coefficient of 21st surface (r21)

$\epsilon = 1.0000$
$A4 = 0.10880422 \times 10^{5}$
$A6 = 0.87297423 \times 10^{7}$
$A8 = -0.46204110 \times 10^{9}$
$A10 = -0.16402917 \times 10^{10}$
$A12 = 0.30793032 \times 10^{12}$ Aspherical Coefficient of 24th surface (r24)

$\epsilon = 1.0000$
$A4 = -0.69215309 \times 10^{5}$
$A6 = -0.18251333 \times 10^{5}$
$A8 = 0.65109565 \times 10^{7}$
$A10 = -0.16403658 \times 10^{8}$
$A12 = 0.15287778 \times 10^{10}$ Aspherical Coefficient of 25th surface (r25)

$\epsilon = 1.0000$
$A4 = 0.69987925 \times 10^{4}$
$A6 = -0.15500116 \times 10^{5}$
$A8 = 0.53872257 \times 10^{7}$
$A10 = -0.12642621 \times 10^{8}$
$A12 = 0.11335431 \times 10^{10}$

TABLE 7

Embodiment 7 (Negative-Positive for Digital Camera)
f = 3.69 – 5.82 – 10.50
FNO = 4.10 – 4.75 – 5.78

| Radius of Curvature | Axial Distance | Refractive Index | Abbe Number |
|---|---|---|---|
| r1* = 46.083 | d1 = 0.400 | N1 = 1.62280 | v1 = 56.88 |
| r2 = 2.883 | d2 = 1.672 | | |
| r3* = 5.884 | d3 = 3.868 | N2 = 1.84666 | v2 = 23.82 |
| r4* = 7.604 | d4 = 8.563 – 4.194 – 0.820 | | |
| r5 = ∞ | d5 = 0.800 | | |
| r6 = 2.913 | d6 = 3.373 | N3 = 1.48749 | v3 = 70.44 |
| r7 = –5.748 | d7 = 0.293 | | |
| r8* = –3.920 | d8 = 3.182 | N4 = 1.84666 | v4 = 23.82 |
| r9* = –7.845 | d9 = 0.800 – 3.222 – 8.542 | | |
| r10 = ∞ | d10 = 4.200 | N5 = 1.54426 | v5 = 69.60 |
| r11 = ∞ | | | |

Aspherical Coefficient of 1st surface (r1)

$\epsilon = 1.0000$
$A4 = 0.24747949 \times 10^2$
$A6 = 0.10618463 \times 10^3$
$A8 = -0.17996840 \times 10^4$
$A10 = -0.17184476 \times 10^5$
$A12 = 0.23032385 \times 10^6$ Aspherical Coefficient of 3rd surface (r3)

$\epsilon = 1.0000$
$A4 = -0.12245530 \times 10^2$
$A6 = 0.65385605 \times 10^3$
$A8 = -0.32422344 \times 10^3$
$A10 = 0.71251604 \times 10^4$
$A12 = -0.48974810 \times 10^5$ Aspherical Coefficient of 4th surface (r4)

$\epsilon = 1.0000$
$A4 = -0.31843530 \times 10^2$
$A6 = 0.29369237 \times 10^2$
$A8 = -0.22954183 \times 10^2$
$A10 = 0.76617927 \times 10^3$
$A12 = -0.86999434 \times 10^4$ Aspherical Coefficient of 8th surface (r8)

$\epsilon = 1.0000$
$A4 = -0.80434135 \times 10^2$
$A6 = -0.28840712 \times 10^2$
$A8 = 0.34107101 \times 10^2$
$A10 = -0.21304690 \times 10^2$
$A12 = 0.46284236 \times 10^3$ Aspherical Coefficient of 9th surface (r9)

$\epsilon = 1.0000$
$A4 = 0.22954897 \times 10^3$
$A6 = -0.36331138 \times 10^2$
$A8 = 0.40459861 \times 10^2$
$A10 = -0.19333060 \times 10^2$
$A12 = 0.34380873 \times 10^3$

TABLE 8

Embodiment 8 (Positive-Positive-Negative for Lens Shutter Camera)
f = 22.55 – 41.00 – 85.50
FNO = 5.70 – 8.00 – 10.00

| Radius of Curvature | Axial Distance | Refractive Index | Abbe Number |
|---|---|---|---|
| r1 = –34.707 | d1 = 0.698 | N1 = 1.79850 | v1 = 22.60 |
| r2 = –48.010 | d2 = 0.100 | | |
| r3* = 11.652 | d3 = 1.598 | N2 = 1.48749 | v2 = 70.44 |
| r4* = 21.202 | d4 = 2.300 – 6.509 – 13.187 | | |
| r5* = –23.909 | d5 = 1.300 | N3 = 1.54814 | v3 = 45.82 |
| r6* = –31.355 | d6 = 1.000 | | |
| r7 = ∞ | d7 = 1.590 | | |
| r8 = –16.914 | d8 = 3.110 | N4 = 1.48749 | v4 = 70.44 |
| r9* –5.836 | d9 = 9.766 – 4.567 – 0.900 | | |
| r10* = –7.988 | d10 = 1.750 | N5 = 1.48749 | v5 = 70.44 |

TABLE 8-continued

Embodiment 8 (Positive-Positive-Negative for Lens Shutter Camera)
f = 22.55 – 41.00 – 85.50
FNO = 5.70 – 8.00 – 10.00

| r11* = −7.924 | d11 = 0.938 | | |
|---|---|---|---|
| r12 = −8.595 | d12 = 0.650 | N6 = 1.58313 | v6 = 59.46 |
| r13 = −83.087 | | | |

Aspherical Coefficient of 3rd surface (r3)

$\epsilon$ = 1.0000
A4 = −0.14711401 × $10^3$
A6 = 0.16477938 × $10^4$
A8 = −0.11836071 × $10^5$
A10 = 0.94016093 × $10^7$
A12 = −0.48532319 × $10^8$
A14 = 0.13326931 × $10^9$
A16 = −0.14371726 × $10^{11}$ Aspherical Coefficient of 4th surface (r4)

$\epsilon$ = 1.0000
A4 = −0.16970229 × $10^3$
A6 = 0.11526026 × $10^4$
A8 = 0.68195112 × $10^6$
A10 = −0.11184070 × $10^6$
A12 = 0.64807651 × $10^8$
A14 = −0.18229382 × $10^9$
A16 = 0.21235723 × $10^{11}$ Aspherical Coefficient of 5th surface (r5)

$\epsilon$ = 1.0000
A4 = 0.76229639 × $10^3$
A6 = 0.52030073 × $10^4$
A8 = −0.80023801 × $10^5$
A10 = 0.12270021 × $10^5$
A12 = −0.11221755 × $10^6$
A14 = 0.52376100 × $10^8$
A16 = −0.98264545 × $10^{10}$ Aspherical Coefficient of 6th surface (r6)

$\epsilon$ = 1.0000
A4 = 0.14751246 × $10^2$
A6 = 0.11169400 × $10^3$
A8 = −0.12075263 × $10^4$
A10 = 0.54081907 × $10^6$
A12 = 0.14870778 × $10^6$
A14 = −0.19029104 × $10^7$
A16 = 0.67678056 × $10^9$ Aspherical Coefficient of 9th surface (r2)

$\epsilon$ = 1.0000
A4 = 0.11906452 × $10^3$
A6 = 0.38827966 × $10^5$
A8 = −0.52720200 × $10^6$
A10 = 0.33061693 × $10^7$
A12 = −0.14803086 × $10^8$ Aspherical Coefficient of 10th surface (r10)

$\epsilon$ = 1.0000
A4 = 0.76105480 × $10^3$
A6 = 0.11344512 × $10^4$
A8 = −0.72820495 × $10^6$
A10 = 0.14320216 × $10^7$
A12 = −0.14215364 × $10^9$
A14 = 0.22707569 × $10^{11}$
A16 = −0.21645474 × $10^{13}$ Aspherical Coefficient of 11th surface (r11)

$\epsilon$ = 1.0000
A4 = 0.52908451 × $10^3$
A6 = 0.19071231 × $10^5$
A8 = −0.32979307 × $10^6$
A10 = 0.25443243 × $10^7$
A12 = −0.97012324 × $10^9$
A14 = 0.16196830 × $10^{10}$
A16 = −0.94293353 × $10^{13}$

TABLE 9

Comparable Example (Positive-Negative-Positive-Positive)
f = 22.75 – 60.00 – 155.40
FNO = 4.60 – 5.22 – 5.80

| Radius of Curvature | Axial Distance | Refractive Index | Abbe Number |
|---|---|---|---|
| r1 = 80.507 | d1 = 1.500 | N1 = 1.83350 | v1 = 21.00 |
| r2 = 50.638 | d2 = 0.010 | N2 = 1.51400 | v2 = 42.83 |
| r3 = 50.638 | d3 = 6.300 | N3 = 1.60311 | v3 = 60.74 |
| r4 = −590.399 | d4 = 0.100 | | |
| r5 = 36.741 | d5 = 4.330 | N4 = 1.49310 | v4 = 83.58 |
| r6 = 91.218 | d6 = 1.300 – 19.406 – 33.552 | | |
| r7* = 91.218 | d7 = 1.300 | N5 = 1.76743 | v5 = 49.48 |
| r8 = 11.256 | d8 = 4.440 | | |
| r9 = −33.551 | d9 = 1.000 | N6 = 1.75450 | v6 = 51.57 |
| r10 = 45.126 | d10 = 0.100 | | |
| r11 = 22.081 | d11 = 2.780 | N7 = 1.83350 | v7 = 21.00 |
| r12 = −81.335 | d12 = 1.290 | | |
| r13 = −26.837 | d13 = 1.000 | N8 = 1.75450 | v8 = 51.57 |
| r14 = 267.900 | d14 = 14.735 – 7.506 – 1.200 | | |
| r15 = ∞ | d15 = 0.720 | | |
| r16 = 19.552 | d16 = 3.700 | N9 = 1.51823 | v9 = 58.96 |
| r17 = −70.651 | d17 = 0.100 | | |
| r18 = 20.750 | d18 = 4.000 | N10 = 1.48749 | v10 = 70.44 |
| r19 = −30.525 | d19 = 1.350 | | |
| r20 = −19.354 | d20 = 1.000 | N11 = 1.84666 | v11 = 23.82 |
| r21 = 266.334 | d21 = 4.800 – 1.900 – 0.700 | | |
| r22 = 25.488 | d22 = 4.240 | N12 = 1.51742 | v12 = 52.15 |
| r23 = −18.130 | d23 = 1.600 | | |
| r24* = −31.725 | d24 = 1.400 | N13 = 1.76743 | v13 = 49.48 |
| r25* = 29.200 | d25 = 1.250 | | |
| r26 = 30.049 | d26 = 2.150 | N14 = 1.67339 | v14 = 29.25 |
| r27 = 220.193 | | | |

Aspherical Coefficient of 7th surface (r7)

$\epsilon = 1.0000$
$A4 = -0.71639468 \times 10^6$
$A6 = 0.52909389 \times 10^7$
$A8 = -0.15444212 \times 10^8$
$A10 = 0.14666388 \times 10^{10}$
$A12 = -0.50346363 \times 10^{13}$ Aspherical Coefficient of 24th surface (r24)

$\epsilon = 1.0000$
$A4 = -0.12662318 \times 10^4$
$A6 = -0.18371721 \times 10^5$
$A8 = 0.64823035 \times 10^7$
$A10 = -0.16739676 \times 10^8$
$A12 = 0.15325296 \times 10^{10}$ Aspherical Coefficient of 25th surface (r25)

$\epsilon = 1.0000$
$A4 = 0.80098384 \times 10^4$
$A6 = -0.14551791 \times 10^5$
$A8 = 0.54084513 \times 10^7$
$A10 = -0.12612528 \times 10^8$
$A12 = 0.10743852 \times 10^{10}$ FIGS. 13 to 20 are aberration diagrams corresponding to the first to eighth embodiments, respectively. In each figure, (a) to (c), (d) to (f), and (g) to (i) show various aberrations at the wide angle end, at the middle, and at the telephoto end, respectively (from left to right, (a), (d), and (g) are for spherical aberration, etc., (b), (e), and (h) are for astigmatism, and (c), (f), and (i) are for distortion, while Y' indicates image height). Further, in each aberration diagram, solid line (d) shows the aberration for the d line and dashed line (SC) the sine condition, while dashed line (DM) and solid line (DS) show the astigmatism for the d line in the meridional and sagittal planes, respectively.

7. Centering Error Sensitivity Reduction Design From Comparative Example To Embodiment 1

As previously described, according to recent techniques, it is possible to suppress the occurrence of decentering aberration by performing centering within the zoom block when decentering has occurred within the zoom group. However, when the zoom block is tilted or afflicted with parallel decentering, it is difficult to suppress the decentering of the zoom block which is a movable group. In view of this, specific configurations of the first to fifth stages will be described below by taking an example in which the above described centering error sensitivity reduction design is applied to the zoom lens (comparative example). The comparative example (the condition before applying the centering error sensitivity reduction design) is a zoom lens consisting of four units, the first group Gr1 having a positive power, the second group Gr2 having a negative power, the third group Gr3 having a positive power, and the fourth group Gr4 having a positive power, arranged in this order as viewed from the object side, and performing zooming by varying the spacing between each group.

A. First Stage

First, the centering error sensitivity of each zoom block in the comparative example was examined by ray tracing, to determine the zoom group that would present a problem in manufacturing because of a relatively high centering error sensitivity (#10 in FIG. 4). Table 10 shows the decentering aberration (in other words, the centering error sensitivity) at the telephoto end when each zoom group in the comparative example is afflicted with a parallel decentering of 0.1 mm. In Table 10, DM and DS show the asymmetric aberration for the meridional and sagittal, respectively, and AXCM the axial coma aberration. The asymmetric aberration values are shown at image height Y'=−14.4. From Table 10, it can be seen that the centering error sensitivity of the third group Gr3 and fourth group Gr4 is very large. Here, the fourth group Gr4 was determined as the group (zoom block) whose centering error sensitivity should be reduced.

TABLE 10

Decentering Aberration of Each Zoom Block for Embodiment 1 at Telephoto End Condition (T) (mm)
Parallel Decentering [Amount of Decentering] = 0.1 mm

|  | DM | DS | AXCM |
|---|---|---|---|
| First Term 1 | 0.105 | 0.052 | 0.002 |
| Second Term 2 | 0.018 | 0.097 | 0.000 |
| Third Term 3 | 0.175 | −0.049 | 0.005 |
| Fourth Term 4 | −0.291 | −0.101 | −0.007 |

B. Second Stage

Next, the centering error sensitivity (decentering aberration) of the fourth group Gr4, the specific group in the comparative example, was calculated from the decentering aberration coefficient (#20 in FIG. 4). Table 11 shows the third order aberration coefficients of the fourth group Gr4 and its image side group. From left to right are the spherical aberration coefficient (I), coma aberration coefficient (II), astigmatism coefficient (III), Petzval sum (P), and distortion coefficient (V). Since the fourth group Gr4 is the zoom group closest to the image side, the fourth group Gr4 does not have its image side group. Accordingly, the third order aberration coefficients of its image side group are all 0. Table 12 shows the results of the calculations [Decentering amount]× [Specification term] and [Coefficient of first order combination] and [Decentering aberration] for each term. The decentering aberration coefficient is expressed by a first order combination of the third order aberration coefficients of the specific group and the third order aberration coefficients of the image side group; the coefficient of this first order combination is the [Coefficient of first order combination] in the right side column for each term. The first to fourth terms in Table 12 correspond to the first to fourth terms in [Decentering aberration coefficient], and their sum is the final [Decentering aberration]. The value of this sum was compared with the actual decentering aberration (Table 10) (#20 in FIG. 4).

TABLE 11

3$^{rd}$ Order Aberration Coefficients of Comparative Example (4$^{th}$ Lens Unit)

|  | (I) | (II) | (III) | (P) | (V) |
|---|---|---|---|---|---|
| Specific Lens Unit () D | −8.5792 × 10$^{-6}$ | −7.8172 × 10$^{-4}$ | −3.284 × 10$^{-2}$ | 1.5194 × 10$^{-2}$ | −0.7879 × 10$^{-0}$ |
| Image-Side Lens Unit () R | 0 | 0 | 0 | 0 | 0 |

TABLE 12

Decentering Aberration Caused By Parallel Decentering for Comparative Example at Telephoto End Condition (T)

|  | DM -E.FL.Y' 223.776 | DS -E.FL.Y' 223.776 | AXCM E.[(3.κ$^2$ .FL$^3$)/ (8.FNO$^2$)] 2049.861 |  |  |
|---|---|---|---|---|---|
| First Term 1 | 0.000 | 0.000 | 0.000 | (a'j-a i) | 0.010 |
| Second Term 2 | 0.058 | 0.012 | 0.005 | -ai | 0.003 |
| Third Term 3 | 0.000 | 0.000 | 0.000 | -(a'#j-a#i) | −0.249 |
| Fourth Term 4 | −1.161 | −0.387 | −0.039 | a#i | −2.213 |
| Sum | −0.103 | −0.375 | −0.034 |  |  |
| Actual Case | −1.217 | −0.393 | −0.031 |  |  |

C. Third Stage

The comparison of the two values showed very good agreement between the value obtained by the calculation using the decentering aberration coefficient and the value actually obtained by ray tracing. This means that the decentering aberration can be controlled using the third order aberration coefficients. If the two values differ greatly, there is the possibility that the actual aberration may not decrease even when controlled using the third order aberration coefficients; in that case, the system should be designed so as to minimize the spot image in the decentered condition (#60 in FIG. 4).

As can be seen from Table 12, the sum of axial coma aberration (AXCM) is mostly due to the value of the fourth term. The fourth term in the decentering aberration coefficient of the axial coma aberration is the spherical aberration coefficient (I)D of the decentered group (specific group) multiplied by [Coefficient of first order combination] {see equation (6F)}. For the asymmetric aberration also, the fourth term is dominant, and the fourth term in the decentering aberration coefficient of the asymmetric aberration is the coma aberration coefficient (II)D of the decentered group (specific group) multiplied by [Coefficient of first order combination] {see equation (5G)}. Thus it was found that, to reduce the axial coma aberration due to the parallel decentering of the fourth group Gr4, the spherical aberration coefficient (I)D of the fourth group Gr4 should be reduced, and to reduce the asymmetric aberration due to the parallel decentering, the coma aberration coefficient (II)D of the fourth group Gr4 should be reduced (#30 in FIG. 4).

D. Fourth Stage

Since the third order aberration coefficients making a major contribution to the centering error sensitivity have been determined in the third stage, design is now performed to reduce them (#40 in FIG. 4). More specifically, the spherical aberration coefficient (I)D and coma aberration coefficient (II)D of the fourth group Gr4 are reduced. Tables 13 and 14 show the third order aberration coefficients, decentering aberration, etc., in the same format as in Tables 11 and 12, when the design is done to reduce the third order aberration coefficients (I)D and (II)D. As can be seen from Table 14, by reducing the spherical aberration coefficient (I)D and coma aberration coefficient (II)D of the fourth group Gr4, both the axial coma aberration and asymmetric aberration are dramatically reduced compared with the comparative example.

TABLE 13

Improved Third Order Aberration Coefficients for Comparative Embodiment

|  | (I) | (II) | (III) | (P) | (V) |
|---|---|---|---|---|---|
| Specific Lens Unit () D | $-1.4195 \times 10^{-6}$ | $-1.6263 \times 10^{-4}$ | $0.264 \times 10^{-2}$ | $1.5638 \times 10^{-2}$ | $1.8596 \times 10^{-0}$ |
| Image-Side Lens Unit () R | 0 | 0 | 0 | 0 | 0 |

TABLE 14

Decentering Aberration Caused By Parallel Decentering for Comparative Example at Telephoto End Condition (T)

|  | DM $-E \cdot FL \cdot Y'$ 223.865 | DS $-E \cdot FL \cdot Y'$ 223.865 | AXCM $E \cdot [(3 \cdot \kappa^2 \cdot FL^3)/ (8 \cdot FNO^2)]$ 2052.295 |  |  |
|---|---|---|---|---|---|
| First Term 1 | 0.000 | 0.000 | 0.000 | (a'j −a i) | 0.010 |
| Second Term 2 | −0.016 | −0.012 | 0.001 | −ai | 0.003 |
| Third Term 3 | 0.000 | 0.000 | 0.000 | −(a'#j − a#i) | −0.348 |
| Fourth Term 4 | −0.247 | −0.082 | −0.007 | a#i | −2.263 |
| Sum | −0.263 | −0.095 | −0.006 |  |  |

E. Fifth Stage

When only the third order coefficients of the fourth group Gr4 are varied as described above, the balance of the third order aberration coefficients as a whole is disrupted, causing the problem that satisfactory optical performance cannot be obtained even though the centering error sensitivity is reduced. To address this, design was performed so as to reduce the sum of the third order aberration coefficients as a whole, while keeping the varied third order aberration coefficients of the fourth group Gr4 intact (#50 in FIG. 4). More specifically, in order to greatly vary the third order aberration coefficients of the third group Gr3, design was performed by adding an aspherical surface to the third group Gr3 so that satisfactory optical performance could be obtained over the entire zoom region. Since varying the third order aberration coefficients of the first to third units Gr1 Gr3 does not affect the decentering aberration of the fourth group Gr4, satisfactory optical performance and reduction of the centering error sensitivity of the fourth group Gr4 were achieved at the same time.

The condition after the design is done by adding the aspherical surface results in the first embodiment. Table 15 shows the actual decentering aberration after that design, in the same format as in Table 10. As can be seen from Table 15, reduction of the centering error sensitivity of the third group Gr3 is achieved simultaneously with the intended reduction of the centering error sensitivity of the fourth group Gr4. Table 16 shows the sums of the third order aberration coefficients of the respective zoom units at the telephoto end [T] for the comparative example and the first embodiment. The magnitude of the third order aberration coefficients is small for both cases, but what is characteristic is that the third order aberration coefficients of the third group Gr3 and fourth group Gr4 are reduced as the result of the above design.

TABLE 16

Third Order Aberration Coefficients

|  | Aberration Coefficient | (I) $\times 10^{-6}$ | (II) $\times 10^{-4}$ | (III) $\times 10^{-2}$ | (P) $\times 10^{-2}$ | (V) $\times 10^{-0}$ |
|---|---|---|---|---|---|---|
| Comparative Example | First Unit 1 | 1.1613 | −1.8144 | 4.3567 | 1.0104 | −12.7781 |
|  | Second Unit 2 | −3.528 | −0.6739 | −6.1886 | −4.7615 | 8.722 |
|  | Third Unit 3 | 11.057 | 10.307 | 5.111 | 2.341 | −0.619 |
|  | Fourth Unit 4 | −8.579 | −7.817 | −3.284 | 1.519 | −0.788 |
|  | Sum | 0.111 | 0.002 | −0.005 | 0.109 | −5.463 |
| Embodiment 1 | First Unit 1 | 1.0889 | −1.7327 | 4.2753 | 1.0017 | −13.1635 |
|  | Second Unit 2 | −1.5283 | 0.9903 | −5.3488 | −4.7081 | 8.8763 |
|  | Third Unit 3 | 1.829 | 2.783 | 0.749 | 2.176 | −2.816 |
|  | Fourth Unit 4 | −1.420 | −1.626 | 0.264 | 1.564 | 1.860 |
|  | Sum | −0.030 | 0.414 | −0.061 | 0.034 | −5.244 |

8. Numeric Tables Of Specific Group In Embodiments

Tables 17, 19, and 21 show the third order aberration coefficients of the specific group and image side group in the second to fourth embodiments, and Tables 18, 20, and 22 show the decentering aberration coefficients, etc. (in the respective terms) of the specific group in the second to fourth embodiments. The specific group is the fourth group Gr4 in the second embodiment, the first lens (the lens closest to the object side) in the third embodiment, and the second group Gr2 in the fourth embodiment. The third group Gr3 in the third embodiment is a low pass filter (LF).

TABLE 17

3rd Order Aberration Coefficients of Comparative Example (4th Lens Unit) for Embodiment 2

|  | (I) | (II) | (III) | (P) | (V) |
|---|---|---|---|---|---|
| Specific Lens Unit ( ) D | $-3.5756 \times 10^{-6}$ | $-4.3068 \times 10^{-4}$ | $-1.1899 \times 10^{-2}$ | $1.6021 \times 10^{-2}$ | $-0.9468 \times 10^{-0}$ |
| Image-Side Lens Unit ( ) R | 0 | 0 | 0 | 0 | 0 |

TABLE 18

Decentering Aberration Coefficient of 4th Lens Unit of Embodiment 2

Parallel Decentering

|  |  | (a'j − a i) | −a i | −(a'#j − a#i) | a # i |
|---|---|---|---|---|---|
|  | Coefficient | 0.0095 | 0.0031 | −0.324 | −2.2453 |
| Asymmetrical Aberration | Aberration Coefficient | 3 · (III)R + (P)R | 3 · (III)D + (P)D | 3 · (II)R | 3 · (II)D |
|  |  | 0 | −0.019676 | 0 | −0.001292 |
|  | Each Term | 1st term | 2nd term | 3rd term | 4th term |
|  |  | 0 | $-6.1 \times 10^{-5}$ | 0 | 0.00290102 |
| Actual Coma Aberration | Aberration Coefficient | (II)R | (II)D | (I)R | (I)D |
|  |  | 0 | −0.0004307 | 0 | $-3.576 \times 10^{-6}$ |
|  | Each Term | 1st term | 2nd term | 3rd term | 4th term |
|  |  | 0 | $-1.335 \times 10^{-6}$ | 0 | $8.0283 \times 10^{-6}$ |

Tilt Decentering

|  |  | hj − hi + a'j · TD | −hi | −(h#j − h#i + a' #j · TD) | h#i |
|---|---|---|---|---|---|
|  | Coefficient | 0.0157 | −0.4652 | 2.6594 | 14.4667 |
| Asymmetrical Aberration | Aberration Coefficient | 3 · (III)R + (P)R | 3 · (III)D + (P)D | 3 · (II)R | 3 · (II)D |
|  |  | 0 | −0.019676 | 0 | −0.001292 |
|  | Each Term (where 5th term is a'j−ai) | 1st term | 2nd term | 3rd term | 4th term |
|  |  | 0 | 0.00915328 | 0 | −0.0186916 |
|  |  |  |  |  | 5th term |
|  |  |  |  |  | 0.0095094 |
| Actual Coma Aberration | Aberration Coefficient | (II)R | (II)D | (I)R | (I)D |
|  |  | 0 | −0.0004307 | 0 | $-3.576 \times 10^{-6}$ |
|  | Each Term | 1st term | 2nd term | 3rd term | 4th term |
|  |  | 0 | 0.00020035 | 0 | $-5.173 \times 10^{-5}$ |

TABLE 19

3rd Order Aberration Coefficients of Comparative Example (4th Lens Unit) for Embodiment 2

|  | (I) | (II) | (III) | (P) | (V) |
|---|---|---|---|---|---|
| Specific Lens Unit ( ) D | $-49491.073 \times 10^{-6}$ | $235.1603 \times 10^{-4}$ | $6.0024 \times 10^{-2}$ | $-12.4794 \times 10^{-2}$ | $0.3855 \times 10^{-0}$ |
| Image-Side Lens Unit ( ) R | $47922.0629 \times 10^{-6}$ | $-936.6084 \times 10^{-4}$ | $-27.9519 \times 10^{-2}$ | $12.8632 \times 10^{-2}$ | $-0.3633 \times 10^{-0}$ |

TABLE 20

Decentering Aberration Coefficient of 4$^{th}$ Lens Unit of Embodiment 2

Parallel Decentering

| | Coefficient | (a 'j − a i)<br>−0.2018 | −a i<br>0 | −(a'#j − a#i)<br>−0.5665 | a # i<br>−1 |
|---|---|---|---|---|---|
| Asymmetrical<br>Aberration | Aberration<br>Coefficient<br>Each<br>Term | 3 · (III)R + (P)R<br>−0.709925<br>1$^{st}$ term<br>0.14326287 | 3 · (III)D + (P)D<br>0.055278<br>2$^{nd}$ term<br>0 | 3 · (II)R<br>−0.2809825<br>3$^{rd}$ term<br>0.1591766 | 3 · (II)D<br>−0.07054809<br>4$^{th}$ term<br>−0.0705481 |
| Actual Coma<br>Aberration | Aberration<br>Coefficient<br>Each<br>Term | (II)R<br>−0.0936608<br>1$^{st}$ term<br>0.01890076 | (II)D<br>0.02351603<br>2$^{nd}$ term<br>0 | (I)R<br>0.04792206<br>3$^{rd}$ term<br>−0.0271478 | (I)D<br>−0.0494911<br>4$^{th}$ term<br>0.04949107 |

Tilt Decentering

| | Coefficient | hj − hi + a'j · TD<br>−0.087 | −hi<br>−1 | −(h#j − h#i + a'<br>#j · TD)<br>−0.0833 | h#i<br>−3.0711 |
|---|---|---|---|---|---|
| Asymmetrical<br>Aberration | Aberration<br>Coefficient<br>Each Term<br>(where 5$^{th}$<br>term is<br>a'j − ai) | 3 · (III)R + (P)R<br>−0.709925<br>1$^{st}$ term<br>0.0596337 | 3 · (III)D + (P)D<br>0.055278<br>2$^{nd}$ term<br>−0.055278 | 3 · (II)R<br>−0.2809825<br>3$^{rd}$ term<br>0.02340584 | 3 · (II)D<br>0.07054809<br>4$^{th}$ term<br>−0.2166602<br>5$^{th}$ term<br>−0.2023392 |
| Actual Coma<br>Aberration | Aberration<br>Coefficient<br>Each<br>Term | (II)R<br>−0.0936608<br>1$^{st}$ term<br>0.00786751 | (II)D<br>0.02351603<br>2$^{nd}$ term<br>−0.023516 | (I)R<br>0.04792206<br>3$^{rd}$ term<br>−0.0039919 | (I)D<br>−0.0494911<br>4$^{th}$ term<br>0.15199204 |

TABLE 21

3$^{rd}$ Order Aberration Coefficients of Comparative Example (4$^{th}$ Lens Unit) for Embodiment 2

| | (I) | (II) | (III) | (P) | (V) |
|---|---|---|---|---|---|
| Specific<br>Lens Unit<br>( ) D | 209.5853<br>× 10$^{−6}$ | −6.5767<br>× 10$^{−4}$ | −2.5864<br>× 10$^{−2}$ | 3.3265<br>× 10$^{−2}$ | 0.7953<br>× 10$^{−0}$ |
| Image-Side<br>Lens Unit<br>( ) R | −327.4317<br>× 10$^{−6}$ | 21.147<br>× 10$^{−4}$ | 0.2521<br>× 10$^{−2}$ | −3.8088<br>× 10$^{−2}$ | −0.918<br>× 10$^{−0}$ |

TABLE 22

Decentering Aberration Coefficient of 4$^{th}$ Lens Unit of Embodiment 2

Parallel Decentering

| | Coefficient | (a 'j − a i)<br>0.0401 | −a i<br>−0.0137 | −(a'#j − a#i)<br>−0.3747 | a # i<br>−1.3056 |
|---|---|---|---|---|---|
| Asymmetrical<br>Aberration | Aberration<br>Coefficient<br>Each<br>Term | 3 · (III)R + (P)R<br>−0.030525<br>1$^{st}$ term<br>−0.0012241 | 3 · (III)D + (P)D<br>−0.044327<br>2$^{nd}$ term<br>−0.00060728 | 3 · (II)R<br>0.0063441<br>3$^{rd}$ term<br>−0.0023771 | 3 · (II)D<br>−0.001973<br>4$^{th}$ term<br>0.00257596 |
| Actual Coma<br>Aberration | Aberration<br>Coefficient<br>Each<br>Term | (II)R<br>0.0021147<br>1$^{st}$ term<br>8.4799 × 10$^{−5}$ | (II)D<br>−0.0006577<br>2$^{nd}$ term<br>9.0101 × 10$^{−6}$ | (I)R<br>−0.0003274<br>3$^{rd}$ term<br>0.00012269 | (I)D<br>0.00020959<br>4$^{th}$ term<br>−0.0002736 |

TABLE 22-continued

Decentering Aberration Coefficient of 4th Lens Unit of Embodiment 2

| | | Tilt Decentering | | | |
|---|---|---|---|---|---|
| | Coefficient | hj − hi + a'j · TD 0.3823 | −hi −0.7903 | −(h#j − h#i + a'#j · TD) −0.6234 | h#i −2.3261 |
| Asymmetrical Aberration | Aberration Coefficient Each Term (where 5th term is a'j − ai) | 3 · (III)R + (P)R −0.030525 1st term −0.0116697 | 3 · (III)D + (P)D −0.044327 2nd term 0.03503163 | 3 · (II)R 0.0063441 3rd term −0.0039549 | 3 · (II)D −0.001973 4th term 0.00458942 5th term 0.04009605 |
| Actual Coma Aberration | Aberration Coefficient Each Term | (II)R 0.0021147 1st term 0.00080845 | (II)D −0.0006577 2nd term 0.00051976 | (I)R −0.0003274 3rd term 0.00020412 | (I)D 0.00020959 4th term −0.0004875 |

9. Analysis 1 From Standpoint Of Aberration Corrections For The Lens System Obtained By Using The Design Technique The lens system obtained by using the centering error sensitivity reduction technique will be analyzed below from the standpoint of aberration corrections.

As a result of analyzing the zoom lens designed by using the centering error sensitivity reduction technique, it was found desirable that the following conditions be satisfied. These desirable conditions will be described by taking the first, second, fifth, and sixth embodiments as examples. These embodiments each comprise the first group Gr1 having a positive power, the second group Gr2 having a negative power, the third group Gr3 having a positive power, and the fourth group Gr4 having a positive power, arranged in this order as viewed from the object side, the configuration being such that, in zooming from the wide angle end [W] toward the telephoto end [T], at least the first group Gr1, the third group Gr3, and the fourth group Gr4 move toward the object side in such a manner that the spacing between the first group Gr1 and the second group Gr2 increases while the spacing between the second group Gr2 and the third group Gr3 decreases.

In the zoom lens designed by using the design technique having the above common configuration, as in the first, second, fifth, and sixth embodiments, it is desirable that the following conditional expression (A) be satisfied:

$$2.8 < \beta t2/\beta w2 < 6.0 \tag{A}$$

where $\beta t2$: Image magnification of second group Gr2 at telephoto end [T]

$\beta w2$: Image magnification of second group Gr2 at wide angle end [W].

The conditional expression (A) shows the condition for keeping the variable magnification ratio of the second group Gr2 within proper limits. If the upper limit of the conditional expression (A) is exceeded, the variable magnification ratio of the second group Gr2 becomes too large and the amount of object point movement from the wide angle end [W] to the telephoto end [T] becomes too large. As a result, the variation of the aberration of the second group Gr2 becomes too large, which is not desirable because it becomes difficult to obtain satisfactory optical performance. On the other hand, below the lower limit of the conditional expression (A) the variable magnification ratio of the second group Gr2 becomes too small, which is not desirable because it becomes difficult to achieve a high power zoom lens. Also, in a configuration where floating is performed by dividing the second group Gr2, the overall magnification of the group that performs the role of the second group Gr2 should be brought within the range that satisfies the conditional expression (1).

It is further desirable that the following conditional expression (Aa) be satisfied. By satisfying the conditional expression (Aa), a zoom lens with higher optical performance and higher magnification can be achieved.

$$3.5 < \beta t2/\beta w2 < 5.0 \tag{Aa}$$

Further, in the zoom lens designed by using the design technique having the above common configuration, as in the first, second, fifth, and sixth embodiments, it is desirable that the following conditional expression (B) be satisfied, and it is further desirable that both the conditional expressions (A) and (B) be satisfied.

$$|III3t \times ft \times Ymax/2| < 90 \tag{B}$$

where

III3t: Astigmatism coefficient of third group Gr3 at telephoto end [T]

ft: Focal length at telephoto end [T]

Ymax: Diagonal length of image plane used.

Initial values in the calculation of the aberration coefficient are $\alpha 1=0$, $h1=1$, $\alpha\#1=-1$, and $h\#1=-t$, where $\alpha 1$: Slope angle of paraxial marginal ray incident on the first surface, as converted to the angle in the object space $\alpha\#1$: Slope angle of off-paraxial principal ray incident on the first surface, as converted to the angle in the object space h1: Height of paraxial marginal ray on the first surface h#1: Height of off-paraxial principal ray on the first surface t: Entrance pupil distance.

The aberration coefficient mentioned above is a third order aberration coefficient which is expressed as described on page 61 of the previously cited *Theory of Aberrations* (by Yoshiya Matsui). Since the value of the aberration coefficient varies with initial values (that is, by normalization), the value that is calculated by using the above initial values is used here.

The conditional expression (B) shows the condition for keeping the astigmatism coefficient of the third group Gr3 within proper limits. From the equation for deriving the centering error sensitivity, which will be described later, asymmetric aberration, which is one form of decentering aberration, is proportional to the focal length and image height. Aberration coefficients that affect the asymmetric aberration are the astigmatism coefficient (III), coma aberration coefficient (II), and Petzval sum (P). If the upper limit of the conditional expression (B) is exceeded, the asymmetric aberration due to the decentering of the third group Gr3 occurs excessively, which is not desirable because extremely high accuracy becomes necessary in manufacturing.

Further, in the zoom lens designed by using the design technique having the above common configuration, as in the first, second, fifth, and sixth embodiments, it is desirable that the following conditional expressions (C) and (D) be satisfied.

$$|II3t \times ft \times Ymax/2| < 1.7 \quad\quad (C)$$

$$|II4t \times ft \times max/2| < 1.2 \quad\quad (D)$$

where

II3t: Coma aberration coefficient of third group Gr3 at telephoto end [T]

II4t: Coma aberration coefficient of fourth group Gr4 at telephoto end [T].

The conditional expression (C) shows the condition for keeping the coma aberration coefficient of the third group Gr3 within proper limits. As earlier stated, asymmetric aberration is proportional to the focal length and image height, and the astigmatism coefficient (III), coma aberration coefficient (II), and Petzval sum (P) affect the asymmetric aberration. If the upper limit of the conditional expression (C) is exceeded, the asymmetric aberration due to the decentering of the third group Gr3 occurs excessively, which is not desirable because extremely high accuracy becomes necessary in manufacturing.

The conditional expression (D) shows the condition for keeping the coma aberration coefficient of the fourth group Gr4 within proper limits. As earlier stated, asymmetric aberration is proportional to the focal length and image height, and the astigmatism coefficient (II), coma aberration coefficient (II), and Petzval sum (P) affect the asymmetric aberration. If the upper limit of the conditional expression (D) is exceeded, excessive asymmetric aberration due to the decentering of the fourth group Gr4 can occur, which is not desirable because extremely high accuracy becomes necessary in manufacturing.

It is further desirable that the following conditional expressions (Ca) and (Da) be satisfied. When the conditional expressions (Ca) and (Da) are satisfied, the centering error sensitivity can be further reduced, offering the advantage of greatly facilitating manufacturing.

$$|II3t \times ft \times Ymax/2| < 1.0 \quad\quad (Ca)$$

$$|II4t \times ft \times Ymax/2| < 0.6 \quad\quad (Da)$$

Further, in the zoom lens designed by using the design technique having the above common configuration, as in the first, second, fifth, and sixth embodiments, it is desirable that the following conditional expressions (E) and (F) be satisfied.

$$|I3t \times ft3/Fnot2| < 0.6 \quad\quad (E)$$

$$|I4t \times ft3/Fnot2| < 0.5 \quad\quad (F)$$

where

I3t: Spherical aberration coefficient of third group Gr3 at telephoto end [T]

I4t: Spherical aberration coefficient of fourth group Gr4 at telephoto end [T]

Fnot: F number (FNO) at telephoto end [T].

The conditional expression (E) shows the condition for keeping the spherical aberration coefficient of the third group Gr3 within proper limits. From the equation for deriving the centering error sensitivity, which will be described later, axial coma aberration, which is one form of decentering aberration, is directly proportional to the cube of the focal length and inversely proportional to the square of the F number. Aberration coefficients that affect the axial coma aberration are the spherical aberration coefficient (I) and coma aberration coefficient (II). If the upper limit of the conditional expression (E) is exceeded, the axial coma aberration due to the decentering of the third group Gr3 occurs excessively, which is not desirable because extremely high accuracy becomes necessary in manufacturing.

The conditional expression (F) shows the condition for keeping the spherical aberration coefficient of the fourth group Gr4 within proper limits. As noted above, axial coma aberration is directly proportional to the cube of the focal length and inversely proportional to the square of the F number. Further, the spherical aberration coefficient (I) and coma aberration coefficient (II) affect the axial coma. If the upper limit of the conditional expression (6) is exceeded, the axial coma aberration due to the decentering of the fourth group Gr4 occurs excessively, which is not desirable because extremely high accuracy becomes necessary in manufacturing.

It is further desirable that the following conditional expressions (Ea) and (Fa) be satisfied. When the conditional expressions (Ea) and (Fa) are satisfied, the centering error sensitivity can be further reduced, offering the advantage of greatly facilitating manufacturing.

$$|I3t \times ft3/Fnot2| < 0.46 \quad\quad (Ea)$$

$$|I4t \times ft3/Fnot2| < 0.17 \quad\quad (Fa)$$

10. Analysis 2 From The Standpoint Of Aberration Corrections For The Lens System Obtained By Using The Design Technique The lens system obtained by using the centering error sensitivity reduction technique will be further analyzed below from the standpoint of aberration corrections.

As a result of analyzing the zoom lens designed by using the centering error sensitivity reduction technique, it was found desirable that the following conditions be further satisfied, especially when optimizing for aspherical surfaces. These desirable conditions will be described by taking the first, second, fifth, and seventh embodiments as examples.

The first and second embodiments each concern a zoom lens consisting of four units, i.e., the first group Gr1 having a positive power, the second group Gr2 having a negative power, the third group Gr3 having a positive power, and the fourth group Gr4 having a positive power, arranged in this order as viewed from his the object side. The fifth and seventh embodiments each concern a zoom lens consisting of five units, i.e., the first group Gr1 having a positive power, the second group Gr2 having a negative power, the third group Gr3 having a positive power, the fourth group Gr4 having a positive power, and the fifth group Gr5 having a positive power, arranged in this order as viewed from the object side.

Each of the above embodiments is configured so that, in zooming from the wide angle end [W] toward the telephoto end [T], each group moves toward the object side in such a manner that the spacing between the first group Gr1 and the second group Gr2 increases, the spacing between the second group Gr2 and the third group Gr3 decreases, and the spacing between the third group Gr3 and the fourth group Gr4 decreases. Further, a diaphragm A, which moves together with the third group Gr3 in a zooming operation, is placed between the surface in the second group Gr2 closest to the image side and the surface in the third group Gr3 closest to the object side. Focusing is achieved by moving the first group Gr1 or second group Gr2 along the optical axis toward the object side.

In the zoom lens designed by using the design technique having the above common configuration, as in the first, second, fifth, and seventh embodiments, it is desirable that the following conditional expression (G) be satisfied.

$$2.8 < \beta t2/\beta w2 < 6.0 \tag{G}$$

where

βt2: Image magnification of second group Gr2 at telephoto end [T]

βw2: Image magnification of second group Gr2 at wide angle end [W].

The conditional expression (G) shows the condition for keeping the variable magnification ratio of the second group Gr2 within proper limits. If the upper limit of the conditional expression (G) is exceeded, the variable magnification ratio of the second group Gr2 becomes too large and the amount of object point movement from the wide angle end [W] to the telephoto end [T] becomes too large. As a result, the variation of the aberration of the second group Gr2 becomes too large, which is not desirable because it becomes difficult to obtain satisfactory optical performance. On the other hand, below the lower limit of the conditional expression (G) the variable magnification ratio of the second group Gr2 becomes too small, which is not desirable because it becomes difficult to achieve a high power zoom lens.

It is further desirable that the following conditional expression (Ga) be satisfied. By satisfying the conditional expression (Ga), a zoom lens with higher optical performance and higher magnification can be achieved.

$$3.5 < \beta t2/\beta w2 < 5.0 \tag{Ga}$$

Further, in the zoom lens designed by using the design technique having the above common configuration, as in the first, second, fifth, and seventh embodiments, it is desirable that the following conditional expression (H) be satisfied, and it is further desirable that both the conditional expressions (G) and (H) be satisfied.

$$-80 < III3tasp \times ft \times Ymax/2 < -1 \tag{H}$$

where

III3tasp: Astigmatism coefficient due to aspherical surface of third group Gr3 at telephoto end [T]

ft: Focal length at telephoto end [T]

Ymax: Diagonal length of image plane used.

Initial values in the calculation of the aberration coefficient are α1=0, h1=1, α#1=−1, and h#1=−t, where α1: Slope angle of paraxial marginal ray incident on the first surface, as converted to the angle in the object space α#1: Slope angle of off-paraxial principal ray incident on the first surface, as converted to the angle in the object space h1: Height of paraxial marginal ray on the first surface h#1: Height of off-paraxial principal ray on the first surface t: Entrance pupil distance.

The aberration coefficient mentioned above is a third order aberration coefficient which is expressed as described on page 61 of *Theory of Aberrations* (by Yoshiya Matsui) published by Japan Opto Mechatronics Association. Since the value of the aberration coefficient varies with initial values (that is, by normalization), the value calculated using the above initial values is used here.

The conditional expression (H) shows the condition for keeping the astigmatism coefficient due to the aspherical surface of the third group Gr3 within proper limits. From the equation for deriving the centering error sensitivity, which will be described later, asymmetric aberration, which is one form of decentering aberration, is proportional to the focal length and image height. Aberration coefficients that affect the asymmetric aberration are the astigmatism coefficient (III), coma aberration coefficient (II), and Petzval sum (P). Since the third group Gr3 is a lens group having a positive power as a whole, if the third group Gr3 is constructed using spherical lenses alone, the third group Gb3 will have a positive astigmatism coefficient. In a high power zoom lens, the power of the third group Gr3 is large and, hence, its astigmatism coefficient takes a very large value. As a result, the asymmetric aberration of the third group Gr3 also takes a large value. However, if an aspherical surface is used in the third group Gr3 so that a negative astigmatism coefficient is generated, the astigmatism coefficient of the entire third group Gr3 can be held to a small value.

If the upper limit of the conditional expression (H) is exceeded, the degree to which the astigmatism coefficient due to the aspherical surface acts to cancel the term due to the spherical surface in the third group Gr3 decreases. As a result, the asymmetric aberration due to decentering occurs excessively, which is not desirable because extremely high accuracy becomes necessary in manufacturing. On the other hand, below the lower limit of the conditional expression (H), the astigmatism of the third group Gr3 occurs excessively this time in the negative side, making astigmatism correction of the entire system difficult, and satisfactory image performance cannot be obtained. Furthermore, asymmetric aberration occurs excessively in the opposite direction due to decentering, which is not desirable because extremely high accuracy becomes necessary in manufacturing.

It is further desirable that the following conditional expression (Ha) be satisfied. By satisfying the conditional expression (Ha), a zoom lens having higher optical performance and which is less difficult to manufacture can be obtained.

$$-40 < III3tasp \times ft \times Ymax/2 < -10 \tag{Ha}$$

When the aberration coefficient of the third group Gr3 is varied widely from the conventional optical system, as described above, it becomes difficult to restore the aberration of the entire system. To address this, it is desirable that at least one aspherical surface be introduced in the fourth group Gr4 to restore the aberration of the entire system. For that purpose, it is preferable that the following conditional expression (I) be satisfied:

$$-120 < III4tasp \times ft \times Ymax/2 < -30 \tag{I}$$

where

III4tasp: Astigmatism coefficient due to aspherical surface of fourth group Gr4 at telephoto end [T].

The conditional expression (I) shows the condition for keeping the astigmatism coefficient due to the aspherical surface of the fourth group Gr4 within proper limits. If the upper limit of the conditional expression (1) is exceeded, it becomes difficult to cancel the aberration coefficient varied in the third group Gr3 by the aspherical surface in the fourth group Gr4. As a result, a large astigmatism coefficient remains as a whole, which is not desirable because good optical performance cannot be obtained. Conversely, below the lower limit of the conditional expression (3), the astigmatism occurring in the fourth group Gr4 becomes too large, which is not desirable because it becomes difficult to correct the entire aberration.

It is further desirable that the following conditional expression (Ia) be satisfied. By satisfying the conditional expression (Ia), a zoom lens having higher optical performance and which is less difficult to manufacture can be obtained.

$$-90 < III4taspxftxYmax/2 < -45 \quad (Ia)$$

Further, in the zoom lens designed by using the design technique having the above common configuration, as in the first, second, fifth, and seventh embodiments, it is desirable that the aspherical surface in the third group Gr3 satisfy the following conditional expression (J) for all values of y that satisfy $0.5 \, ymax < y < ymax$, where ymax is the maximum effective radius of the aspherical surface and y is the height in direction perpendicular to the optical axis.

$$-1 < (|x| - |x0|)/\{c0 \cdot (N' - N) \cdot f3\} < -0.001 \quad (i)$$

where $|x| - |x0|$: Difference in direction of optical axis between aspherical surface and reference spherical surface c0: Curvature of reference spherical surface N': Refractive index of medium on the image side of aspherical surface N: Refractive index of medium on the object side of aspherical surface f3: Focal length of third group Gr3.

In the conditional expression (J), X indicates the surface shape of the aspherical surface and x0 the surface shape of the reference spherical surface, which are expressed by the following equations (as) and (re), respectively.

$$x = \{c0 \cdot y2\}/\{1 + \sqrt{(1 - \epsilon \cdot c02 \cdot y2)}\} + \Sigma(Ai \cdot yi) \quad (as)$$

$$xo = \{c0 \cdot y2\}/\{1 + \sqrt{(1 - c02 \cdot y2)}\} \quad (re)$$

where $\epsilon$: Quadric surface parameter

Ai: i-th aspherical surface coefficient.

The conditional expression (J) shows the condition expressing the degree of the effect of the aspherical surface in the third group Gr3. Below the lower limit of the conditional expression (J), the effect of the aspherical surface in the third group Gr3 is almost unfelt. That is, since the aspherical surface in the third group Gr3 is unable to generate astigmatism significantly in the negative direction, it becomes difficult to suppress the occurrence of aberration due to the decentering of the third group Gr3. Conversely, if the upper limit of the conditional expression (J) is exceeded, the effect of the aspherical surface in the third group Gr3 becomes too strong, so that the resulting very large aberration cannot be suppressed by other elements and, hence, satisfactory optical performance cannot be obtained.

It is further desirable that the following conditional expression (Ja) be satisfied. By satisfying the conditional expression (Ja), a zoom lens having higher optical performance and which is less difficult to manufacture can be obtained.

$$0.3 < (|x| - |x0|)/\{c0 \cdot (N' - N) \cdot f3\} < -0.003 \quad (Ja)$$

Although the present invention has been fully described by way of examples with reference to the accompanying drawings, it is to be noted that various changes and modifications will be apparent to those skilled in the art. Therefore, unless such changes and modifications otherwise depart from the scope of the present invention, they should be construed as being included therein.

What is claimed is:

1. A method for designing an optical system, comprising the steps of:

identifying an optical system group containing at least one lens surface which exhibits centering error sensitivity;

calculating a decentering aberration using a decentering aberration coefficient of the identified group;

determining a third order aberration coefficient that makes a contribution to increased centering error sensitivity;

minimizing the determined third order aberration coefficient; and restoring an aberration balance that varied as a result of said minimization, so that overall optical performance is maintained at a level equivalent to the condition that existed before said minimization.

2. The method of claim 1 further including the steps of comparing the calculated decentering aberration with an actual decentering aberration, and determining said third order aberration coefficient when said calculated decentering aberration corresponds to said actual decentering aberration.

3. The method of claim 1 wherein, for the case of asymmetric aberration due to parallel decentering, said minimizing step comprises the step of minimizing the absolute value of the value expressed by the following formula for the identified group:

$$(\alpha'j - \alpha i) \cdot [3 \cdot (III)R + (P)R] - \alpha i \cdot [3 \cdot (III)D + (P)D] - (\alpha'\#j - \alpha\#i) \cdot [3 \cdot (II)R] + \alpha\#i \cdot [3 \cdot (II)D]$$

where (II)D: Sum of third order coma aberration coefficients of the identified group (II)R: Sum of third order coma aberration coefficients of the lens surfaces on the image side of the identified group (III)D: Sum of third order astigmatism coefficients of the identified group (III)R: Sum of third order astigmatism coefficients of the lens surfaces on the image side of the identified group (P)D: Sum of third order Petzval sum coefficients of the identified group (P)R: Sum of third order Petzval sum coefficients of the lens surfaces on the image side of the identified group $\alpha i$: Slope angle of paraxial marginal ray incident on an i-th surface, as converted to an angle in object space $\alpha\#i$: Slope angle of off-paraxial principal ray incident on the i-th surface, as converted to an angle in the object space $\alpha'j$: Slope angle of paraxial marginal ray emergent from a j-th surface, as converted to an angle in the object space, and $\alpha'\#j$: Slope angle of off-paraxial principal ray emergent from the j-th surface, as converted to an angle in the object space.

4. The method of claim 3 wherein only the fourth term of said formula is minimized.

5. The method of claim 1 wherein, for the case of axial coma aberration due to parallel decentering, said minimizing step comprises the step of minimizing the absolute value of the value expressed by the following formula for the identified group:

$$(\alpha'j - \alpha i) \cdot (II)R - \alpha i \cdot (II)D - (\alpha'\#j - \alpha\#i) \cdot (I)R + \alpha\#i \cdot (I)D$$

where (I)D: Sum of third order spherical aberration coefficients of the identified group (I)R: Sum of third order spherical aberration coefficients of the lens surfaces on the image side of the identified group (II)D: Sum of third order coma aberration coefficients of the identified group (II)R: Sum of third order coma aberration coefficients of the lens surfaces on the image side of the identified group $\alpha i$: Slope angle of paraxial marginal ray incident on an i-th surface, as converted to an angle in object space $\alpha\#i$: Slope angle of off-paraxial principal ray incident on the i-th surface, as converted to an angle in the object space $\alpha'j$ : Slope angle of paraxial marginal ray emergent from a j-th surface, as converted to an angle in the object space, and $\alpha'\#j$: Slope angle of off-paraxial principal ray emergent from the j-th surface, as converted to an angle in the object space.

6. The method of claim 5 wherein only the fourth term of said formula is minimized.

7. The method of claim 1 wherein, for the case of asymmetric aberration due to tilt decentering, said minimizing step comprises the step of minimizing the absolute value of the value expressed by the following formula for the identified group:

$$(hj-hi+\alpha'j\cdot TD)\cdot[3\cdot(III)R+(P)R]-hi-[3\cdot(III)D+(P)D]-(h\#j-h\#i+\alpha'\#jTD)\cdot[3\cdot(II)R]+h\#i\cdot[3\ (II)D]+(\alpha'j-\alpha i)$$

where (II)D: Sum of third order coma aberration coefficients of the identified group (II)R: Sum of third order coma aberration coefficients of the lens surfaces on the image side of the identified group (III)D: Sum of third order astigmatism coefficients of the identified group (III)R: Sum of third order astigmatism coefficients of the lens surfaces on the image side of the identified group (P)D: Sum of third order Petzval sum coefficients of the identified group (P)R: Sum of third order Petzval sum coefficients of the lens surfaces on the image side of the identified group $\alpha i$: Slope angle of paraxial marginal ray incident on an i-th surface, as converted to an angle in object space $\alpha'\#j$: Slope angle of paraxial marginal ray emergent from the j-th surface, as converted to an angle in the object space $\alpha'\#j$: Slope angle of off-paraxial principal ray emergent from a j-th surface, as converted to an angle in the object space hi: Height of paraxial marginal ray on the i-th surface h#i: Height of off-paraxial principal ray on the i-th surface hj: Height of paraxial marginal ray on the j-th surface h#j: Height of off-paraxial principal ray on the j-th surface, and TD: Core thickness of the specific group.

8. The method of claim 7 wherein only the first, second and fifth terms of said formula are minimized.

9. The method of claim 1 wherein, for the case of axial coma aberration due to tilt decentering, said minimizing step comprises the step of minimizing the absolute value of the value expressed by the following formula for the identified group:

$$(hj-hi+\alpha'j\cdot TD)\cdot(II)R-hi\cdot(II)D-(h\#j-h\#i+\alpha'\#jTD)'(I)R+h\#i\cdot(I)D$$

where (I)D: Sum of third order spherical aberration coefficients of the identified group (I)R: Sum of third order spherical aberration coefficients of the lens surfaces on the image side of the identified group (II)D: Sum of third order coma aberration coefficients of the identified group (II)R: Sum of third order coma aberration coefficients of the lens surfaces on the image side of the identified group $\alpha'j$: Slope angle of paraxial marginal ray emergent from a j-th surface, as converted to an angle in object space $\alpha\cdot\#j$: Slope angle of off-paraxial principal ray emergent from the j-th surface, as converted to an angle in the object space hi: Height of paraxial marginal ray on an i-th surface h#i: Height of off-paraxial principal ray on the i-th surface hj: Height of paraxial marginal ray on the j-th surface h#j: Height of off-paraxial principal ray on the j-th surface, and TD: Core thickness of the specific group.

10. The method of claim 9 wherein only the first and second terms of said formula are minimized.

11. The method of claim 1 wherein the optical system is a fixed focal length lens which satisfies the following conditional expression:

$$fL/ymax>3$$

where fL is the focal length of the entire system, and ymax is the image plane diagonal length.

\* \* \* \* \*